United States Patent [19]

Ogrinc et al.

[11] Patent Number: 5,384,912

[45] Date of Patent: Jan. 24, 1995

[54] REAL TIME VIDEO IMAGE PROCESSING SYSTEM

[75] Inventors: Michael A. Ogrinc, San Francisco; Robert A. Card, Palo Alto; Chris R. Burns, Mountain View; Charles P. Clarke, Los Altos; Ronda L. Collier, Scotts Valley; Kevin M. Collins, San Mateo; Stephen E. Crane, Menlo Park; Clifford Hersh, Berkeley; Brian C. Knittel, Palo Alto; Steven T. Mayer, Los Altos Hills; Lawrence Stead, Mountain View; Andrew E. Wade, Los Altos; Robert L. Lay, San Anselmo; Bradley G. Stewart, San Jose; Raymond Pon, Oakland; Robert Leyland, Novato; John F. Schlag, San Rafael; Sven Jensen, Palo Alto, all of Calif.

[73] Assignee: New Microtime Inc., Bloomfield, Conn.

[21] Appl. No.: 892,607

[22] Filed: May 29, 1992

Related U.S. Application Data

[63] Continuation of Ser. No. 116,801, Oct. 30, 1987, abandoned.

[51] Int. Cl.⁶ .............................................. G06F 15/00
[52] U.S. Cl. ..................................................... 395/164

[58] Field of Search .................. 382/46; 340/731, 747, 340/750; 395/162, 163, 164, 165, 166; 345/136, 137, 138; 364/728.01, 728.02

[56] References Cited

U.S. PATENT DOCUMENTS 4,586,181  4/1986  Shimizu .............................. 371/27

FOREIGN PATENT DOCUMENTS 0239299  9/1987  European Pat. Off. ..... G06F 11/16

Primary Examiner—Phu K. Nguyen
Attorney, Agent, or Firm—Skjerven, Morrill, MacPherson, Franklin & Friel

[57] ABSTRACT

A video digital signal processing and display system that allows real time processing of video images with extensive filtering and inter-pixel interpolation. The system includes a front end user and program interface supported by a personal computer, and also includes a microprocessor for controlling the system and specialized video circuitry including an image translator.

The image translator performs image translation, perspective projection, scaling, rotation, border insertion, and formation of composite images. The image translator interacts with the other specialized video circuitry which includes a frame constructor, a keyer and crosspoint switches, and a frame store constructor.

10 Claims, 26 Drawing Sheets

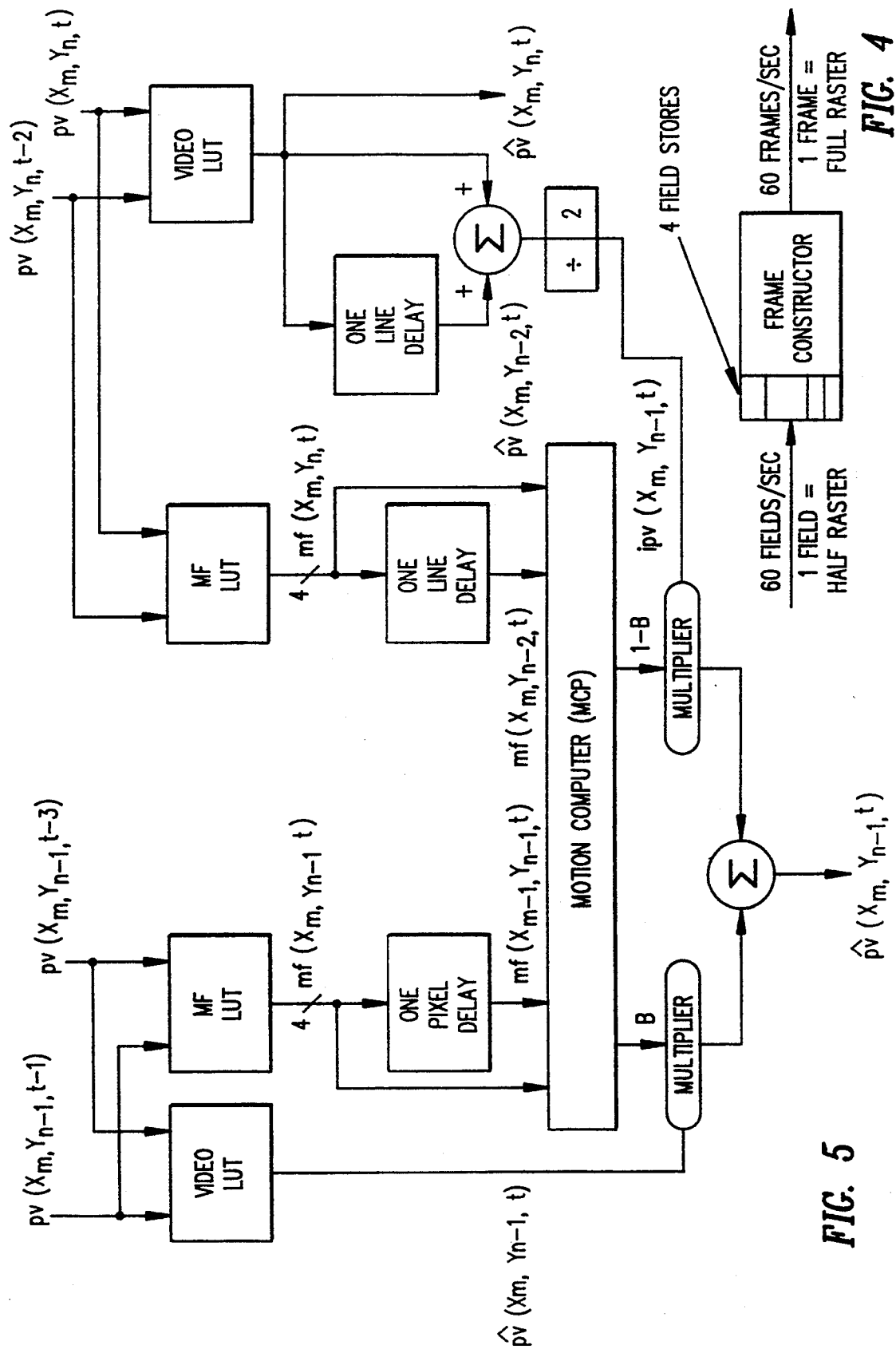

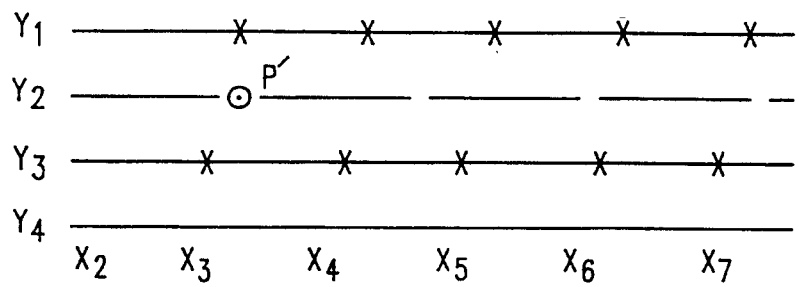
FIG. 6
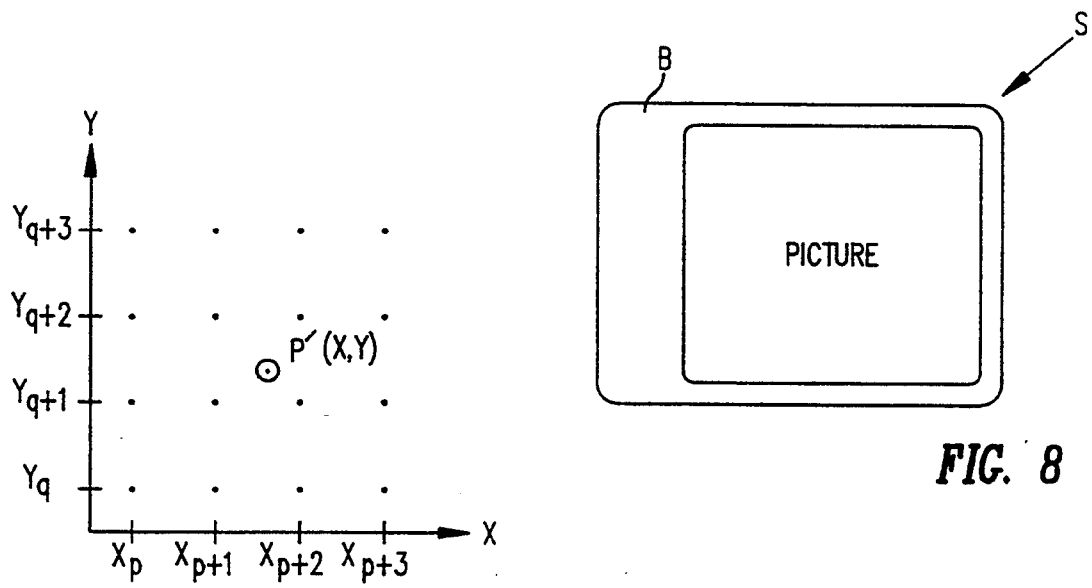
FIG. 7
FIG. 8
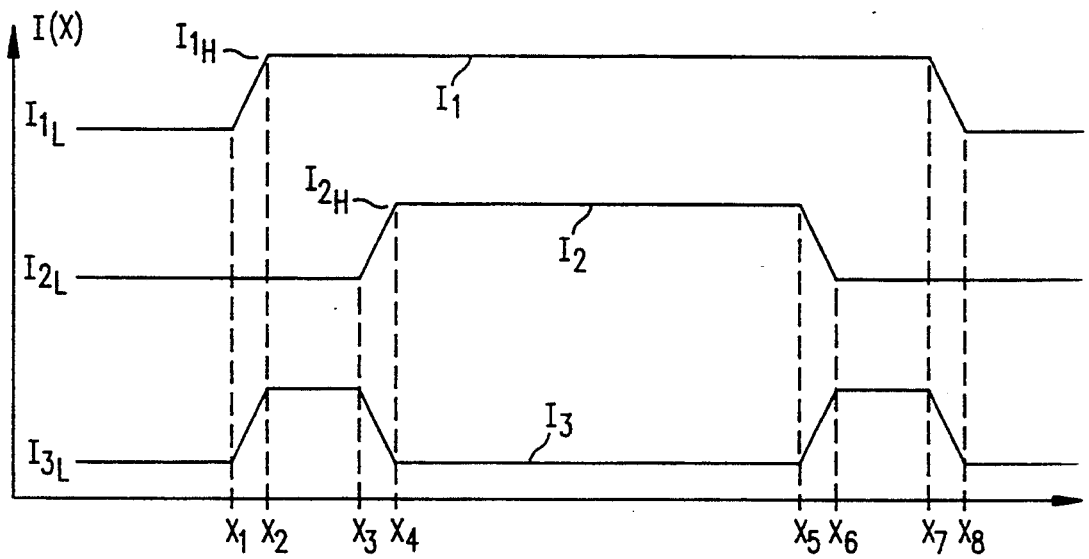
FIG. 9

OUT=(mixr) * IN1+(1-mixr) * IN2

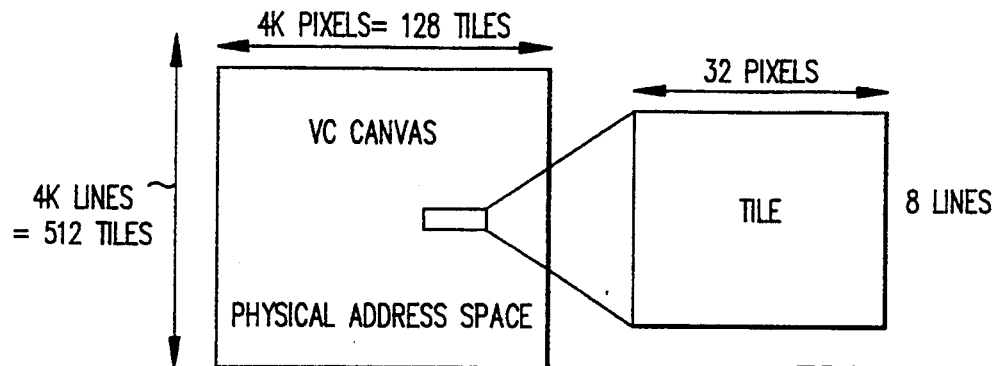
FIG. 16
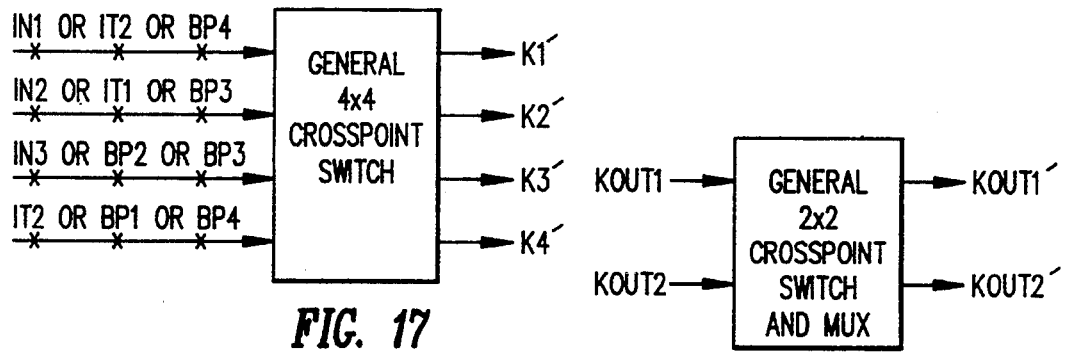
FIG. 17
FIG. 18
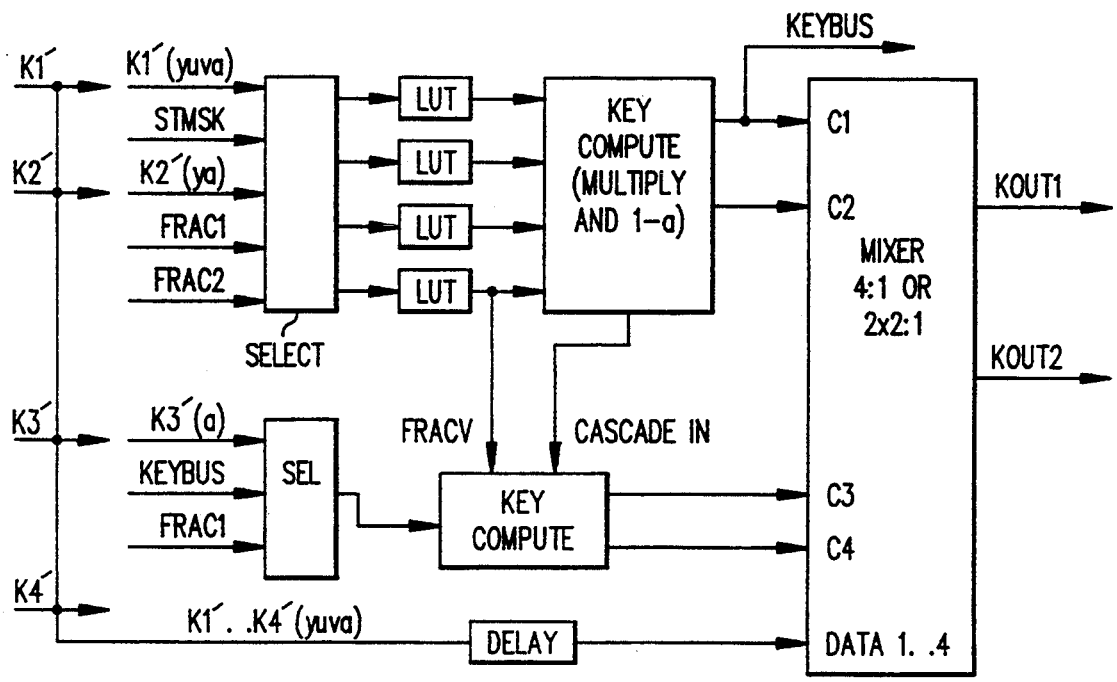
FIG. 19

| I0 | I1 | I2 | I3 |
|----|----|----|----|
| I4 | I5 | I6 | I7 |
| I8 | I9 | I10| I11|
| I12| I13| I14| I15|

INPUT TABLE

*FIG. 27*

| M0 | M1 | M2 | M3 |
|----|----|----|----|
| M4 | M5 | M6 | M7 |
| M8 | M9 | M10| M11|
| M12| M13| M14| M15|

OUTPUT TABLE

*FIG. 28*

HORIZONTAL AND VERTICAL MIRRORED

```
33 32 31 30      32 31 30 33      31 30 33 32      30 33 32 31
23 22 21 20      22 21 20 23      21 20 23 22      20 23 22 21
13 12 11 10      12 11 10 13      11 10 13 12      10 13 12 11
03 02 01 00      02 01 00 03      01 00 03 02      00 03 02 01
S0-S3=0          S0-S3=1          S0-S3=2          S0-S3=3

23 22 21 20      22 21 20 23      21 20 23 22      20 23 22 21
13 12 11 10      12 11 10 13      11 10 13 12      10 13 12 11
03 02 01 00      02 01 00 03      01 00 03 02      00 03 02 01
33 32 31 30      32 31 30 33      31 30 33 32      30 33 32 31
S0-S3=4          S0-S3=5          S0-S3=6          S0-S3=7

13 12 11 10      12 11 10 13      11 10 13 12      10 13 12 11
03 02 01 00      02 01 00 03      01 00 03 02      00 03 02 01
33 32 31 30      32 31 30 33      31 30 33 32      30 33 32 31
23 22 21 20      22 21 20 23      21 20 23 22      20 23 22 21
S0-S3=8          S0-S3=9          S0-S3=10         S0-S3=11

03 02 01 00      02 01 00 03      01 00 03 02      00 03 02 01
33 32 31 30      32 31 30 33      31 30 33 32      30 33 32 31
23 22 21 20      22 21 20 23      21 20 23 22      20 23 22 21
13 12 11 10      12 11 10 13      11 10 13 12      10 13 12 11
S0-S3=12         S0-S3=13         S0-S3=14         S0-S3=15
```

HORIZONTAL MIRRORED

| | | | |
|---|---|---|---|
| 03 02 01 00<br>13 12 11 10<br>23 22 21 20<br>33 32 31 30<br>S0–S3=0 | 02 01 00 03<br>12 11 10 13<br>22 21 20 23<br>32 31 30 33<br>S0–S3=1 | 01 00 03 02<br>11 10 13 12<br>21 20 23 22<br>31 30 33 32<br>S0–S3=2 | 00 03 02 01<br>10 13 12 11<br>20 23 22 21<br>30 33 32 31<br>S0–S3=3 |
| 13 12 11 10<br>23 22 21 20<br>33 32 31 30<br>03 02 01 00<br>S0–S3=4 | 12 11 10 13<br>22 21 20 23<br>32 31 30 33<br>02 01 00 03<br>S0–S3=5 | 11 10 13 12<br>21 20 23 22<br>31 30 33 32<br>01 00 03 02<br>S0–S3=6 | 10 13 12 11<br>20 23 22 21<br>30 33 32 31<br>00 03 02 01<br>S0–S3=7 |
| 23 22 21 20<br>33 32 31 30<br>03 02 01 00<br>13 12 11 10<br>S0–S3=8 | 22 21 20 23<br>32 31 30 33<br>02 01 00 03<br>12 11 10 13<br>S0–S3=9 | 21 20 23 22<br>31 30 33 32<br>01 00 03 02<br>11 10 13 12<br>S0–S3=10 | 20 23 22 21<br>30 33 32 31<br>00 03 02 01<br>10 13 12 11<br>S0–S3=11 |
| 33 32 31 30<br>03 02 01 00<br>13 12 11 10<br>23 22 21 20<br>S0–S3=12 | 32 31 30 33<br>02 01 00 03<br>12 11 10 13<br>22 21 20 23<br>S0–S3=13 | 31 30 33 32<br>01 00 03 02<br>11 10 13 12<br>21 20 23 22<br>S0–S3=14 | 30 33 32 31<br>00 03 02 01<br>10 13 12 11<br>20 23 22 21<br>S0–S3=15 |

*FIG. 32*

VERTICAL MIRRORED

| | | | |
|---|---|---|---|
| 30 31 32 33<br>20 21 22 23<br>10 11 12 13<br>00 01 02 03<br>S0–S3=0 | 31 32 33 30<br>21 22 23 20<br>11 12 13 10<br>01 02 03 00<br>S0–S3=1 | 32 33 30 31<br>22 23 20 21<br>12 13 10 11<br>02 03 00 01<br>S0–S3=2 | 33 30 31 32<br>23 20 21 22<br>13 10 11 12<br>03 00 01 02<br>S0–S3=3 |
| 20 21 22 23<br>10 11 12 13<br>00 01 02 03<br>30 31 32 33<br>S0–S3=4 | 21 22 23 20<br>11 12 13 10<br>01 02 03 00<br>31 32 33 30<br>S0–S3=5 | 22 23 20 21<br>12 13 10 11<br>02 03 00 01<br>32 33 30 31<br>S0–S3=6 | 23 20 21 22<br>13 10 11 12<br>03 00 01 02<br>33 30 31 32<br>S0–S3=7 |
| 10 11 12 13<br>00 01 02 03<br>30 31 32 33<br>20 21 22 23<br>S0–S3=8 | 11 12 13 10<br>01 02 03 00<br>31 32 33 30<br>21 22 23 20<br>S0–S3=9 | 12 13 10 11<br>02 03 00 01<br>32 33 30 31<br>22 23 20 21<br>S0–S3=10 | 13 10 11 12<br>03 00 01 02<br>33 30 31 32<br>23 20 21 22<br>S0–S3=11 |
| 00 01 02 03<br>30 31 32 33<br>20 21 22 23<br>10 11 12 13<br>S0–S3=12 | 01 02 03 00<br>31 32 33 30<br>21 22 23 20<br>11 12 13 10<br>S0–S3=13 | 02 03 00 01<br>32 33 30 31<br>22 23 20 21<br>12 13 10 11<br>S0–S3=14 | 03 00 01 02<br>33 30 31 32<br>23 20 21 22<br>13 10 11 12<br>S0–S3=15 |

*FIG. 33*

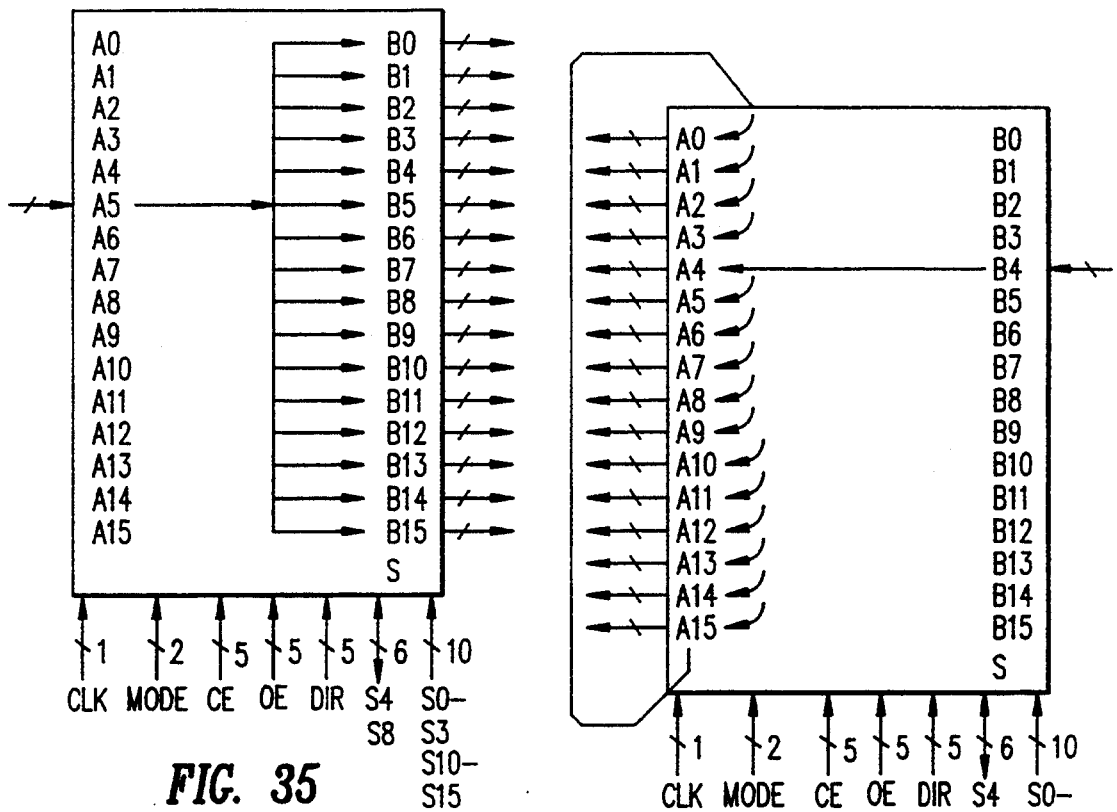
*FIG. 35*
*FIG. 36*
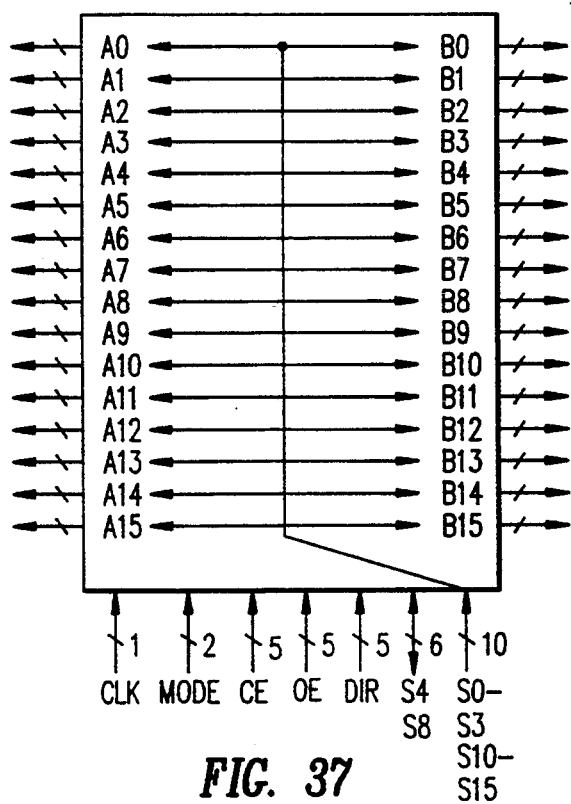
*FIG. 37*

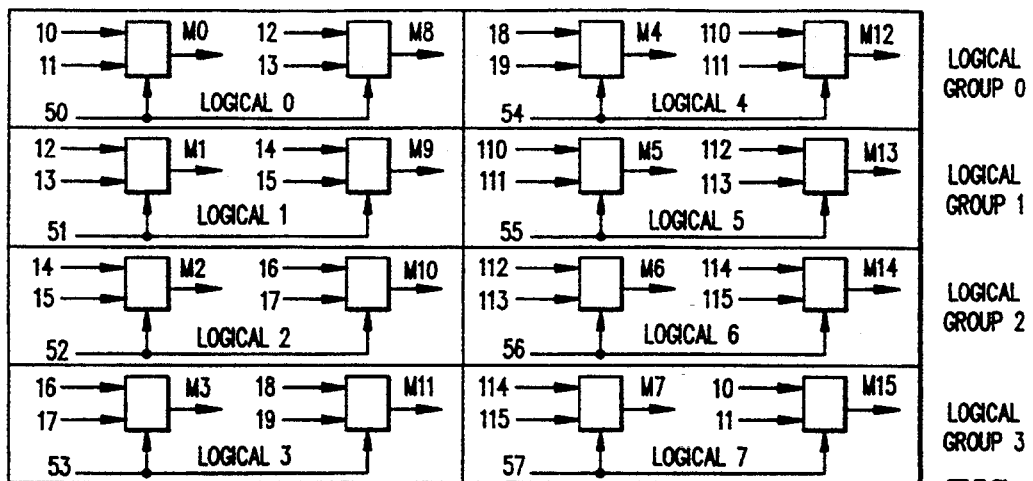
FIG. 40
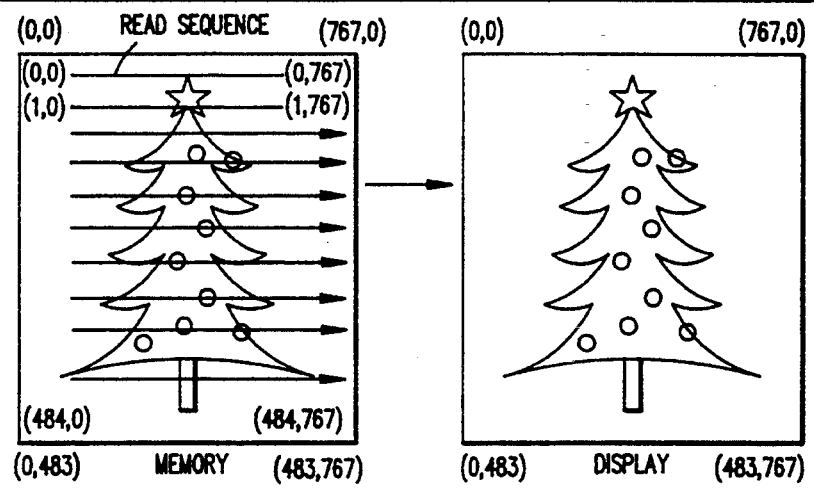
FIG. 42
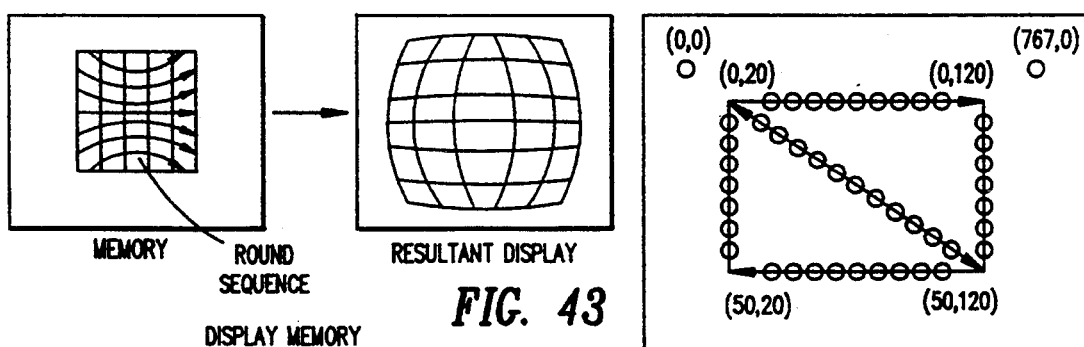
FIG. 43
FIG. 45
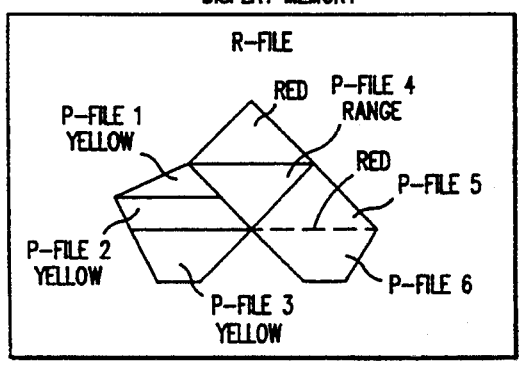
FIG. 44

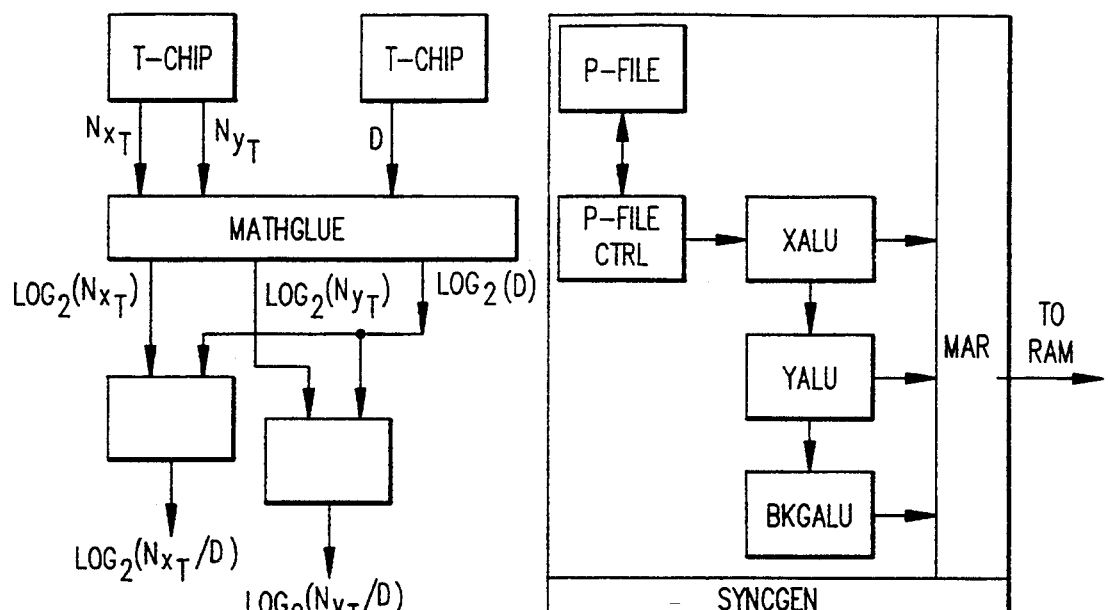
*FIG. 50*
*FIG. 51*
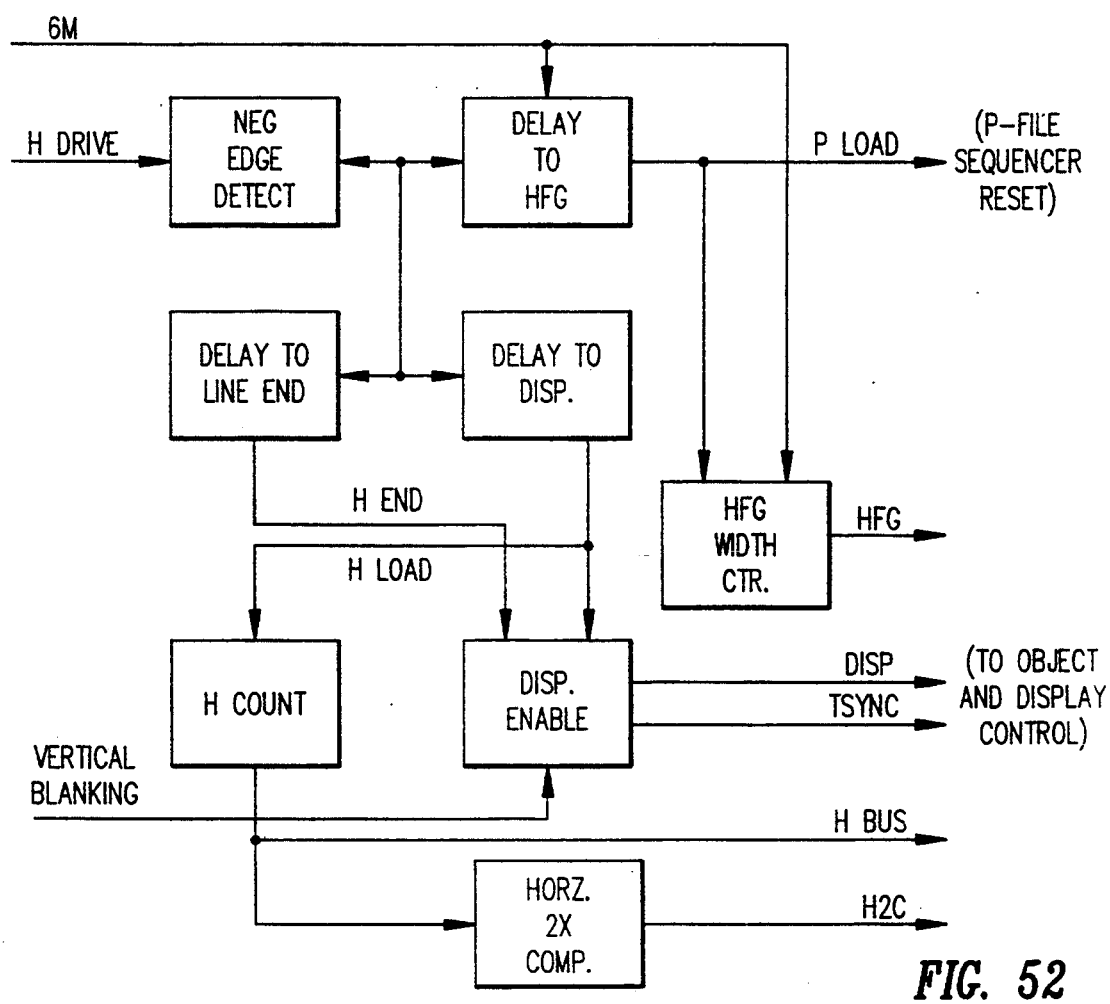
*FIG. 52*

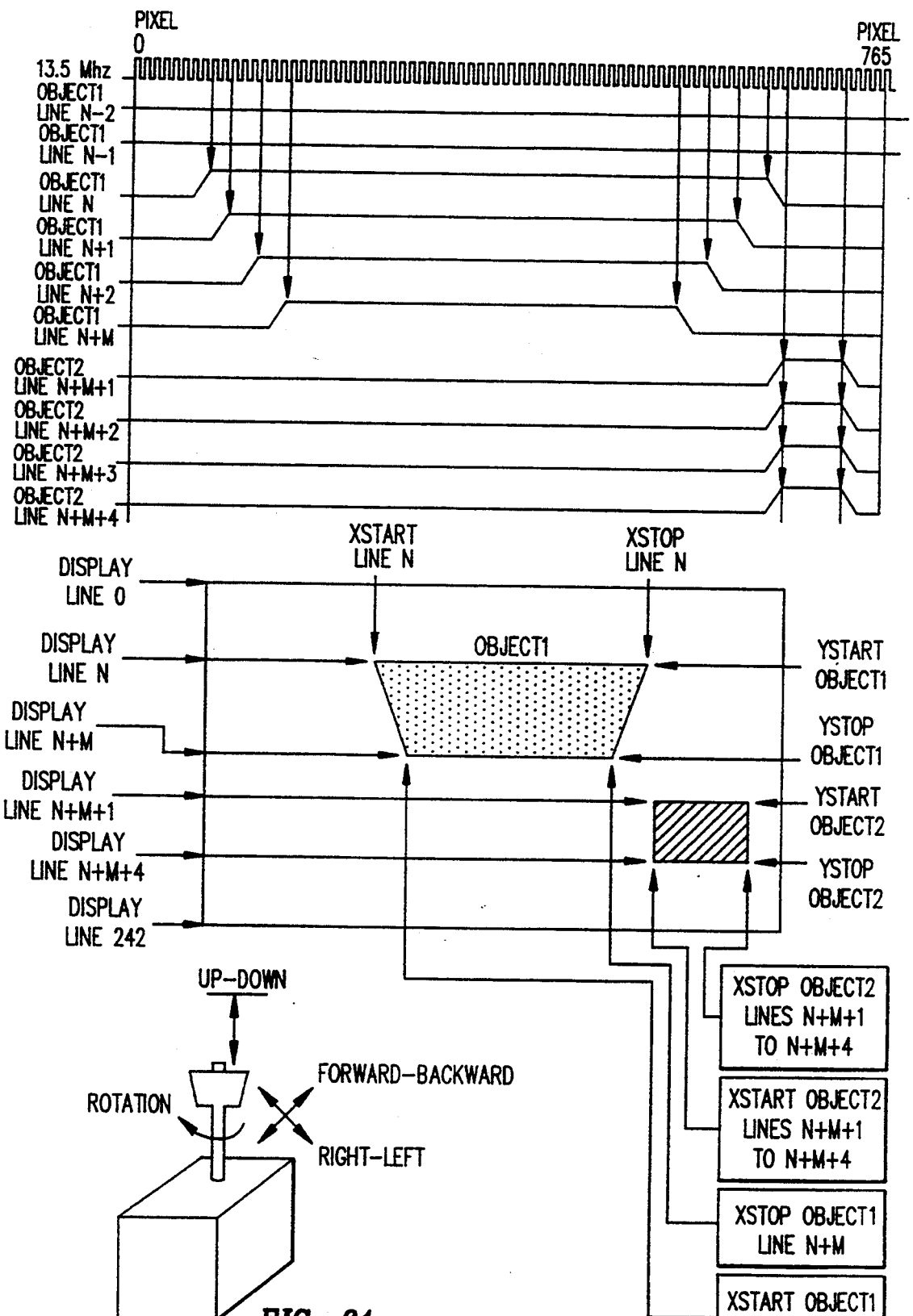

REAL TIME VIDEO IMAGE PROCESSING SYSTEM

This application is a continuation of application Ser. No. 07/116,801, field Oct. 30, 1987 now abandoned.

FIELD OF THE INVENTION

This invention relates to a video system for real time processing of video images, and more particularly to modules and chips that support dynamic graphics for television broadcast of video images.

BACKGROUND OF THE INVENTION

The use of computer-controlled digital signals for video image processing is not new, but generally only the simpler aspects of computer manipulation have been imported into video systems and design. The video system-described here offers a number of innovative improvements, many of which are summarized in the following section and discussed in the detailed description.

SUMMARY OF THE INVENTION

The invention described herein has several objects or purposes: (1) to provide burst copying of data to random access memory (RAM) addresses during certain video system blanking intervals; (2) to use multiple banks of slower response dynamic RAMs for purposes of rapid, sequential reading data to and writing data from such memories; (3) to allow inter-pixel interpolation of pixel values; (4) to construct synthetic pixel values for display times at which such values are not available; (5) to provide filter coefficients that can change with each pixel and/or in real time; (6) to allow for flexible border insertion on the screen; (7) to provide certain parameter file and linking technique for sophisticated memory address specification; (8) to provide multi-purpose networks of digital differential analyzers for coordinate generation and manipulation; (9) to provide special paint modes and flexible mini-canvases on the video screens; (10) to utilize logarithms, where appropriate, for arithmetic computations; (11) to provide interfaces for conversion, at the front end and at the rear end of the video system, from conventional slower rate digital systems to the faster rate video system described here; (12) to provide for multiple layer painting and compositing of signals with variable image transparencies; (13) to provide flexible stencils for use in the paint mode; (14) to provide for use of filter coefficients that may be used to form composite pixel values for an arbitrary number of adjacent pixels at the same time; (15) to provide reconfigurable keyers for image mixing and related activities; (16) to provide for simultaneous processing of luminance, chrominance, transparency and depth signals associated with video images; (17) to provide special arithmetic modules for special functions used in the video system; and (18) to provide a flexible interface between the hardware of the system and various applications-oriented features of the system.

Other objects of the invention, and advantages thereof, will become clear by reference to the following detailed description and accompanying drawings.

The objects of this invention may be realized by methods and apparatus discussed in the Description section and recited in the Claims.

DESCRIPTION OF THE DRAWINGS

FIG. 4 is a simplified schematic view of frame constructor operation.

FIGS. 5 and 6 illustrate construction of a synthetic pixel value at a pixel, used on data fill between even and odd fields in the frame constructor.

FIG. 7 illustrates the use of averaging of pixel values in a 4×4 pixel array that surrounds a fictitious pixel position p'(x,y).

FIG. 8 is a front view of a screen image that is to include a predetermined border B.

FIG. 9 illustrates how a border is formed from image difference signals.

FIG. 16 is a schematic view illustrating a tile map from the whole screen.

FIG. 17 is a schematic view of the operation of a 4×4 crosspoint switch upon specific keyer inputs.

FIG. 18 is a schematic view of the operation of a 2×2 crosspoint switch upon keyer outputs.

FIG. 19 is a schematic diagram of the keyer module.

FIG. 26 illustrates the 16 permutations of a 4×4 block of signals that are available in mode 0 operation of the M-chip, used for inter-pixel interpolation.

FIGS. 27 and 28 illustrate the input format (I) and output format (M) for Modes 0, 1, 2 and 3 of the M-chip.

FIG. 29 illustrates the use of mode 0 of the M-chip for interpolation.

FIGS. 30 and 31 illustrates the effect on the pixel values contained in a certain Target Block of M×N pixels of certain transformations on the array of pixel values carried out in conjunction with use of the M-chip in Mode 0 (interpolation).

FIGS. 32, 33 and 34 illustrate the 16 permutations of a 4×4 block of signals that are available in Mode 1 (horizontal mirroring), Mode 2 (vertical mirroring) and mode 3 (both horizontal and vertical mirroring) and Mode 3 (both horizontal and vertical mirroring) of the M-chip.

FIGS. 35, 36 and 37 illustrate the use of the M-chip in Mode 4 (broadcast), Mode 5 (16-tap delay line) and Mode 6 (test data broadcast).

FIGS. 38, 39 and 40 illustrate the use of the M-chip as a multiplexer M-chip in Mode 8 (8-to-1 mux), Mode 9 (4-to-1 mux) and Mode 10 (2-to-1 mux).

FIG. 42 is a schematic view of an untransformed image in memory, represented as a matrix, that is processed by the invention.

FIG. 43 illustrates how the transform operation maps an original image onto a curved surface in the display/transform mode.

FIG. 44 illustrates the use of the invention on the polygon fill mode.

FIGS. 45 illustrates the use of the invention to construct vectors in the vector mode.

FIG. 50 illustrates schematically the use of two T-chips to form ratios $N_x/D$ and $N_y/D$ used in projective coordinate transformations.

FIG. 51 is a schematic view of the arrangement of the T-chip.

FIG. 52 and 53 illustrate the P-file address generator timing cycles.

FIG. 60 graphically illustrates how the X and Y comparators, the counters and the BKGALU interact to create a P-file object window.

FIG. 61 is a schematic view of a four-axis joy stick used for control of various quantities that are manipulated in the video system.

DESCRIPTION OF A PREFERRED EMBODIMENT

Figure 1:
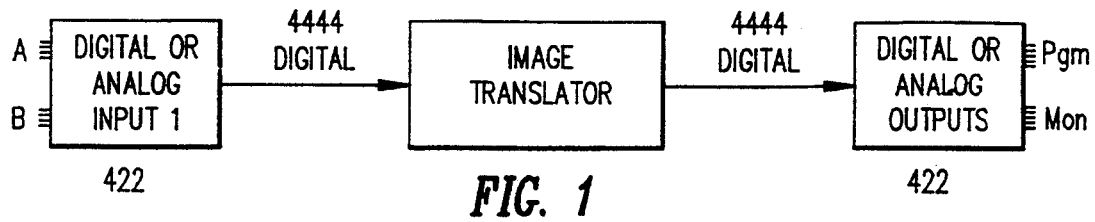
FIG. 1 is a simplified schematic illustrating Image Translator operation.

The subject invention is a video processing and display system, and some components thereof, that allows real time video signal processing and display. Three levels of technology are involved here. The slowest is the front end user interface and program interface, which can be supported by a personal computer such as the 386 PC/AT. A second level is a 32-bit microprocessor such as the Intel 80386 that runs the control software and specifies real time parameters at the 60 Hz field rate of the system. A third level is the hardware, including several innovative chips and an Image Translator that process the image or composite images at the pixel and sub-pixel levels. Use of a standard computer and standard software interface allows creation of an open system that may be adopted and extended by the user for a variety of applications.

The basic block of the system is an Image Translator (IT), a multi-function module that provides any four-component video information (such as Y, B-Y, R-Y and alpha) at 4444 rates; that is, each of these four channels is supplied at the pixel rate of 13.5 MSPS (13.5 million samples per second, which is approximately four times the NTSC video sub-carrier or reference frequency of 3.58 MSPS), with optional interfaces to receive or transmit B-Y, R-Y and alpha information at the slower rates (6.75 MSPS) used by many companion systems. The IT can perform real time, three-dimensional image translation, perspective projection, scaling, rotation and other computer-intensive graphic operations such as border insertion painting and formation of composite video images.

A Virtual Video Interface (VVI) provides a software interface to the IT and insulates the user or application writer from the sub-pixel processes such as inter-pixel interpolation. The VVI is similar in some respects to standard computer graphics interfaces such as VDI and DGIS; but the VVI has extensions to support video-specific animation operations such as real time video manipulation.

The IT is interfaced to the external video world through universal input and output modules. Each input module provides field rate selection of analog composite signals such as the NTSC standard and analog components input signals such YUV, GBR, YIQ, Betacam, SMPTE and MII. Digital input and output signals at the CCIR 601 standard (422 rate) are also available. Interconnection and formation of composite signals is provided by a digital switch/composite option, the Framestore/Keyer (FSK). The FSK contains 4-24 RAM-based virtual frame buffers and one four-layer, real time mixer/keyer or two two-layer mixer/keyers. Up to four separate images may be used to form a composite image in real time. The FSK also moves screen images spatially and in time. The system determines the degree, using up to eight-bit resolution, of motion associated with a pixel image for purposes of synthetic pixel value construction; this is especially useful where an image is in rapid motion. See FIG. 1 for a schematic view of the relationship of the various control and processing blocks of the system.

The system also contains three innovative chips that perform many special purposes or unique tasks in video processing or display. A T-chip uses digital differential analyzers and special parameter files (P-files) to perform perspective projection, translation, rotation, scaling, scrolling and other operations and to provide border insertion using linear or curvilinear border segments. An F-chip that comprises an array of multipliers, adders and other arithmetic units is configurable to provide digital finite impulse response (FIR) filters for use in low pass/high pass, sub-pixel interpolation, video image mixing, painting and similar operations, where all filter coefficients may change in real time. An M-chip, a digital multiplexer, routes video signals and filter coefficients and computer bus signals for operations such as painting and interpolation.

FIG. 1 indicates some of the interconnections between the major elements of the system.

Luminance and Chrominance Specifications

The luminance and chrominance information used for black and white and color display is handled by conventional approaches. A good discussion of this is found in the book *Color and Black & White Television Theory and Servicing* by Alvin A. Liff, Prentice-Hall, Second Ed., 1985, pp. 88–111. For completeness, a brief summary of this information is given here. Color television makes use of an additive system of color mixing, working with the primary colors of red, green and blue; red and green mixed together (in appropriate proportions) will produce yellow or orange; blue and red mixed together will produce magenta; green and blue mixed together will produce cyan; and the three primary colors mixed together in substantially equal strengths will produce white. The luminance or brightness level Y for a particular color, formed from a mixture of red (R), green (G) and blue (B), is determined from the equation for the "grey scale"

$$Y = 0.299R + 0.587G + 0.114B,$$

where the parameters R, G and B each vary from 0 to 1.00. If equal amounts of 100 percent red, green and blue color of full strengths are combined (R=G=B=1.00), this yields Y=1.00, which corresponds to the brightest possible shade of grey, namely white. Black is the absence of all color and corresponds to Y=R=G=B=0. Two color difference signals, $$R - Y = 0.701R - 0.587G - 0.114B,$$

$$B - Y = 0.886B - 0.299R - 0.587G,$$

representing the chrominance or color information, are used together with the luminance signal Y to provide all required color and black and white information. The color difference signal G-Y is easily recovered from the other two difference signals, viz., $$G - Y = -0.508(R - Y) - 0.186(B - Y).$$

The color difference signals R-Y and B-Y are now replaced by the compensated difference signals U=0.877 (R−Y) and V=0.493 (B−Y), respectively, or by a related pair of compensated difference signals CR=0.713(R−Y) and CB=0.564(B−Y). On a conventional two-dimensional (x,y) graph with the x-axis (y-axis) being positive toward the right (toward the top), one associates positive U and positive V with the positive y-axis and positive x-axis, respectively. The chrominance information for a particular color is specified by an amplitude and a phase angle on this graph, with the phase angle referenced to the −U axis (negative x-axis). For example, the color yellow (R=G=1.0) corresponds to the coordinates (U,V)=(−0.439, 0.096), which has amplitude 0.449 and phase angle +12.4°. See FIGS. 3–9 of Liff, op. cit., for a graphic representation of the (U,V) graph and amplitude/phase relationships for the different colors. In the network used with the invention, the signals Y, U and V (or, equivalently, Y, R-Y and B-Y) are each assigned a channel with associated sampling rate 13.5 MHz, which, as described by international convention, is approximately four times the NTSC color subcarrier frequency of 3.5795 MHz used in the television industry.

Image Translator

Figure 2:
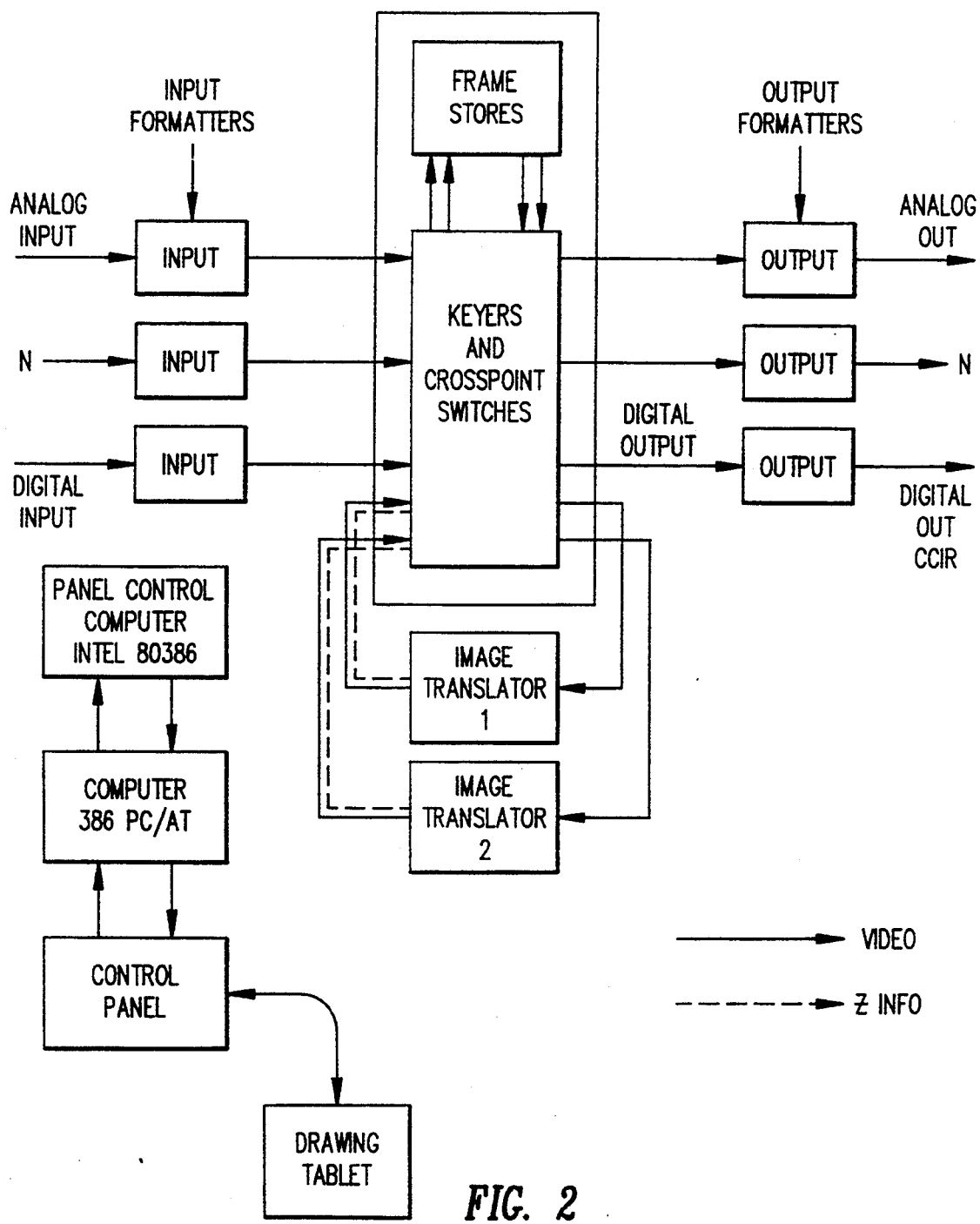
FIG. 2 is a schematic view of the different modules that comprise the Image Translator.

The Image Translator (IT) is a key portion of the hardware used for image transformation and display. The IT handles a single channel of live video, performs the real time digital effects transformations, mapping two-dimensional images onto a planar or curved surface, for locating that surface in three-dimensional space and performing projections of that surface onto a video screen, and provides the basic "painting" function. With reference to FIG. 2, input video signals enter through the analog input unit IN, are processed by the image translator, and are fed out through the analog output unit OUT. The analog input and output units may interface to various video formats such as RGB, YUV, NTSC, etc., and may convert analog to digital information (within IN) or convert digital to analog information (within OUT) for subsequent processing. The digital I/O unit converts from CC1R 601 standard video to the internal 4444 standard and back again, accomplished in the following manner. At the front end, the chrominance signals U and V, which arrive at only half the rate required by the system, are sent through a multiplexer and an interpolation filter to determine the "in between" or interstitial signal values; the filter in one embodiment may be 3×1 and more generally may be up to 16×1. When four successive U (or V) signal data points $U_n$, $U_{n+1}$, $U_{n+2}$, $U_{n+3}$ arrive and the interstitial signal $U_{n+3/2}$ is to be constructed, these four real signal values are multiplied by four filter coefficients $C_j$ (j=1,2,3,4) from an F-chip in the system to form a sum $$S = \sum_{j=1}^{4} C_j \cdot U_{n+j}, \quad \sum_{j=1}^{4} C_j = 1.$$

The sum S is designated as the desired signal value $U_{n+3/2}$, and these interstitial signal values are computed anew for each n. In one embodiment of the filter used here C2=C3=0.6 and C1=C4=−0.1, but any reasonable choice of coefficients can be used here. As the sequence of real signal values $U_{n+j}$ arrives, each such signal is multiplexed directly to the IT in FIG. 2. Three consecutive signal values $U_n$, $U_{n+1}$ and $U_{n+2}$ are temporarily stored, and when the next consecutive signal value $U_{n+3}$ arrives the interstitial value $U_{n+3/2}$ is computed as indicated above and multiplexed into IT for further use.

At the output end of IT in FIG. 2, a decimation filter is used to remove every other U and/or V signal point if the 4444 system is to interface with a 422 system, optionally using multiplexing and filtering. In one embodiment, seven consecutive U signal values $U_n$, $U_{n+1}$, $U_{n+2}$, $U_{n+3}$, $U_{n+4}$, $U_{n+5}$ and $U_{n+6}$ are multiplied by predetermined adoptive filter coefficients $C_j'$ (j=0,1,2,3,4,5,6) and summed to yield $$S' = \sum_{j=0}^{6} C_j U_{n+j}, \quad \sum_{j=0}^{6} C_j = 1,$$

and the sum $S'=U'_{n+3}$ may replace the middle signal value $U_{n+3}$; the alternate signal values $U_n$, $U_{n+2}$, $U_{n+4}$, $U_{n+6}$, ... may be deleted by appropriate multiplexing so that the stream of output signals for the U signal becomes ..., $U'_1$, $U'_3$, $U'_5$, $U'_7$, .... The seven adoptive filter coefficients used here may be replaced by a larger or smaller number; in one embodiment, these coefficients are symmetric about the central coefficient $C'(n+3)$ so that $C'(n+3+k)=C'(n+3-k)$ $(k=0,1,2,...)$. If the video system interfaces to a system that can provide or receive data at the full 4444 rate, these adjustments are not necessary. If the video system interfaces to a system that provides or receives data at other than the 422 rate or the 4444 rate, obvious adjustments can be made in the pre-filtering or post-filtering to accommodate this different rate.

A typical video unit may contain multiple analog and digital input and/or output units, plus a keyer and frame store system. The keyer combines several video signals together from the inputs and the ITs and feeds these to the output units.

Figure 3:
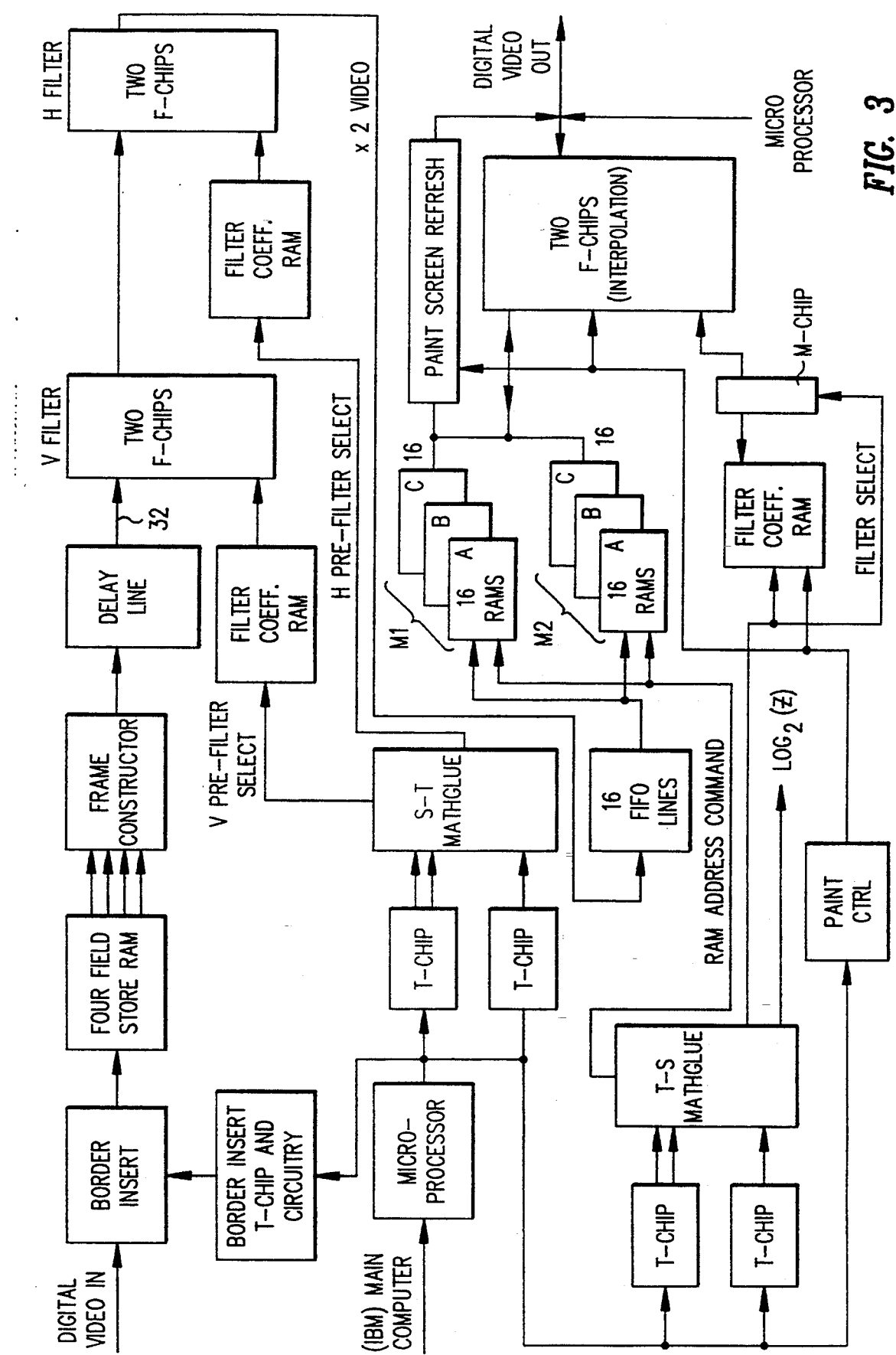
FIG. 3 is a schematic view of the relationship of the major components of the system and their interconnections.

FIG. 3 is a schematic view of the IT. The border insert unit inserts a border around the live video, and the total signal is then fed to four time-delayed field stores. Each frame or instantaneous picture on the display screen consists of two interleaved fields, with one field appearing on the odd-numbered horizontal lines (1,3,5,7 ...) and the other field appearing only on the even-numbered horizontal lines (0,2,4,6,8, ...). From these frames of two fields each, the frame constructor produces a full frame of video each 1/60 second (the "frame rate") so that the field rate of each separate field is 1/30 second. The video is pre-filtered by a two-stage, two-dimensional low pass filter (vertical and horizontal) to smooth out any undesirable signals due to aliasing that would otherwise be produced when the image is compressed or rotated in three dimensions or projected onto a surved surface. The video signal is then fed to a random access frame buffer; the frame buffer is actually doubly-buffered so that an output signal is read from one buffer while an input signal is being written into a companion buffer. The output signal is read in an unconventional order, and this produces the transformed image in the interpolator. Post filtering also occurs in the interpolator. Although FIG. 3 shows only one signal line between adjacent modules it should be understood that one such line is provided for each signal component (e.g., Y,U,V,$\alpha$) and that these signals are provided for each of the two fields that comprise a frame.

Generally, this occurs under the control of software associated with the apparatus. The software sets up control parameters at a field rate of 1/60 second. The hardware performs pixel-rate calculations at the rate of one every 74 nsec (1/13.5 MHz).

In FIG. 3, double arrows (==>) indicate passage of signals at double the normal video (NTSC) sub-carrier rate, which would produce a full frame every 1/60 second; and quadruple arrows (====>) indicate passage of signals at four times the sub-carrier rate. The IT includes a bypass path so that, in the "paint" mode, the video may optionally bypass the pre-filters. The IT also includes a paint refresh path so that the screen can be kept active using the M1, M2 and interpolation filters only 50 percent of the time; the remaining time is available for using these filters for painting. A feedback path allows information produced by the interpolator to be passed to the field stores for use in the frame constructor.

The video signal passed through the IT contains four full channels, Y, U, V and $\alpha$. The luminance or monochrome signal Y carries intensity or brightness information. The color difference signals U and V carry chrominance information, as discussed above. The signal $\alpha$ represents opacity so that the signal $1-\alpha$ represents transparency, with $\alpha=0$ indicating a transparent image and $\alpha=1$ indicating a fully opaque image. The $\alpha$ signal is used when two or more composite signals are superimposed on the display screen. The luminance signal Y and $\alpha$ each range from 0–255 units; and the chrominance signals U and V range from $-128-+127$ units, allowing for use of guardbands on the luminance channel and signed number representation of the color signals. Each of the four channel signals Y, U, V and $\alpha$ is expressed by eight bits and is sampled from the incoming analog signal at 13.5 MHz; this rate is the frequency used in the international standard for digital video, namely CCIR 601. In the conventional CCIR 601 standard, Y is sampled at 13.5 MSPS and U and V are each sampled at 6.75 MSPS (designated 422). Here, the Y, U, V and $\alpha$ signals are all sampled at 13.5 MSPS so that the corresponding designation might be 4444. Real time interpolation and adaptive decimation filters are included in the digital I/O modules to convert between the internal 4444 standard and the conventional 422 standard, as discussed above.

Returning to FIG. 3, the border insert block inserts a border onto the incoming live video signal. The border crops the picture area; the full area available to store video is limited to the full picture size. The border insert computation is done in a T-chip, is quite flexible and is discussed below. The inside and outside edges of a border may be soft or apodized (gradually merging into the background), or the border may be a standard "hard" border. The border shape may be expressed by polynomials up to second degree in the screen coordinates x and y so that the border shapes may be rectangular, polygonal and even rounded within these limits.

FIGS. 5 and 6 illustrates schematically the operation of the frame constructor, together with the four field stores associated with the frame constructor. Provision of these four field stores allows the video transformations and painting operations to operate on a full frame video (consisting of two interleaved fields) while a second frame is being prepared in a buffer. The human eye can detect flicker and other motion artifacts at a rate of 30 Hz so that a higher rate, 60 Hz, is used here for frame processing and display. In an interlaced raster system, with conventional image processing, if a hand is shown in motion, the position of the fingers of the moving hand will be different in successive fields due to the motion; and this could produce jagged edges where the images of the two interleaved field fail to match. The IT constructs a full frame of video every 1/60 second and does all processing on this full frame. Since the incoming video signal does not contain all information of a frame at precisely the same time, this information is reconstructed by interpolation in time.

Four time-delayed fields of video signals are stored in the frame stores; the most recent field information (here designated $t=0$, assumed for definiteness to be an even field), and each of the three previously input fields t=−Δt (odd field), t=−2Δt (even field) and t=−3Δt (odd field). Thus, two snap shots at different times of each of the two fields, even and odd, are then available. These four time-delayed fields are used to generate the most recent estimate of a pixel value pv(x,y), based data from the current field and another synthetic field, which changes at the frame rate of 60 Hz.

FIG. 5 is a schematic view of the apparatus, a part of the IT, that constructs synthetic pixel values from pixel values at adjacent pixel positions and in adjacent field lines, taking account of the presence or absence of rapid change in adjacent pixel values. The apparatus shown will handle one of the four channels of video image information Y, U, V or α. For purposes of discussion here the pixel value at horizontal pixel position $x_m$ (m=0,1,2, ..., 767) on video line Yn (n=0,1,2, ..., 523) at time t will be denoted Pv($x_m$, $y_n$; t). Even field lines correspond to lines $y_0$, $y_2$, $y_4$, ....., and odd field lines correspond to lines $y_1$, $y_3$, $y_5$, ... Thus, for example, the video system does not directly compute or display a pixel value pv($x_m$, $y_2$, t) in the odd field, although this synthetic pixel value may be needed for some display purposes.

For an arbitrary but fixed display time t=$t_0$, let $t_{-p}$=$t_0$−pΔt (p=1, 2, 3) be the three immediately preceding pixel rate time intervals (Δt∼74 nsec here, but Δt is generally unlimited). For illustrative purposes, consider the array of pixel positions shown in FIG. 6, where the pixels at positions ($x_m$, $y_n$) (m=0,1,2,3, ..., 767; n=0,2,4,6, ..., 524) are real pixels on the even field lines and the pixels at positions ($x_m$, $y_n$) (m=0,1,2,3, ..., 767; n=1,3,5, ..., 523) are real pixels on the odd field lines. When only data from the odd field (lines $y_1$, $y_3$, $y_5$, ...) are present, at time $t_0$, no pixel value pv($x_3$, $y_2$; $t_0$) is directly available. This last pixel value is often needed for some purposes, and a synthetic pixel value at this position p' (odd fields) is therefore computed. For y=$y_1$, and, separately, for y=$y_3$, the two real pixel values pv($x_3$, y; $t_0$) and pv($x_3$, y; $t_{-2}$) are compared by computation of a motion function mf($x_3$, y; t0) (such as a simple subtraction pv($x_3$, y; $t_0$)−pv($x_3$, y; $t_{-2}$)) for these two pixel values. The pixel values are fed to an LUT, which computes a motion function therefrom.

For example, one might form a four-bit output signal from the mf LUT which specifies the degree of motion observed between the two input pixels. Four bits allows up to 16 degrees of motion to be distinguished. The degree of motion assigned to a particular pixel is based upon the difference between the two pixel values (A-B).

The motion functions mf($x_3$,$y_n$,$t_0$), mf($x_3$,$y_{n-2}$,$t_0$) and mf ($x_3$,$y_{n-1}$,$t_{-1}$) (for n odd) are fed to a motion computer MCP that determines the degree of motion present and generates an output signal β($t_0$)=1 if no perceived motion is present currently at ($x_3$, $y_1$) and ($x_3$, $y_3$), β($t_0$)=0 if strong or rapid motion is currently present at at least one of these four real pixel positions. If intermediate strength motion is present at these pixel positions, the MCP generate an intermediate output signal $β_i$($t_0$)(0<$β_i$<1). The intermediate value β may be one of a spectrum of intermediate values lying between 0 and 1; for example, if the MCP output signal has four-bit resolution up to 14 (=$2^4$−2) different intermediate values $β_i$ may be generated by the MCP.

The synthetic pixel value of ($x_3$, $y_2$) at time $t_0$ is formed by $$pv'(x_3,y_2,t_0) = \tfrac{1}{2}(1-β(t_0))[pv(x_3,y_1,t_0))+pv(x_3,y_3,t_0)] + β(t_0)pv(x_3,y_2,t_{-1}).$$

FIG. 5 illustrates one embodiment of this approach for computation of synthetic pixel values.

The frame constructor in FIG. 3 also allows the system to lock down the contents of one to four of the field store signals so that a frame may be frozen. For example, one can freeze two consecutive fields (e.g., odd/even) of video and let the frame constructor algorithm constantly compare that frozen or reference frame to the incoming live video signals. This can be used to filter out backgrounds, as in motion keying in which the moving parts of the picture are extracted from the motionless parts. In this mode, the normal α channel frame constructor is disabled, and a new output α is generated based on the motion functions for each of the three components Y, U, V as follows:

$$α(x_m,y_n,t)=f(mf(x_m,y_n,t))$$

$$α(x_m,y_{n-1},t)=g(mf(s_m,y_{n-1},t))$$

where f and g are monotonic, single variable functions, each with a range [0,1]. The frame constructor has four preset modes; (1) normal, in which a full frame of video is constructed from the four fields as described above; (2) freeze all signals (Y,U,V and α), which can be used either for field freeze or frame freeze or as an adaptive freeze; (3) freeze α field only; and (4) motion keying, as discussed above.

The frame constructor hardware used here is quite complete and appears to take more care with these images than does any other unit now available. Some systems are field-based rather than frame-based; these systems use no frame constructor, or they merely copy the even field lines into the odd field line positions and perform their calculations based on only one of the fields. The result is often undesirable image quality in motion video. Other systems use a frame constructor but with one-bit arithmetic so that the switch between the "still" and strong motion limit cases is a hard switch and only equivalent pixels from two previous fields are prepared; the present system uses four-bit arithmetic so that as many as 14 intermediate motion situations can be distinguished from the two limiting cases of no motion and strong motion.

In anticipation that the video may be used for compression, wherein the size of the source images is reduced by a factor greater than one for video display, the image that issues from the frame constructor is pre-filtered by a vertical filter and a horizontal filter to avoid aliasing, twinkling, and other ills that motion video is heir to. To understand the importance of this, consider an image that is compressed by a factor of two in the horizontal and the vertical directions. One simple way to handle this is to sample every second pixel on a horizontal line and to blank out alternate pixels and alternate horizontal lines. In this situation, a one-pixel-wide line might disappear completely or might flash on and off as the picture moves. Our solution is to pass the signal through a low pass filter or to average two adjacent pixels together; this must be done before the image is compressed, because the process of compression would discard necessary video information. Too much filtering will blur the image so that it is important to limit the amount of filtering done here. The more pixels that are averaged together, the better will be the quality of the resulting image.

The IT includes a two-stage pre-filter, which filters the frame constructor output signal vertically (V Select) and then horizontally (H Select). Each filter is a 16×1 symmetric, finite impulse response (FIR) filter, and the result resembles a two-dimensional 16×16 filter but without the ability to independently vary some of the cross terms. The filter coefficients are determined by the source-to-target (S-T) Mathglue module shown in FIG. 3, whose input signals are controlled by the software. The software specifies, for each 1/60 second frame, what is to be the transformation from source or live object to the target or output video screen (S-to-T); this is equivalent to specifying the vertices of the raster polygon for each frame. Source-to-target Mathglue logic plus two T-chips determine that transformation down to the pixel level (with time intervals $\Delta t = 74$ nsec) and feed the necessary coefficients to four F-chips (FIG. 3) that lie downstream from the frame constructor, for filtering of the current signals.

Each T-chip includes several third order digital differential analyzers (DDAs), each of which can solve a third order differential equation in the coordinates x and y. The defining differential equations are downloaded by the software as a description of the change of the video signal for that frame; and the T-chip then integrates these equations across all the pixels in the frame image. Four defining differential equations are needed for the (horizontal and vertical) coordinates so that two T-chips are needed here. The T-chips and Mathglue module in the S-T section compute the derivatives $$\frac{\partial \Delta}{\partial x} \text{ and } \frac{\partial \Delta}{\partial y}$$

at each pixel in the source image. These derivatives contain the information required to select the appropriate pre-filter.

The filter coefficients specify the weights to be associated with each of the 16 neighboring input pixels that are averaged into a interpolated output pixel signal. The filter coefficients are pre-calculated to serve as sets of low pass filters with different bandwidths. To a large extent, the length of the filter (here 16, but this is optional and may be increased or decreased) determines the degree that the picture can be compressed before it appears to break up or to twinkle. In some of the better video image translators currently available, this breakup occurs at about ¼ the original image size. In the IT that is part of the subject invention, compression by a factor of up to 4 appears to be possible; with N filter coefficients used, compression, without image breakup, by a factor of up to N/2 would be possible.

The IT performs the transformations for video effects, such as flying the video or rotating the image, as well as facilitating composite operation of the paint brush onto the canvas in the paint mode. The IT contains two frame buffers (double buffers) that are used in an alternating manner. One buffer is written into from the filter board while the contents of the second buffer are being written to the output; then the two buffers swap functions for the next frame. The incoming video signal is written into the frame buffers from the filters during the horizontal blanking interval for the screen image, two lines at a time. Recall that with NTSC video, the horizontal line interval of 63.5 μsec includes some time to scan the active video on the screen ("H retrace") and some time for retracing to the start of the line ("H retrace"). During the retrace time, the beam is blanked so that no video signal is output; this is called the horizontal blanking time and is normally 10.9±0.2 μsec.

During each H active interval, one bank of eight FIFOs is loaded with two lines (each) of active video signal information (192 pixels each x 8 FIFOS=1536 pixels); each FIFO stores one fourth of the line. During the next line interval a second bank of eight FIFOs will be loaded with the next two lines of video data. During the next horizontal line blanking interval, the first bank will once again be written, and this pattern is repeated. Assume for definiteness that field M1 is being displayed. During the H retrace interval, two lines of data are written onto each of three identical frame buffers A, B and C associated with field M2. Sixteen pixel values, one from each of the FIFOs are written simultaneously onto A, B and C at corresponding positions in each buffer utilizing the static column address write capability of the RAMs. Here, static column mode dynamic RAMs may be used for the A, B, C buffers for each field rather than the more expensive static RAMs.

The read operation from a buffer requires full access of a 4×4 pixel neighborhood every 74 nsec as the read out sequence may not be in raster order. This requires very high speed RAMs; and to implement this three banks of identical dynamic RAMs A, B and C are sequentially selected in time so that each RAM need only cycle in a time 3×74 nsec=222 nsec. The use of a triple bank (A, B, C) of dynamic RAM's (DRAMs) as an effective static RAM is a novel feature here. The corresponding DRAM addresses, designated here as A-p, B-p and C-p, are written into substanially simultaneously with the same byte or word. The write operation is carried out quickly due to the static column mode of the DRAMs; but the operation of read from a DRAM is relatively slow, requiring as much as 200 nsec for completion of the read cycle. As the read commands arrive serially, the three banks of DRAMs are read sequentially from banks A,B,C,A,B,C,A,B, . . . so that each read operation in a given bank, once begun, has adequate time for completion before answering another read command. That is, if a sequence of read commands arrives that requires reading of the contents of RAM addresses 27,14,89,24,38,11,53 . . . , the contents would be read as follows: 27 in A, 14 in B, 89 in C, 24 in A, 38 in B, 11 in C, 53 in A, . . . . Two banks, rather than three, may be used here if the data read times in the DRAM are no more than about 110 nsec. Such DRAMs are currently available, but they are much more expensive than the slower-read DRAMs for which three banks of DRAMs are used. The frame buffers can be addressed as two independent buffers, each 768 pixels wide, with buffer M1 being 672 lines long and buffer M2 being 692 lines long. These can also be combined as one contiguous buffer 768 pixels wide by 1364 lines long. These addressing modes are accomplished by a novel address computation scheme which permits lines of length 768 instead of the easier 1024. Having lines of length 768 allows both 525 and 625 line television systems to be accommodated by the same hardware.

The target-to-source module (T-S) shown in FIG. 2 determines which pixels are read out and in what order, this is in the inverse of the transformation visible to the user viewing the output. The T-S Mathglue module also uses two T-chips and Mathglue logic, much as the source-to-target module does.

In general, a pixel location in the target will not map precisely to a pixel location in the source in the T-to-S mode so that some interpolation is required here. The interpolator interpolates a video value by averaging, using appropriate numerical weights, over a 4×4 (more generally, M×N with M, N≳2) pixel area that is approximately centered at the intermediate pixel position p'(x,y) whose value is to be gauged, as illustrated in FIG. 7. The effective position shift occurs through adjustment of filter coefficients associated with adjacent pixels in the chosen 4×4 area. These filter coefficients are pre-calculated and loaded into the coefficient ram by the computer. Fractional raster addresses for p'(x,y) are computed in the T-to-S Mathglue module and are used to select the optimum filter to construct the pixel value pv(x,y).

Border Insertion

Border insertion on a screen is a task of some complexity, even for a simple rectangular border. With reference to FIG. 8, consider the rectangular border B to be superimposed on the screen S. FIG. 9 illustrates how the border image is generated in one dimension (horizontal), if the left border transition is to occur between horizontal pixel positions $x_1$ and $x_4$ and the right border transition is to occur between pixel positions $x_5$ and $x_8$. A first image $I_1$ is generated for which the image function is $$\begin{aligned}I_1(x) &= 0 & x < x_1 \\ &= \frac{x - x_1}{x_2 - x_1} & x_1 \leq x \leq x_2 \\ &= 1 & x_2 < x < x_7 \\ &= \frac{x_8 - x}{x_8 - x_7} & x_7 \leq x \leq x_8 \\ &= 0 & x_8 < x.\end{aligned}$$

A second image $I_2$ is generated for which the image function is $$\begin{aligned}I_2(x) &= 0 & x < x_3 \\ &= \frac{x - x_3}{x_4 - x_3} & x_3 \leq x \leq x_4 \\ &= 1 & x_4 < x < x_5 \\ &= \frac{x_6 - x}{x_6 - x_5} & x_5 \leq x \leq x_6 \\ &= 0 & x_6 < x.\end{aligned}$$

These two images are subtracted from one another to produce a difference image function $I_3 = I_1 - I_2$ are shown in FIG. 9. Where $I_3$ is positive, the border function is active. Inclusion of the four ramps in $I_3$ allows a reasonably smooth transition (up to eight bits resolution) between the border and the picture enclosed by the border. The slope of the ramps controls the softness or apodization of the border. The slope discontinuity points of the images control the width and symmetry of the border transition regions. For a two-dimensional rectangular border, a second pair of analogous images $I_4$ and $I_5$ is set up in the vertical direction and a difference image function $I_6 = I_4 - I_5$ is formed; and the composite image $I_3 \cdot I_6$ would define the two-dimensional border. The composite image $I_3 \cdot I_6$ controls two multipliers, one for the intensity of the border and a second multiplier that controls the intensity of the image enclosed within the border that is to be mixed on. A computer controlled LUT is inserted between the border arithmetic and these two multipliers to provide nonlinear mixing controls. In particular, inclusion of LUTs allows shaping of the ramps which are the direct output of the border arithmetic T-chip. Such ramps if used directly cause the phenomenon call MACH bonding at the start transition points of the ramp. Borders that are defined by curves of mixed degrees up to three in the coordinates x and y can also be inserted by the T-chip, using an extension of this process in which the border definition points $x_i$ (i = 1, 2, ..., 8) vary with video screen coordinates x and/or y. In addition to transparency information for a border, the system receives specification of the border color to be displayed, through the Y, U and V channels.

The two linear ramps on each of the curve $I_1$ and $I_2$ in FIG. 9 may be generated using clamped (from below) and clipped (from above) output signals from a DDA. For a constant input signal (of magnitude $k_1$) to the DDA, the output signal is of the form $k_1(t - t_1)$ where t is the time variable of integration and $t_1$ is the time at which the input to the DDA commences. The horizontal coordinate x shown in FIG. 9 may be made to correspond to the time variable t issuing from the DDA by a linear relation such as $t = k_2 x + t_2$, where $k_2$ and $t_2$ are constants. The output signal of the DDA is then clipped from above at a predetermined value $I_{1H}$ and is clamped from below at a second predetermined value $I_{1L}$ by techniques well known in the art. The clipped/clamped output signal from this DDA then becomes $$\begin{aligned}\tilde{I}_1(t) &= \min[I_{1H}, \max[I_{1L}, k_1(t - t_o)]] \\ &= I_{1L} & (t \leq t_1 + I_{1L}/k_1) \\ &= k_1(t - t_1) & (t_1 + I_{1L}/k_1 < t < t_1 + I_{1H}/k_1) \\ &= I_{1H} & (t_1 + I_{1H}/k_1 \leq t).\end{aligned}$$

Taking account of the linear correspondence of x and t, this may be rewritten as $$\begin{aligned}I_1(x) &= \tilde{I}_1(k_2 x + t_1) \\ &= I_{1L} & (x \leq [t_1 - t_2 + I_{1L}/k_2) \\ &= k_1 k_2 x + k_1(t_2 - t_1) & ([t_1 - t_2 + \\ & I_{1L}/k_1]/k_2 < x < [t_1 - t_2 + I_{1H}/k_1]/k_2) \\ &= I_{1H} & ([t_1 - t_2 + I_{1H}/k_1]/k_2 < t).\end{aligned}$$

The controllable variables here are $t_1$ and $k_1$, and one easily verifies that the choices $$k_1 = (I_{1H} - I_{1L})/k_2(x_2 - x_1)$$

$$t_1 = k_2 x_1 + t_2 - I_{1L}/k_1$$

will reproduce the desired curve $$\begin{aligned}I_1(x) &= I_{1L} & (x \leq x_1) \\ &= I_{1L} + (I_{1H} - I_{1L})\frac{x - x_1}{x_2 - x_1} & (x_1 < x < x_2) \\ &= I_{1H} & (x \geq x_2).\end{aligned}$$

Each of the other linear ramps is similarly generated.

Frame Store/Keyer Module The frame store/keyer (FSK) module is an optional part of the full system and provides three major functions in one hardware module: (1) virtual canvas (VC), which uses a large amount of memory for painting a canvas that is much larger than a single frame, and it also provides various memory management functions; (2) video buses and crosspoint switches that control electronic traffic in the system by providing for flow of the video signals Y, U, V, $\alpha$, Z and certain stencil signals, among others; and (3) keyers, which are video mixers that allow combination of multiple video signals with independent transparency factors that are used in image painting and composition.

Figure 10:
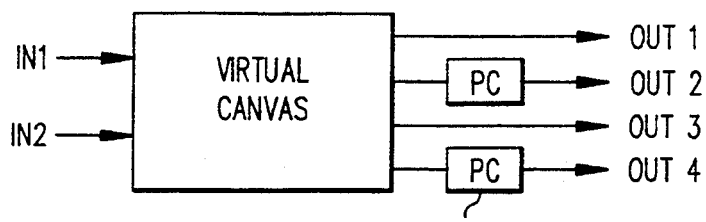
FIG. 10 is a schematic view of the input and output terminals of the virtual canvas (VC) module.

Virtual canvas is a large memory array in which the video signals Y, U, V and a can be stored and may be used to hold a large canvas that is the equivalent of 6-24 NTSC frames for painting an image or for panning across a scene. VC can also be used to hold the undo buffers, multiple stencils, and menus, all for the painting operations. For formation of composite images, VC can be used to hold the background or multiple layers of images to be composited together, along with the transparency factor associated with each layer. As illustrated in FIG. 10, two input terminals plus four output terminals are available for use with VC, all operating in real time. Two of the output signals pass through lookup tables (LUTs) to provide for effects such as image color mapping, displaying a stencil and similar tasks. The memory array is addressed indirectly by the CPU through a tile map (one tile equals 32 contiguous horizontal pixels by eight contiguous vertical lines) that provides considerable flexibility.

Figure 11:
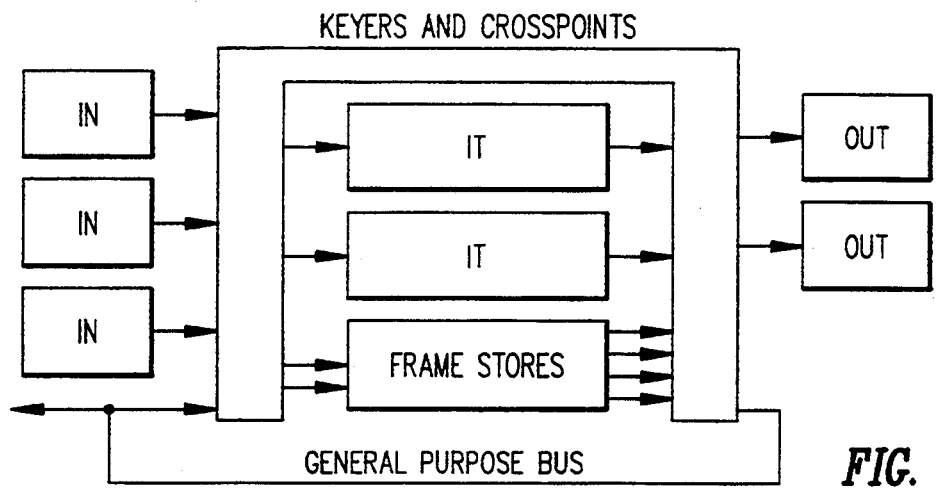
FIG. 11 is a schematic view of the FSK buses and crosspoint switches.

The video bus arrangement is shown in FIG. 11. The FSK straddles everything in the system, allowing all signals to flow in and out of the FSK and controlling the intersections. In this embodiment, a video bus submodule has three input terminals and two output terminals; the cumulative limit is four I/O channels. Two additional buses internal to the FSK provide additional paths for keyer and stencil information. The FSK includes a large number of crosspoint switches to interconnect the buses, but in the current embodiment these switches do not include all possible permutations of interconnections. The particular crosspoint connections chosen provide maximum flexibility and include all interconnections that a user might reasonably require. If additional applications are identified, additional crosspoint switches can be added.

Figure 12:
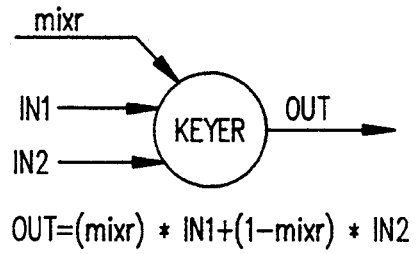
FIG. 12 is a schematic view of a keyer in use to mix two incoming signals.
Figure 13:
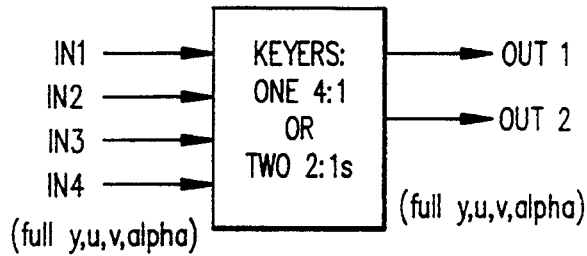
FIG. 13 is a schematic view of the input and output terminals of a four-to-one keyer or, alternatively, a pair of two-to-one keyers.

The keyers allow mixing or compositing of video signals. As illustrated in FIG. 12, a mixture of two input signals IN1 and IN2 is controlled by the mix ratio mixr that is fed to a third input terminal of the keyer and the output signal OUT=(mixr)*IN1+(1−mixr)*IN2, that is the mixture of the two input signals. More generally, a keyer can be dynamically reconfigured as a pair of two-to-one mixers, with two pairs of input terminals and two output terminals, or it may provide a single four-to-one mixer with four input terminals and a single output terminal, as illustrated in FIG. 13. Although the current implementation is limited to a maximum of two four-to-one keyers, in general, one could build nx1 keyers by a simple extension of the concepts presented here. In FIG. 13, for example, two input video signals, each containing the four channels Y, U, V and $\alpha$, may be composited or mixed or combined into the single output channel signal also Y, U, V and $\alpha$, under control of the mix ratio mixr. Using this approach, one can effectively paste an object over a background, or blend two images with variable transparency, or impose a stencil masking part of the canvas from the brush, or perform similar maneuvers.

Examples of uses of the upper keyer (two-to-one) in FIG. 13 include the following. A one-dimensional smooth scroll may be used for titles or characters as well as general video signals; this involves shifting the video in sub-pixel increments by variably mixing between current and pixel-delayed values to give a smooth effect. A chroma-key may be used with a mask; the chroma-key involves extraction of an $\alpha$ signal from the chrominance information, wherein a certain range of colors (e.g., a range of blue) could be defined as background and anything other than this range of colors produces an opaque image (1−$\alpha$=0). The upper keyer may be used for a non-additive mix of two video signals, and it may be used in painting, wherein the brush is composited onto the canvas, where a predetermined stencil allows this. A stencil may allow full eight-bit resolution and thus allow for partial compositing as well.

Use of the lower keyer also permits one-dimensional scroll independent of the upper keyer scroll. Other lower keyer uses include combination of two video signals based on an overall $\alpha$ signal, and serving as an externally controlled key between two video signals.

Figure 14:
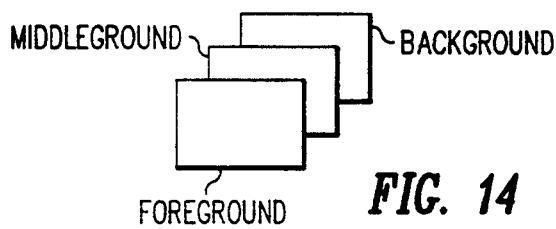
FIG. 14 is a schematic view illustrating use of a foreground, a middle ground and a background in a composite view.

A single four-to-one keyer can provide two-dimensional smooth scroll (horizontal, vertical or diagonal); combine up to four layers of image based on the corresponding $\alpha$ information; provide stencil display; provide a paintbrush with an active stencil; provide direct painting to the canvas; or paint in any three other video channel signals. For example, as illustrated in FIG. 14, a four-to-one keyer could provide a foreground image, a mid-ground image and a background image, each with separate, independent transparency factors. The background might be a city landscape with skyscrapers, the foreground might be other city buildings closer to the viewer, and one or two mid-ground images might provide for action such as an airplane flying at middle distances between the buildings. Note that any or all of these layers could be line input video or painted panels generated in the IT and stored for use in the VC.

With reference to FIG. 10 again, note that VC supports six simultaneous, real time live video access channels, with two being allocated for input signals and four for output signals. The six channels are produced by time slicing on the bus. The control logic, which is based on eight-bit units, would support eight simultaneous channels, but in the current embodiment with the timing margins available only six such channels are provided. The VC input signals can include the output signals from the keyers, the output signals from the ITs, another signal IN3 and bus signals such as BUS2 shown in FIG. 15. In a similar manner, the output signals of VC can be fed to the input terminals of the keyers or to the IT. VC also provides pseudo-color LUTs that provide translation of each of the four video signals Y, U, V and $\alpha$. The tables allow any one of the four 8-bit input signals Y, U, V and $\alpha$ used as a lookup address to trigger a corresponding 32-bit output signal, where the table of contents is loaded by software. Double buffers, with both working copies and shadow copies, are available so that the software can load the tables at any time, even during active video output from the VC, without causing delays or other difficulties in the video; the working copy is updated from the shadow copy during the vertical blanking or interrupt interval. To bypass these LUTs, the contents are merely set up with identity maps.

One anticipated use of these tables is in colorizing or translating recorded colors to false colors. As noted above, the LUT can take any of the four 8-bit signals Y, U, V or $\alpha$ and convert it to a full 32-bit output; the effect is to use 256 false colors, determined by any one of the four 8-bit input channels, to index into any of $2^{32}$ full 32-bit Y, U, V, and $\alpha$ video color and opacity signals. Another anticipated use of these LUTs is to generate a stencil display. Although the stencil and the paint application is only $\alpha$ information, the user may sometimes wish to view this. In this mode, the $\alpha$ input signal is used to trigger Y, U, V and $\alpha$ output signals from the LUT.

Another anticipated use for these LUTs is in color cycle animation, in which several frames of video are to be played back with an animation effect, such as water flowing through a pipe. The video frames are typically unchanged, but the color information is changed for each frame by changing the mapping in the LUTs; the effect is moving color or animation. Using the two LUTs plus four shadow copies plus four input signal components (Y, U, V, $\alpha$), a total of $2 \times 4 \times 4 = 32$ frames can be produced for an animation sequence by simply changing certain LUT pointers without reloading any of the LUT contents themselves. Arbitrarily long sequences can also be produced by software reloading of the LUT RAMs. Color cycling is commonly used to show flow of material such as water in a pipe or data in a computer, to display reflection highlights or glints moving across an image, to display twinkling stars and similar effects.

The video system implements full 4444 Y, U, V, and $\alpha$ throughout its video path (plus z or log z in some places). This is true within the graphics applications and paint also. In particular, the paint hardware and software treat $\alpha$ as just one more component within the video. Other paint systems have included some aspects which are similar to $\alpha$ (e.g., stencil), but they treat these as special cases and use them only for a specific purpose. However, the system will perform all painting operations to $\alpha$ just as it does to Y, U, and V. For example, in choosing the brush color with sliders, there is a slider for $\alpha$, just as there are for Y, U, and V (or HSV or whatever color specification numbers are used). The hardware compositing of the brush into the canvas with the F-chip composites $\alpha$ just as it does Y, U, and V. Thus, the artist will automatically build up the matte component as she or he paints, and can, if she or he so chooses, vary that matte component and customize it just as is done for the color and luminosity. The resulting output can be used to combine (key) the painting with other video, live or still or character generator output or external system input. Several detailed technical issues arise in the process of implementing such a full $\alpha$ paint system. These are solved with a combination of hardware and software.

The video system includes a character generator application that produces highest-quality rendered characters that are composited with other video sources (live or still). The characters begin as outline fonts (e.g., from a bit stream) using arcs and lines to define the outlines of each character and symbol in each font. The font renderer, within the character generator, reads the outline format for each character and renders it into a form that can be placed into, or composited with the F-chip into, the full four-component (Y,U,V,$\alpha$ in a 32-bit) frame buffer. This is done in real-time, as the user types in or otherwise requests characters to be added to the video. In order to achieve the real-time response, three key aspects are used: (1) the compositing is done via the F-chip; (2) once rendered, a character is cached (up to the cache memory limit) so that the next time the same character is used it need not be re-rendered. Such caches can also be saved to and restored from disk; and (3) the rendering is done into the $\alpha$ channel only, so the output need only be eight bits, reducing the processing time and the size of the output for storage and transfer within the system. Once rendered into the $\alpha$ channel, the character can be colored (by compositing, via the F-chip, a solid color input from a register with the canvas), or can be used as a "see-through" character to show video through the place where the character would be, as a shadow (as in drop shadows). All character generation is done with this technique into both foreground and background areas, which are then combined to produce varied effects including, e.g., neon glows (background very much fuzzed out), drop shadows (background black or gray, slightly offset from foreground), fuzzy shadows for a feeling of three-dimensionality, etc. The basic idea of rendering into the $\alpha$ channel not only makes real-time character generation possible, but also facilitates many of the effects used in the character generator.

The physical memory array consists of 256 dynamic RAMs (DRAMs), with either 256 KB or 1 MB memory per chip. The smaller RAM provides eight Mbytes or two Mpixels for information storage. One format uses 736 horizontal pixels for frame width and 484 lines for frame height or 356,224 pixels per frame. Using a 256 KB RAM the VC allows approximately 5.89 frames; with the 1 MB RAM, a total of 23.55 frames is available.

Logical addressing, as sensed by the CPU and as used to generate video input and output signals, is indirect. A tile map, which is a two-dimensional paging system similar to many one-dimensional virtual memory paging systems, is used here for memory addressing. As noted above and illustrated in FIG. 16, a tile is 32 contiguous horizontal pixels in width by 8 contiguous vertical lines in height; these numbers were chosen to provide divisibility into both the NTSC and PAL frame dimensions. Tile size has small enough granularity to provide much flexibility and large enough granularity to avoid the use of ridiculously large amounts of hardware. Each tile can be individually mapped so that, for example, the tiles that contributed to the signal will not necessarily come from memory that is physically contiguous in the frame store and may include tiles scattered across the frame store landscape. This allows one to quickly move parts of the video image by simply changing the pointers rather than by the slower operation of actually copying memory.

As illustrated in FIG. 16, the entire physical address space consists of $4K \times 4K$ pixels or 128 (horizontal) by 512 (vertical) tiles. Each tile is assignable to any one of the six video channels, with no restrictions on order or on overlap. For example, a single tile could be mapped to an entire video channel where all pixels in that tile represent a single reference color to be used in setup or in compositing or creation of a texture.

Each of the six video channels consists of an array of up to $1K \times 1K$ pixels, which is 32 horizontal tiles by 128 vertical tiles by or 4096 tiles. This is a larger address base than is actually needed; actual video channels are about 736 pixels wide by 486 lines high (525 lines, if vertical blanking time is included). The PAL standards for Europe require 574 lines (active) out of 625 lines. Each of the tiles that comprise the video channel information can be mapped independently to any of the physical tiles on the screen. The mapping of tiles into the video channels is specified by a tile map, which is RAM-loaded by computer access and may be read by any of six display address generators. This mapping operates on a double-buffered RAM so that software can load the shadow copies at any time without concern about video delay or other difficulties, and the working copies can be updated during the vertical blanking interval. The format of the tile map is a two-dimensional array, with the index specifying the tile or tiles in the logical 1K×1K channel and the contents or output signal of the array indicating the physical tile or tiles that fill that part of the logical channel. In this manner, the hardware can scan continuously down the input signals to the array. The tile map format is specified differently for address or input information, which utilizes 16 bits, than for contents or output information, which utilizes 19 bits. The bit assignments for the address mode and the contents mode are shown below in Table 1.

TABLE 1

Tile Map Format

| | Meaning |
|---|---|
| Address Bits | Which byte (Y,U,V,$\alpha$) for byte addressing within a pixel |
| 0–4 | $x_{tile}$ (0–31) |
| 5–11 | $y_{tile}$ (0–127) |
| 12–14 | channel (0–5 currently) |
| 15 | tile map TM0 or TM1 (double buffer spec.) |
| Contents Bits | |
| 0–15 | tile address |
| 16–19 | choice of special attributes such as switching between two tile maps, etc. |

A video channel output from VC can be smoothly scrolled in one dimension or two dimensions, for example, along any diagonal line. Smooth scrolling uses the keyers to bi-linearly interpolate between two pixel values in order to shift pixel values by sub-pixel increments. For horizontal scrolling, each pixel value is averaged with the preceding pixel value by means of a simple time delay. For vertical scrolling, two VC outputs must be used, with the output of one line time delayed so that the keyer can average the two vertically adjacent pixel values. For diagonal scrolling, both of these time delay mechanisms are used.

The control registers for VC output video channels are similar to the T-chip P-files. Eight registers are used, one for each of the six channels plus two spare registers for possible expansion. Each register set for a single VC output consists of the following information: $x_{start}$ (starting pixel of a horizontal line); $y_{start}$ (vertical starting line); $x_{inc}$ (increment to be added to current x value for each pixel); $y_{inc}$ (increment to be added to current y for each line); $x_{scroll}$ (increment to be added to current x for each frame change); $y_{scroll}$ (increment to be added to current y value for each frame change); $x_{current}$ (current x value or pixel address); and $y_{current}$ (current y value or line address). At the beginning of each frame: (1) $x_{start}=x_{start}+x_{scroll}$, (2) $y_{start}=y_{start}+y_{scroll}$, and (3) $y_{current}=y_{start}$. At the beginning of each horizontal line; (1) $y_{current}\rightarrow y_{current}+y_{inc}$; and (2) $x_{current}=x_{start}$. At each pixel within a horizontal line, $x_{current}\rightarrow x_{current}+x_{inc}$.

This formalism generates addresses for output to the video channels and provides some flexibility for the scroll operation. All addresses are logical channel addresses that are interpreted through the tile map to provide physical addresses. Each line ends with the horizontal blanking pulse, which should occur after 23 consecutive horizontal tiles (736 consecutive pixels). One register contains two 3-bit values, which corresponds to one of the keyers, with each of six values specifying one of the six channels to be used for the fractional input for the scroll operation.

Figure 15:
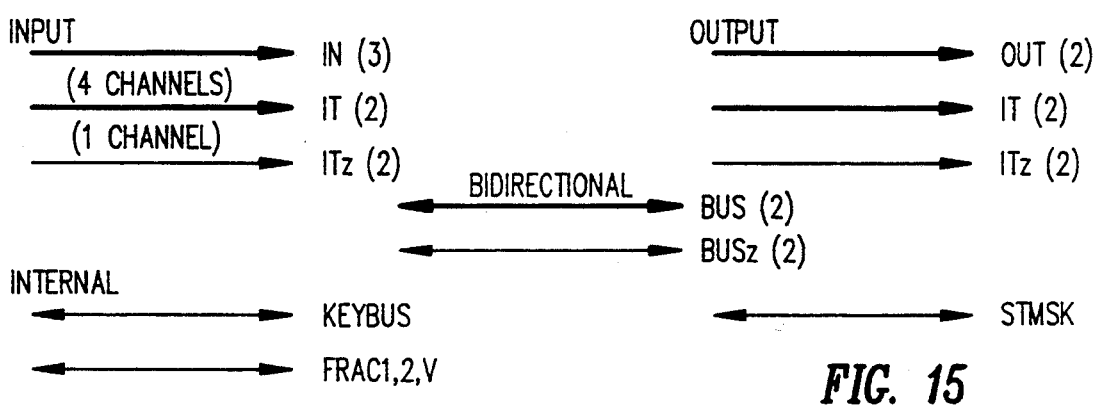
FIG. 15 is a schematic view of a general set of keyer buses.

The FSK acts as a conduit connecting everything to everything within the system. FIG. 15 illustrates the buses that exist within the FSK. The lines IN1, IN2, IN3, IT1, IT2, OUT1, OUT2 and the bi-directional lines BUS1 and BUS2 each carry four channels (Y, U, V, and $\alpha$). The channels ITZ(1-2), BUS1Z, BUS2Z, KEYBUS, FRAC1, FRAC2 and STMSK each carry only one channel. The three input buses IN1, IN2 and IN3 are driven by the three input units in the system, with each bus delivering a live motion channel of video signals from some external source such as the camera, a motion store disk or RAM, or other similar source. The two output buses drive the two output units that generate output signals to be delivered elsewhere. Recall there are a total of four I/O units in the system, with a maximum of three input terminals and a maximum of two output terminals. The IT buses connect to the input and output terminals of the two ITs that may reside in the system.

Each of the IT and BUS bus lines carries a fourth channel for z or depth information, transmitted in the form of $\log_2(z)$ with 24-bit precision. The ITs generate the z information when transforming incoming video signals. The z information, together with the Y, U, V, and $\alpha$ information may be transmitted at a full rate of 13.5 MHz for each channel in a 44444 format. This information can be used to combine transformed images biased on the relative position of the images in three dimensional space, thus automatically generating the illusion of one image slipping behind another or even passing through it. This information can be stored/retrieved from the VC or to/from external interface (CCIR601).

Internal buses on the FSK carry information between the FSK components. Keybus carries a processed $\alpha$ channel, also called a key signal, to allow storing into VC and retrieving from VC the computed $\alpha$ information from the keyer; this "processed" information is already in a form suitable to be fed directly to the F-chips in the mixer. Keybus input signals can be the upper keyer's coefficient compute output signal(s) and the VC output signals. Keybus output signals can be the lower keyer's coefficient compute input signal(s) and the VC input signals. The STMSK bus similarly carries an $\alpha$ signal to be used by the stencil for painting or for masking during a chroma key interval. The STMSK bus input signals can be the VC output signals; the STMSK bus output signal is fed to the upper keyer coefficient computation circuit. The FRAC buses carry fractions to be used for smooth horizontal, vertical or diagonal scrolling, allocatable dynamically.

Video timing is critical whenever signals from different sources, or signals arriving by different paths, are combined. If the signals are slightly out of phase, any switch from one signal to the other or the combining of one with the other will reveal timing mismatches that will be manifested as distortions on the video screen.

Since the keyers function as combiners of video signals, it is important to insure correct timing of all keyer input signals. At the keyer input terminals, the video channels should be in phase within the digital tolerances, which are 74 nsec per pixel. Similarly, system timing should produce output signals on the output buses that are within digital tolerance of one another. The timing is handled by software control and can be handled by one or more methods that are well known in the art. This timing control, implemented to insure that corresponding signals are in phase, uses techniques that are well known in the art.

The cross point switches shown in FIGS. 17 and 18 interconnect various data paths. Ideally, all input buses and bidirectional buses could be connected to all output buses and bidirectional buses; but space limitation imposes some restrictions here. FIG. 17 illustrates the connections made by the cross point switches in one embodiment of the system and shows the input buses that are connected to the four input terminals of the keyers, denoted K1, K2, K3 and K4.

At the output of the keyers a 2×2 cross point switch is also provided, as illustrated in FIG. 18. Among other things, this allows the two outputs of the keyers to be exchanged. The backplane buses and crosspoint operation are multiplexed (2:1) at 27 MHz, but the F-chip limits the keyer to demultiplexed signals at 13.5 MHz. The cross point output shown in FIG. 18 also multiplexes the signals, with the demultiplexing for input to the keyers occurring within the keyer block.

The FSK keyers mix together video signals either through two-to-one keyers or through a single four-to-one keyer. In the dual (two:one) mode, the two keyers are not interchangeable and are referred to here as the upper keyer and the lower keyer as illustrated in FIG. 19. The upper keyer is the more powerful of the two and can act as a generalized chroma keyer with Y, U and V channels and can extract a mix control signal from any dependency on Y, U and V.

In all modes, the keyers mix all four channels Y, U, V and $\alpha$ so that the resulting composite signal carries its own $\alpha$ signal and can be recomposited subsequently with any other video signal. All four channels of video signal are passed through a delay line, as shown in FIG. 19, to compensate for the time required to compute the mix coefficient for this or any other part of the composite signal. In FIG. 19, the upper keyer mixes signals K1' and K2' and the lower keyer mixes signals K3' and K4'.

In the dual (two-to-one) mode, the lower keyer is the simpler and less powerful keyer. In FIG. 19, the SEL module (for select) allows the system to select one of three inputs to be used to compute the mix coefficient. The mixer here is two F-chips operating in the quad two-to-one mixer mode, with two of the four associated mixers in code F-chip mixing one of the four channels Y, U, V and $\alpha$.

The video signals Y, U, V and $\alpha$ for a given pixel are actually stored in the system in scaled format, in the form Y*$\alpha$, U*$\alpha$, V*$\alpha$ and $\alpha$. For the case of full opacity, $\alpha=1$, this makes no quantitative difference; for $\alpha \neq 1$, this format saves the time required for a multiplication, and sometimes a division. For the lower keyer, the Y channel mix equation might be $$Y_3 * \alpha_3 + Y_4 * (1 - \alpha'_3).$$

The FRAC input shown in FIG. 19 is used for scrolling. The key compute block computes the weights of each of the two input video signals, assuming that the second signal is the same as the first but is delayed by one pixel or one line for horizontal or vertical scrolling respectively. The resulting output signal is the input signal, shifted by a fraction of a pixel, namely FRAC. For example, for a fraction sequence of 1.0, 0.75, 0.5, 0.25, 0, the output weights for the first and second video signals would be the sequence (1, 0), (0.75, 0.25), (0.5, 0.5), (0.25, 0.75) and (0, 1). This may also be visualized as a cross-fade between the incoming signal and the same image delayed by one pixel time. The FRAC signal allows five-bit resolution so that sub-pixel addressing down to 1/32 of a pixel is available here.

Chromakey refers to the process of extracting an $\alpha$ MTX coefficient from the video information (Y, R-Y, B-Y) in a video signal. For example, a process such as Ultimatte supports use of a particular shade of blue or green as backgrounds in a composite signal. The chroma-keyer recognizes that designated shade of blue or green and transmits an apacity coefficient $\alpha=0$ (fully transparent) for all such areas, and coefficient $\alpha=1$ (fully opaque) elsewhere, with smooth transitions between the two regions. Luminance key refers to a similar concept except that only the input luminance value Y is used. The upper keyer can generate a key signal based on a combination of luminance, chrominance, and the $\alpha$ or the stencil signal.

Figure 20:
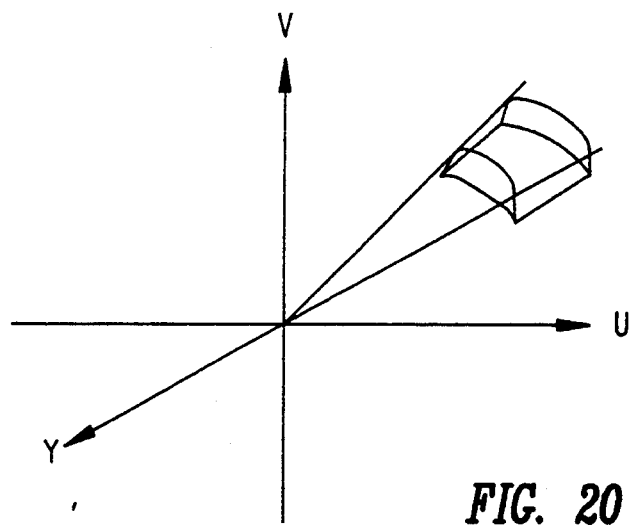
FIG. 20 is a graphic view illustrating the use of ranges of the variables Y, U and V to delimit a small volume in luminance/chrominance space.
Figure 21:
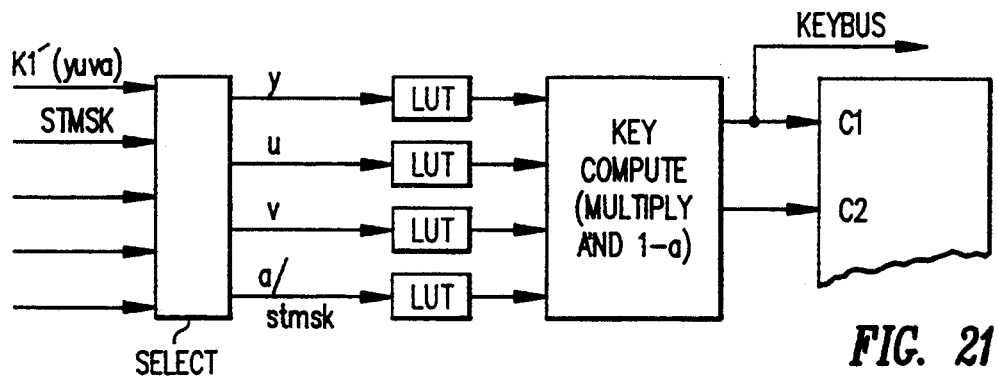
FIG. 21 is a schematic view of the luminance/chroma keyer computation ("key compute") module.

FIG. 20 illustrates a three dimensional plot of Y versus U versus V, the combined luminance and chrominance information. In FIG. 20, the indicated volume represents a range in (Y, U, V) coordinates that the keyer will recognize and key out of the picture by setting the microcell=0. This keyer may be positioned at various points within the data flow through the system by use of busing and cross point switches. One placement position is upstream of the IT to generate an $\alpha$ signal for an input that arrives at the IT without a specified $\alpha$ signal of its own. Where the upper keyer is used as a luminance/chrominance keyer, the upper keyer appears as in FIG. 21. Each of the LUTs is equivalent to a full 256-location LUT and is RAM-based so that software can load any mapping or function between the input Y, U, V, $\alpha$ signals and an output key signal. In order to simplify the key compute hardware here, the LUT actually transmits the logarithm (base 2) with 12 bits resolution so that the signals can be added rather than multiplied; a separate anti-logarithm LUT is provided for reconversion before the signal is fed to the F-chip in the mixer. This nuance is optional but allows a saving in hardware and additional flexibility, particularly when multiple multiplication operations must be cascaded. The anti-logarithm LUTs provide output values f in the range $0 \lesssim f \{ 1$ for use as a mix ratio. In the key compute block, the outputs of the logarithm LUTs are multiplied for subsequent use. Where multiplications must be cascaded, one can carry the same 12-bit accuracy for all logarithms of multipliers and multiplicands; where logarithms are not used, one must carry a larger number of bits to preserve the accuracy in the final product. Logarithms are also very useful here for computing quotients (requiring divisions), squares and square roots. Logarithms of variables are used in S-T and T-S transformations and in the keyers and may be used elsewhere.

The input $\alpha$ channel information is often irrelevant in chroma keying so that the $\alpha$ channel input signal to the LUT can be used for some other signal such as STMSK. This allows one to combine the automatic extraction of key information, based on luminance/chrominance, with a hand-painted stencil that can override an inconsistent background signal for appropriate regions of the screen.

Consider now the use of the upper keyer in the paint mode. Here one assigns signal K1' to the brush α (received from IT) and signal K2' to the canvas α (received from VC) and STMSK to the stencil α. Here, the user paints with the brush onto the IT image, as illustrated in FIG. 14. This image is composited onto the canvas by the keyer using the brush α.K1'. However, a stencil is available to mask off or protect some areas of the canvas from the brush; the stencil overrides the brush for these regions. The stencil signal is stored in VC and is fed to the keyer through the STMSK. The key compute block multiplies the brush α by the signal (1-stencil value); and one keyer forms the composite signal of the brush onto the canvas with stencil override. In this scheme, the brush from the IT can be thought of as a pane of glass ("IT glass") placed on top of the canvas upon which the user paints.

Figure 22:
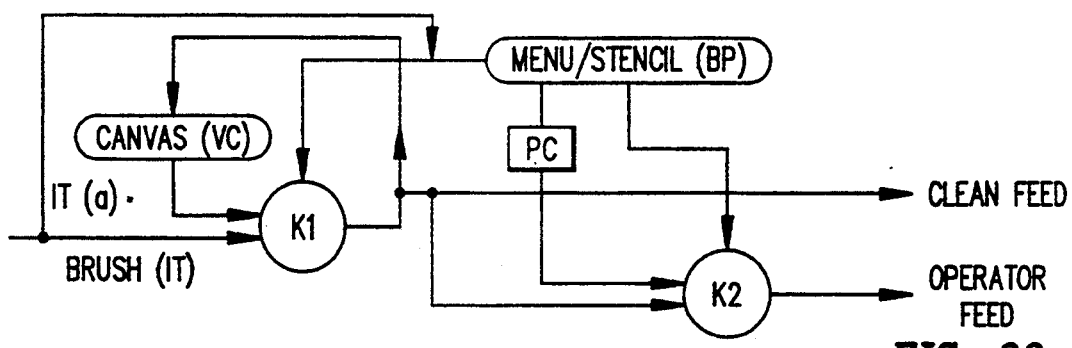
FIG. 22 is a schematic view of the interaction of virtual canvas (VC), the Image Translator (IT) and a stencil through two keyers to form a composite picture of the canvas, the paint brush image and a stencil controlled by the operator.

The above operation handles substantially all of what is necessary for the paint mode. Although it includes the override affect of the stencil, the system does not include a display of the stencil (e.g., as a semi-transparent overlay on the screen). Conceptually, the full paint mode operation is illustrated in FIG. 22, where keyer signal K1 composites the brush or IT glass onto the canvas and provides the brush α signal, using the stencil to mask part of the canvas. This produces a signal that is output on the "clean feed" terminal and may be broadcast directly. Keyer signal K2 composites the operator feedback information onto the clean feed signal; such information might include the menus and the stencil display. The stencil display is generated through a pseudo-color LUT on a VC output terminal. The menus themselves are tile-mapped into the stencil area. The advantages of this approach include the possibility of stencil display, for the menus may now have a separate α and may be semi-transparent, showing the canvas behind them. One disadvantage is that two keyers are required here.

Note the inclusion of a feedback path from the output of K1 to the VC canvas. This is used when the operator wishes to actually save the IT glass image that is composited onto the canvas.

Most of the paint operation could be handled with one keyer, all but the stencil display. Compositing the brush onto the canvas, using the stencil, and displaying the menus can all be done with a single keyer as described above. However, the stencil display is not a hard switch (on/off) but must show a semi-transparent stencil with canvas showing through; and this requires another keyer. Further, the mixing of the IT glass image (brush) with canvas is also a semi-transparent mix. Thus, the full set of operations requires either a three-input keyer or a pair of two-input keyers. Although the paintbrush is shown here as an IT function, an alternative embodiment would use one of the VCs as the receptacle for the brush; this requires computer painting in the VC.

Figure 23:
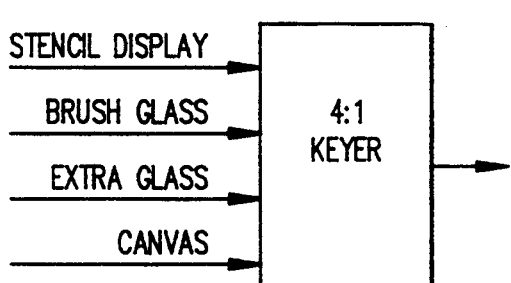
FIG. 23 is a schematic view illustrating use of a four-to-one keyer to combine a stencil, a paintbrush image, a canvas image and an additional image to form a composite view.

The last keyer mode uses a single keyer with four inputs and one output. This can be used for two-dimensional or diagonal scrolling, or for four-layer composite images. Any four keyer inputs can be composited, and FIG. 23 illustrates compositing by an example. FIG. 23 illustrates the "full paint" mode using the keyers in a four:one mode. This produces only a single output (no clean feed signal), but otherwise this offers the full paint mode functionality and further provides an extra glass for another image. When composite images are formed as in FIG. 23, the order is K1' on top, . . . , and K4' at the bottom. The Cascade In signal, shown in FIG. 19, carries information on how much of the transparency remains after the two top layers have been set down; this signal is fed to the bottom half of the full keyer, where it multiplies the mix ratio that would have otherwise have been produced by the remaining transparency number. For example, if the topmost layer (K1') is opaque, the Cascade In signal for this parameter is 0 because no transparency remains for any of the lower layers.

A special feature of the paint system is the concept of canvas and mini-canvas. Normal paint systems make pictures that can be painted on. New and novel in the paint description is the use of a small picture work area that can be called up by the operator quickly to act as a temporary work area. This temporary work area can co-reside on the television screen with the full canvas by overlaying a small part of the full canvas. The work area can be used as a temporary work area, a video area, or a place where part of the main area can be copied into to perform various modifications of the picture that can then be used by repasting, blending, or compositing back onto the main canvas.

Figure 24:
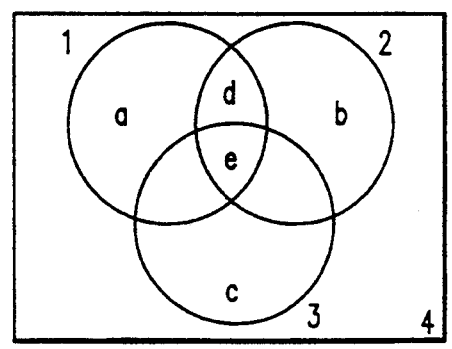
FIG. 24 is a graphic view or Venn diagram illustrating formation of a composite view from multiple layers with differency assigned opacity factors.

FIG. 24 illustrates the compositing of multiple layers. Here the circles 1, 2, 3 represent the upper three layers and the rectangle 4 represents the fourth (bottom) layer. Assume the mix ratio assigned to each layer is 0.5, representing a half-transparent image. Then area a will be a mix of $0.5*L1+0.5*L4$, where LN indicates the image carried by layer N; similar remarks hold for regions b and c. In region d, the mix will first assign transparency of 0.5 to layer 1, with the remaining transparency (0.5) to be allocated between layers 2 and 4. The allocation between regions 2 and 4 alone is the same as for region b and is 0.5 for each. Thus, for region d, the composite signal is represented by $0.5*L1+0.25*L2+0.25*L4$. For region e, by similar arguments, the composite signal would be represented as $0.5*L1+0.25*L2+0.125*L3+0.125*L4$.

F-Chip Operation

The filter chip or F-chip is a 256-pin, 18000-gate CMOS gate array that performs various digital filter functions as well as assisting in the paint operation. The F-chip also provides a CPU port by which the filter coefficient RAMS may be accessed. The F-chip has 11 modes of operation: as a 16×1 vertical filter or 16×1 horizontal filter; as dual four-to-one mixers; as quad two-to-one mixers; as a single eight-to-one mixer; as an interpolator of adjacent pixel values; for paint operation assist; and to provide CPU read/write ability of coefficient RAMs.

The F-chip has 256 pins that are divided into eleven functional groups. Pins P00-P77 (64 pins) are primary data input/output pins for eight-bit words. Pins C00-C78 (72 pins) are coefficient input/output pins for eight 9-bit words. Pins A00-A77 (64 pins) are auxiliary input/output pins for eight-bit words; the functions of these pins depend on the current mode of operation.

Pins A80-A87 are eight dedicated auxiliary pins that act as an eight-bit master output. Terminals sin0-sin2 are three input pins that select operation mode during normal operation and select input addresses in the CPU access mode. Sun1 and sun2 are two signed/unsigned number input selects terminals. Pin sun1 controls channels 0–3 and pin sun2 controls channels 4–7; in the CPU access mode, the pins sin0, sin1, sin2 and sun2 act as four address select pins. A single pin, CPUACC, functions as the CPU access mode select and is active high. Another single pin, RD/WRN, selects the read phase (high) or the write phase (low)in the CPU access mode. Another single pin, CLK, delivers the system clock phase, operating at 13.5 MHz. The system also has 36 dedicated power and ground pins and four scan input pins that are unused at this time.

In the vertical 16 mode (sin2−sin0=000), the F-chip acts as a vertical 16×1 FIR filter. In this mode, auxiliary pins A00–A77 and primary pins P00–P77 serve as data input pins; pins C00–C78 serve as coefficient input pins; and the eight-bit result appears at the master output pins A80–A87. For signed inputs, the pin values are sun1=sun2=1; and for unsigned inputs, the pin values are sun1=sun2=0. The coefficient input signals are delayed one clock cycle, and the result of the filtering appears at the data output pins seven clock cycles after the primary data are fed in. The output of the F-chip in the vertical 16 mode is computed as follows:

$$\text{Output}(x) = \sum_{k=0}^{7} (Pkx + Akx) \cdot Ckx \; (x = 0, 1, 2, 3, \ldots),$$

$$2 \sum_{k=0}^{7} Ckx \leq 1,$$

where the Ckx are the filter coefficients. In the embodiment described here the filter coefficients are effectively symmetric about a center index. This constraint permits a reduction in the number of multipliers required to perform the 16-point filtering, from 16 to 8.

In this mode, the F-chip can perform various filter tasks determined by the coefficient values. The F-chip may, for example, be used as a low pass filter, with cutoff frequency determined by the coefficient values, that performs the anti-alias, pre-filtering of the video data in channels Y, U, V, and α before these data are written to the interpolation frame store.

In the horizontal 16 mode (sin2−sin0=001), the F-chip serves as a horizontal 16×1 filter. Sixteen 8-bit words of data are input at pins P00–P07 and shifted into the remaining primary and auxiliary input registers. The input here first affects the result seven clock cycles later and no longer affects the result after 23 clock cycles. As with the vertical 16 mode, the coefficients C00–C08 are delayed one clock cycle and the result appears at the master output pins A80–A87. Signed and unsigned input signals are handled as in the vertical 16 mode. An auxiliary pin, A57, is available for master output tri-state control; this allows un-filtered data from the frame constructor, rather than F-chip output data, to drive the output of the filter board. In the horizontal mode, the F-chip performs horizontal anti-alias, pre-filtering of the video data before the data are written to the interpolation frame store. The F-chip output in the horizontal 16 mode is computed as follows:

$$\text{Output}(x) = \sum_{k=0}^{7} [P0(x-k) + P0(x+k+1)] \cdot Cxk,$$

$$2 \sum_{k=0}^{7} Cxk \leq 1.$$

In the 8×1 mixer mode (sin2−sin0=010), the F-chip acts an eight-to-one mixer for a sequence of eight input values. Auxiliary pins A00–A77 are unused in this mode and, after seven clock cycles, the eight-bit result appears at the master output pins. The output of the F-chip in this mode is computed as follows:

$$\text{Output}(x) = \sum_{k=0}^{7} Pkx \cdot Ckx, \; \sum_{k=0}^{7} Ckx \leq 1.$$

In the dual 4×1 mixer mode (sin2−sin0=011), auxiliary pins A00–A07 serve as output pins for mixer number 1; and pins A10–A17 serve as output pins for mixer number 2. Data and coefficients are input at pins P00–P37 and C00–C38 for mixer number 1; and at pins P40–P77 and C40–C78 for mixer number 2. The eight-bit results appear at output pins A00–A07 and A10–A17 for mixers number 1 and number 2, respectively. The output result appears seven clock cycles after the primary input data are fed to the F-chip. In this mode sun1=1 (sun2=1) specifies signed data for mixer number 1 (mixer number 2); and sun1=0 (sun2=0)specifies unsigned data for mixer number 1 (mixer number 2). The output of each of the dual mixers is computed as follows:

$$\text{Mixer Output1}(x) = \sum_{k=0}^{3} Pkx \cdot Ckx,$$

$$\text{Mixer Output2}(x) = \sum_{k=4}^{7} Pkx \cdot Ckx,$$

$$\sum_{k=0}^{3} Ckx \leq 1, \; \sum_{k=4}^{7} Ckx \leq 1.$$

In the quad 2×1 mixer mode (sin2−sin0=100), the F-chip mixes and provides output signals for as many as four input signals. Data are input at pins P00–P77, and the coefficients are input at pins C00–C78. After six clock cycles, the eight-bit output signals of mixers number 1, 2, and 4 appear at auxiliary output pins A00–A07, A10–A17, A36–A45 and A80–A87, respectively. The signal sun1 controls the signed/unsigned data specification at mixers number 1 and 2 while the signal sun2 controls the signed/unsigned data specification at mixers number 3 and 4. SunX=1 specifies signed data and sunX=0 specifies unsigned data (X=1, 2). The output in each of the 4 mixers is computed as follows:

Mixer Output1(x)=P0x.C0x+P1x.C1x,
Mixer Output2(x)=P2x.C2x+P3x.C3x,
Mixer Output3(x)=P4x.C4x+P5x.C5x,
Mixer Output4(x)=P6x.C6x+P7x.C7x, $$\sum_{k=0}^{1} Ckx \leq 1.$$

$$\sum_{k=2}^{3} Ckx \leq 1,$$

$$\sum_{k=4}^{5} Ckx \leq 1,$$

$$\sum_{k=6}^{7} Ckx \leq 1.$$

One example of how the F-chip is used in the two:one mixer mode may be seen by considering the border insert portion of the filter board. The eight-bit primary inputs consist of the Y, U, V and α video data and border data. The final results each represent Y, U, V or α video signals that contain the desired border information.

In the interpolation mode (sin2−sin0=101), the F-chip acts as an interpolator for estimating the value of a fictitious pixel from the known values of a 4×4 pixel neighborhood surrounding the point of interest, as illustrated in FIG. 7. Auxiliary pins A32-A47 serve as a 14-bit expout terminal, and pins A00-A15 serve as a 14-bit input terminal expin. The final eight-bit result appears at the master output pins approximately 23 clock cycles after the input data are first received. Interpolation is performed using 16 pixel values per cycle (the 4×4 neighborhood) and, therefore, requires two F-chips per video channel (Y, U, V, α). Eight pixel values are input into each of the two F-chips and are multiplied by the appropriate coefficient values; these coefficients represent the weights assigned to each pixel value, where the sum of the coefficients equals 1. The intermediate result, expout, of F-chip no. 1 is fed to the input terminal expin of F-chip no. 2, and the two intermediate results are added to produce a final pixel value for the fictitious pixel surrounded by the 4×4 pixel neighborhood. In this mode, the master output signal is computed as follows:

$$\text{Output}(x) = \sum_{k=0}^{7} Pkx \cdot Ckx + \sum_{k=0}^{7} P'kx \cdot C'kx,$$

$$\sum_{k=0}^{7} (Ckx + C'kx) \leq 1.$$

In the paint mode (sin2−sin0=110), the F-chip implements the paint algorithm $x=(1-\alpha)c+\alpha b=c+(c-b)(\alpha)$, where c is the canvas image, b is the brush image and α is the opacity factor for the brush image. Here, the primary input-output pins are used to receive both the canvas signal and the brush signal, as well as to output the composite result.

Figures 25, 25A:
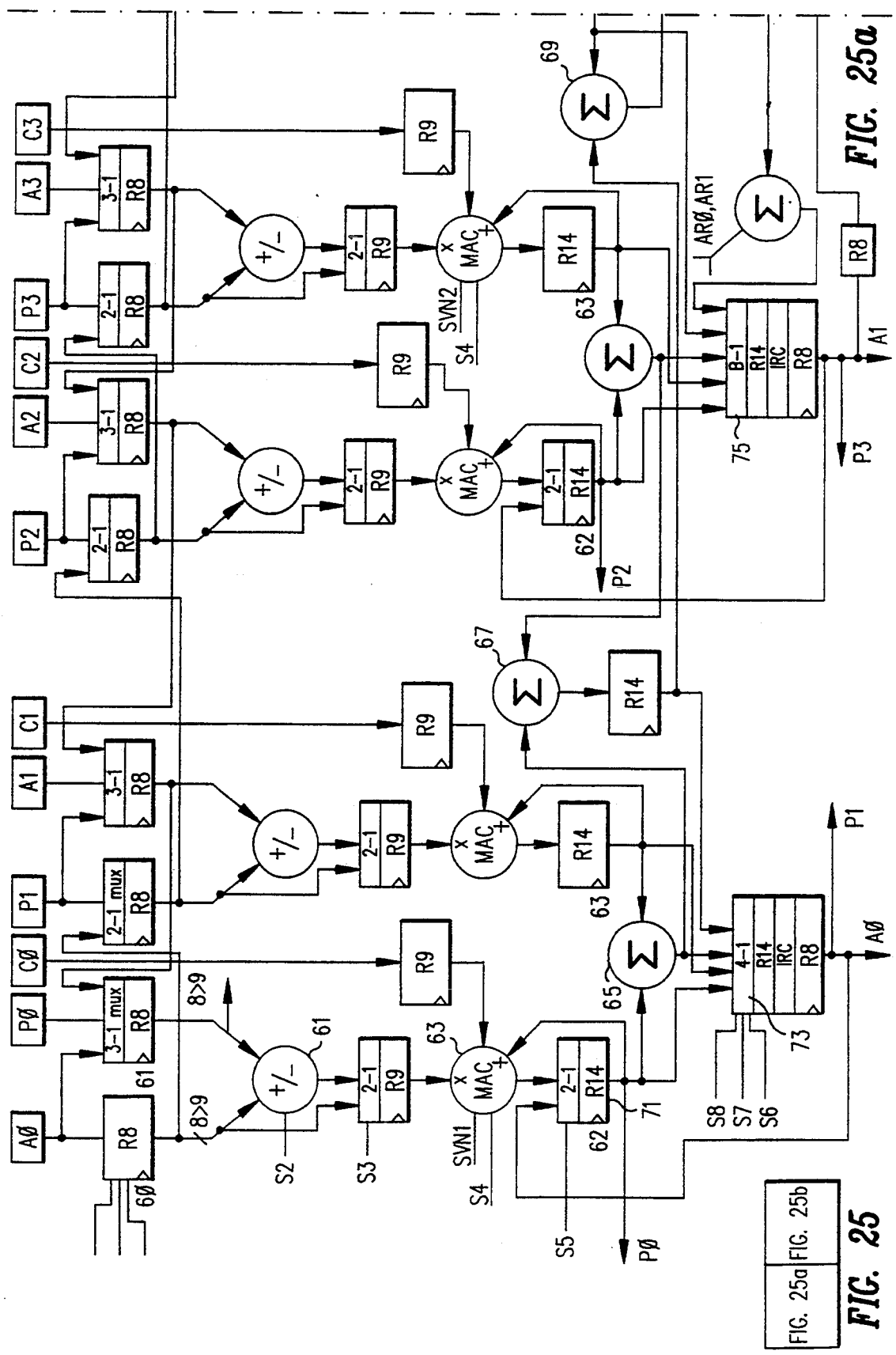
FIG. 25 is a schematic view of the floorplan of an F-chip, used to filter or compute weighted averages of various signals within the system.
Figure 25B:
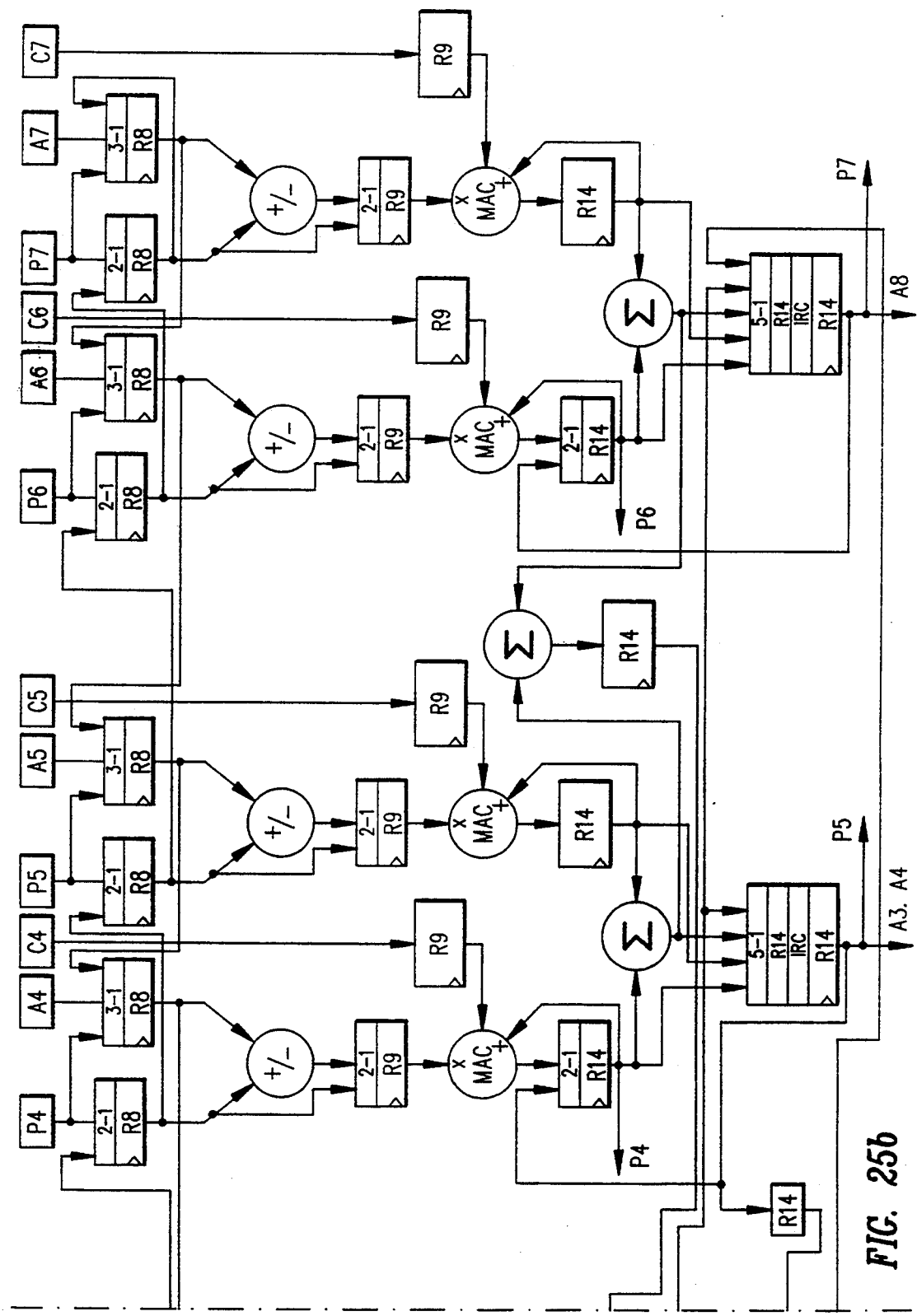

FIG. 25 illustrates the operation of a module within the F-chip that will operate on one eight- or nine-bit byte or word. The module receives the input data on pins Ak0, ... Ak7 and on pins Pk0, ... Pk7 (k=0, 1, ..., or 7) and the selected filter coefficients Ck0, ..., Ck7 as shown on FIG. 24A. The sum or difference of Akn and Pkn (n=0, 1, ..., 7) is formed at add/subtract junction 61 and either this result or Pkn is passed to MAC 63, which also receives the corresponding filter coefficient. The sum/difference and the filter coefficient are multiplied together to form an intermediate result (Akn±Pkn) Ckn or PknCkn, and these results are added two-by-two (n=0 and 1; n=2 and 3; n=4 and 5; n=6 and 7) to produce new partial sums summer at summer 65. The two-by-two sums are then added pairwise at summer 67 to produce two sums of four products each, and these two sums are added together at summer 69 to produce a final filtered sum such as $$\sum_{n=0}^{7} (Akn \pm Pkn)Ckn \text{ or } \sum_{n=0}^{7} PknCkn$$

at the output terminal of summer 69. The filter coefficients Ckn may be chosen from an array of up to 256 different sets of coefficients, each such set being subject to the constraint $$\sum_{k=0}^{7} Ckn \leq 1 \text{ and } -1 \leq Ckn \leq \frac{255}{256}.$$

If a smaller sum is needed such as $$\sum_{k=0}^{1} (Akn \pm Pkn)Ckn \text{ or } \sum_{k=0}^{1} PknCkn,$$

$$\sum_{k=0}^{3} (Akn \pm Pkn)Ckn \text{ or } \sum_{k=0}^{3} PknCkn,$$

$$\sum_{k=0}^{7} (Akn \pm Pkn)Ckn \text{ or } \sum_{k=0}^{7} PknCkn,$$

these sums may be drawn from a 2-to-1 summer such as 71, a 4-to-1 summer such as 73 or an 8-to-1 summer such as 75 in FIG. 25.

In the CPU access mode (CPUACC=1), the F-chip provides a port for reading from and writing to the coefficient RAMs. During normal operation (CPUACC=0), the coefficients are treated as eight 9-bit inputs, the data are actually stored in RAM as nine 8-bit words. In the read mode (RD/WRN=1), data from the coefficient RAMs are read through the coefficient input pins C00-C78 and are output to the CPU through the master output pins A80-A87. In this phase, the input select pins sin0, sin1, sin2 and sun2 select which of the sets of coefficients are to be read and used, as indicated below.

| (sun2,sin2,sin1,sin0) | |
|---|---|
| = (0000) | C00-C70 |
| = (0001) | C01-C71 |
| = (0010) | C02-C72 |
| = (0011) | C03-C73 |
| = (0100) | C04-C74 |
| = (0101) | C05-C75 |
| = (0110) | C06-C76 |
| = (0111) | C07-C77 |
| = (1000) | C08-C78 |

During the write phase (RD/WRN=0), the master output pins A80-A87 act as input for CPU data that is input through the pins C00-C78. Each bit entering through pin A8x (x=0,1, ... 7) drives 9 bits of coefficient output Cx0, Cx1, ... Cx8. Although data are available at all nine RAMs, enabling the proper chip select allows data to be written to the desired location.

The nine-bit coefficient inputs C00-C78 are always signed and are input in the format S.ffffffff. Although the values of the coefficients range from 0996 to −1, the two's complement inverse of the binary representation is used here, resulting in a range of −0.996 to 1. This allows the data to be multiplied exactly by 1.00 rather than by a maximum of 0.996. This is accomplished by inverting the output of the address before a selected output is driven out of the chip. The eight-bit data inputs at pins P00-P77 and A00-A77 are either signed or unsigned. If the data are unsigned, the format is IIIIIIII and the valid range is 0 to 255. If the number is a signed number, the format is SIIIIIII and the valid range runs from −128 to +127. All eight-bit input signals are extended to nine bits before any arithmetic operations are performed.

Although the final result is eight bits of integer information, internal arithmetic operations are generally performed on 14-bit (integer/fraction) signals. For this reason, the data must be rounded and clipped to preserve reasonable accuracy. Also, because the coefficient inputs appears in two's complement inverse form, the 14-bit result must be inverted for final use; this is performed before the rounding and clipping operations. Although the 9×9 multiplier produces an 18-bit result with one sign bit and eight fractional bits of information, the four least significant bits are dropped, resulting in a 14-bit result in the format SIIIIIIII.ffff. After the inversion is performed, rounding is performed and the result is a signed, 9-bit integer, Clipping circuitry maintains the output within the allowed range (0 to 255 or −128 to +127). The filter coefficients used on the F-chip in vertical 16×1 and horizontal 16×1 mode are symmetric about a midpoint. If, for example, a horizontal line of pixel values is passed through a 15-coefficient filter (C0x,C1x,C2x), . . . , C14x with $$\sum_{k=0}^{14} Ckx = 1),$$

the central pixel value pv(mx, y) becomes $$pv_{fil}(mx,y) = \sum_{k=-7}^{7} pv((m + k)x,y) * = pv(mx,y) * C0x +$$

$$\sum_{k=1}^{7} 2[pv((m + k)x,y) + pv((m - k)x,y)] *$$

Where, for example, a 16-coefficient filter is chosen (Ckx=C(15−k)x), the filtered pixel value would correspond to the midpoint of coordinates (mx,y) and ((m+1)x,y),vlz.

$$= pv_{fil}(mx,y) = \sum_{k=1}^{7} [pv((m + k)x,y) +$$

$$pv((m + k + 1)x,y)] * Ck$$

with similar results occurring for vertical filtering. Use of symmetric filter coefficients allows the RAMs where the coefficients are held to be about half the size that would otherwise be required for general filter coefficients; and because the performance of 15 additions and eight multiplications requires less silicon area than performance of 15 additions and 16 multiplications, a simpler, less expensive chip is possible than for a general filter.

The M-chip The M-chip, or multiplexer chip, is a VLSI solution to the cross-point switch problem in digital video. Depending upon which of the modes is selected, the M-chip serves as: (1) four quad 16×1 multiplexers; (2) four quad 8×1 multiplexers; (3) four quad 4×1 multiplexers; (4) eight dual 2×1 multiplexers; (5) a linked hex or 16×1 multiplexer; (6) a 16-tap delay line (useful for scrolling and creation of intermediate pixel information); (7) a 1×6 broadcaster; (8) a 1×32 test data broadcaster; and (9) a transparent/latched direct buffer/driver for pass-through. The M-chip has 128 bi-directional data pins plus two mode control pins, 16 select pins (six bi-directional), five clock enable pins, five output enable pins, four direction control pins, one pin indicating whether the select controls are to be clocked or gated, and one clock pin. The total number of signal pins is 162.

Figures 26, 27, 28:
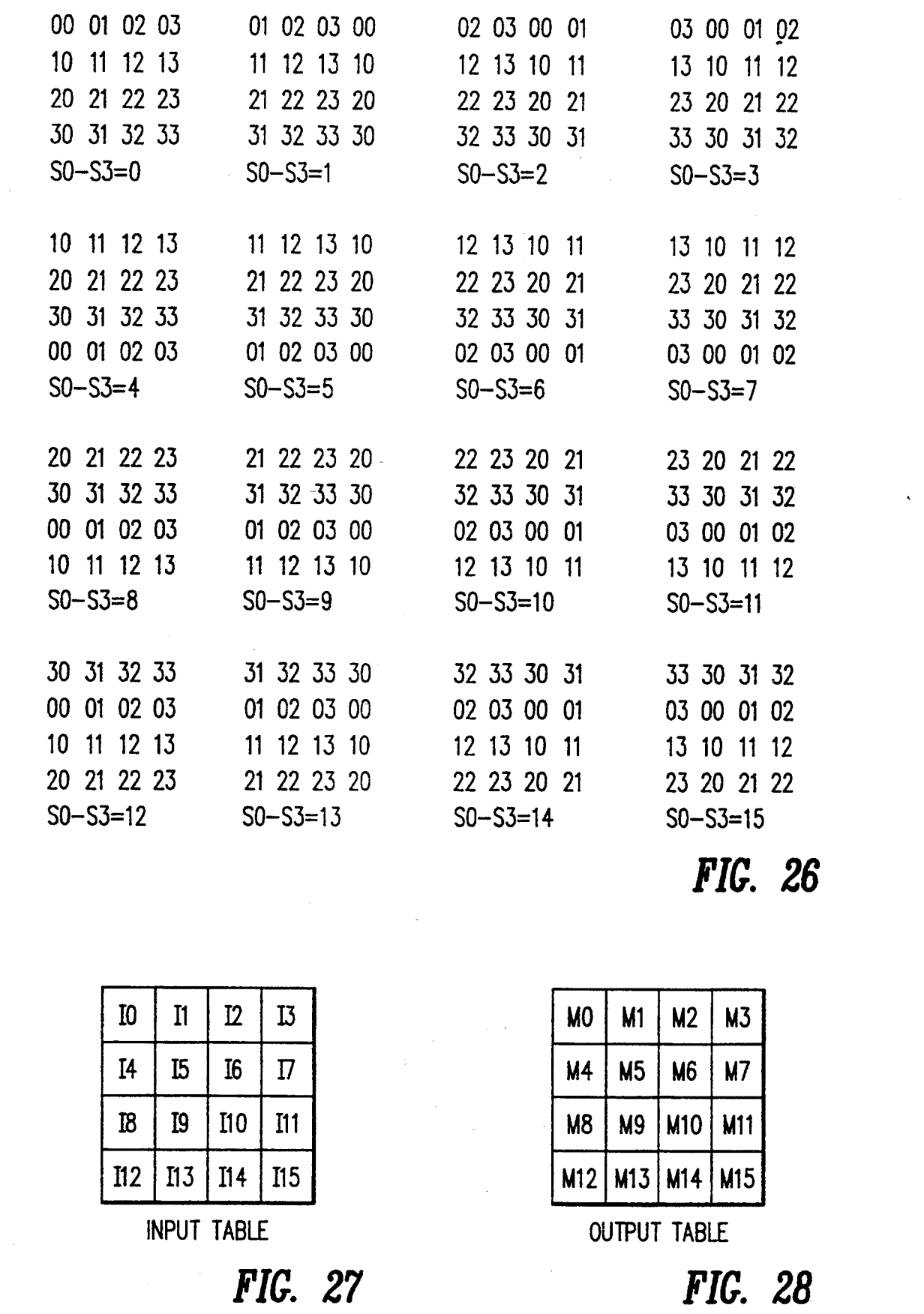

The 128 data pins are grouped into four sets of 32 paths each, with each set having 16 A path ports and 16 B path ports. The input terminals denoted I0–I15, that are connected to any of the sixteen 16×1 multiplexers can be from either an A port or a B port. The output terminals, denoted M0–M15, are each connected to one of the 16 multiplexers, as illustrated in FIGS. 26, 27 and 28. The particular output terminal format is selected using four select pins, denoted S0–S3.

Mode 0 is the M-chip mode used in pixel value interpolation, to create fictitious or inter-pixel values for target-to-source mappings. Operating in mode 0, the M-chip permutes F-chip multiplier coefficients for the pixel values to choose a single composite 4×4 block of pixels whose values are to be averaged (with appropriate weights) to determine the value of a fictitious pixel p′(x,y) (FIG. 7) that is near the center of this 4×4 composite block. In mode 0, the row-to-row and/or column-to-column relationships of the 16 elements in certain 4×4 Fundamental Blocks are varied by the choice of values of the four binary select pins S0, S1, S2, S3, as illustrated in FIG. 26. The substantially rectangular array of video image pixels (assumed to be substantially $4N_1$ pixels in length and $4N_2$ pixels in height for purposes of illustration, where $N_1$ and $N_2$ are positive integers) is divided into $N_1 \cdot N_2$ mutually exclusive blocks, called Fundamental Blocks, of 4×4 pixels each so that the video image array is now decomposed into another array of $N_1$ Fundamental Blocks of pixels along the length by $N_2$ Fundamental Blocks of pixels along the height of the video image array, as indicated by the solid lines in FIG. 29. For example, for the choice (S0, S1, S2, S3)=(0,1,0,1)$_{binary}$=5$_{decimal}$, the multiplexer output signals Mr are related to the multiplexer input signals Is (r,s=0,1,2, . . . , 15) by M0=I5, M1=I6, M2=I7, M3=I4, M5=I9, . . . , M14=I3, M15=I0.

Determination of a fictitious pixel value f′(x,y) as in FIG. 7 by a 4×4 pixel neighborhood of that position requires a weighted sum or average of the form $$\Sigma = \sum_{k=q}^{q+3} \sum_{j=p}^{r+3} f(x_j,y_k) \cdot Cjk$$

where the quantities $f(x_j,y_k)$ are pixel values for the pixel position $(x_j,y_k)$ and Cjk are appropriately chosen filter coefficients with the usual normalization constraint $$\sum_{k=q}^{q+3} \sum_{j=p}^{p+3} Cjk \leq 1.$$

Originally, the 16 pixel coordinates (xj, yk) may belong to as many as four different but contiguous, nonoverlapping Fundamental Blocks of 4×4 pixels, each block being defined by {($x_m$, $y_n$) m=4M, 4M+1, 4M+2, 4M+3; n=4N, 4N+1, 4N+2, 4N+3} for some pair of integers M and N. Formation of the sum Σ above involves two permutations of the pixel values and one permutation of the 16 filter coefficients.

Figures 29, 30:
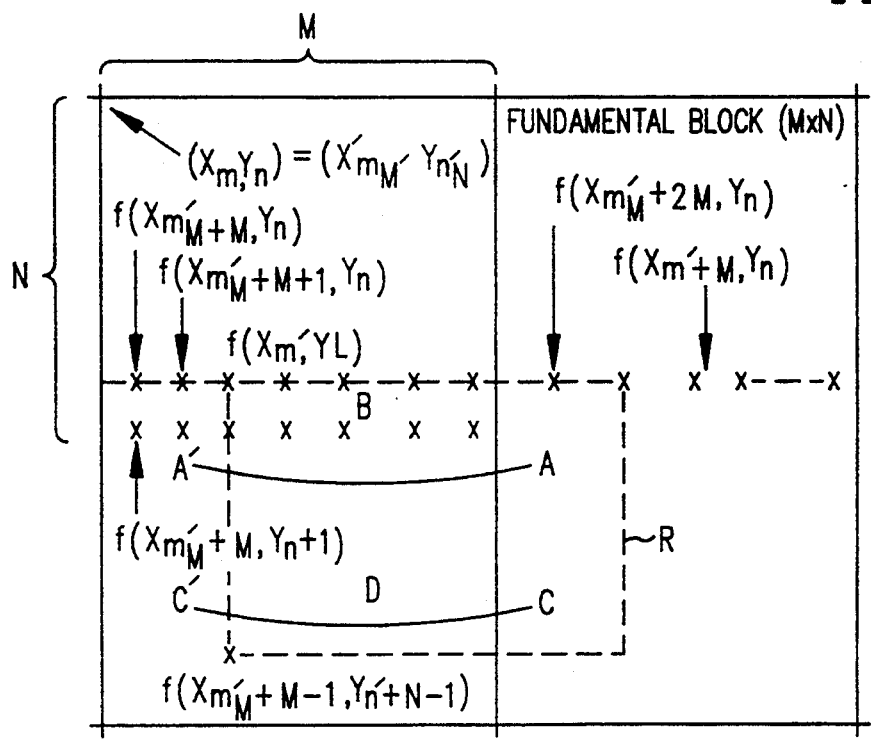

As an example, consider the fictitious pixel p′ shown in FIG. 29, where the pixel coordinates defining the desired 4×4 pixel neighborhood R are $(x_j,y_k)$ (j=1,2,3,4; k=3,4,5,6). Here, the desired 4×4 pixel neighborhood overlaps four Fundamental Blocks as shown. Sixteen RAMs (r=0,1,2, . . . , 15) contain mutually exclusive subsets of actual pixel value from each of the Fundamental Blocks, with each Fundamental Block contributing one pixel value to each of these RAMs.

For example, RAM r=0 will contain the rectangular array of pixel values $$f(x_0, y_0) \quad f(x_4, y_0) \quad f(x_8, y_0) \quad f(x_{12}, y_0) \ldots$$
$$f(x_0, y_4) \quad f(x_4, y_4) \quad f(x_8, y_4) \quad f(x_{12}, y_4) \ldots$$
$$f(x_0, y_8) \quad f(x_4, y_8) \quad f(x_8, y_8) \quad f(x_{12}, y_8) \ldots$$

Each of the other 15 RAMs contains a similar array of pixel values. RAM No. r=p+4 q (p,q=0,1,2,3) contains the pixel value rectangular array $\{f(x_{p+4m}, y_{q+4n}) | m=0,1, \ldots, N_1-1; n=0,1, \ldots, N_2-1\}$, and the desired 4×4 pixel neighborhood shown in FIG. 29 contains one video image pixel value from each of these 16 RAMs. Assume for definiteness that the pixel coordinates (x4, y4), (x4, y5), (x4, y6) and (x4, y7) belong to RAMs r=0, 4, 8 and 12, respectively. The pixel value for each row in each RAM r=12, 0, 4 and 8 is rotated left once so that, for example, RAM r=12 now contains the array $$f(x_4, y_0) \quad f(x_8, y_0) \quad f(x_{12}, y_0) \ldots$$
$$f(x_4, y_4) \quad f(x_8, y_4) \quad f(x_{12}, y_4) \ldots$$
$$f(x_4, y_8) \quad f(x_8, y_8) \quad f(x_{12}, y_8) \ldots$$
$$\ldots \quad \ldots \quad \ldots$$

with analogous changes for each of the other three RAMs nos. r=0, 4 and 8. Assume for definiteness that the pixel coordinates (0, 4), (1, 4), (2, 4) (3, 4), (0, 5), (1, 5), (2, 5), (3, 5), (0, 6), (1, 6), (2, 6) and (3, 6) correspond to RAMs r=0-11, respectively. Each of those nine RAMs is then rotated upward once. After this operation, RAM r=0 now contains the array of pixel values $$f(x_4, y_4) \quad f(x_8, y_4) \quad f(x_{12}, y_4) \ldots$$
$$f(x_4, y_8) \quad f(x_8, y_8) \quad f(x_{12}, y_8) \ldots$$
$$f(x_4, y_{12}) \quad f(x_8, y_{12}) \quad f(x_{12}, y_{12}) \ldots$$
$$\ldots \quad \ldots \quad \ldots$$

with analogous changes for each of the RAMs r=1-11.

The first members (upper left corner) of each of these 16 RAM arrays form a new array $\{f(x_j, y_k)\}^3_{j,k=0}$ $$f(x_4, y_4) \quad f(x_1, y_4) \quad f(x_2, y_4) \quad f(x_3, y_4)$$
$$f(x_4, y_5) \quad f(x_1, y_5) \quad f(x_2, y_5) \quad f(x_3, y_5)$$
$$f(x_4, y_6) \quad f(x_1, y_6) \quad f(x_2, y_6) \quad f(x_3, y_6)$$
$$f(x_4, y_3) \quad f(x_1, y_3) \quad f(x_2, y_3) \quad f(x_3, y_3)$$

and this resulting 4×4 array contains precisely the 16 actual pixel values to be used to determine the sum or average Σ for the fictitious pixel p'(x,y). However, the order within this last array of these 16 actual pixel values is not correct; this can be corrected by permuting the 16 actual pixel values by a permutation P(row 3→row 0→row 1→row 2→row 3; then column 0→column 3→column 2→column 1→column 0), or by applying the inverse permutation P$^{-1}$ to the filter coefficients in the sum or average Σ above. In one embodiment of the invention, the filter coefficients are permuted with the transformation P$^{-1}$ using the M-chip in mode 0; the particular transformation P illustrated in this example corresponds to the choice (S0, S1, S2, S3)=(1, 1, 0, 1)$_{binary}$=13$_{decimal}$ shown in FIG. 24B; the inverse map P$^{-1}$ for this example corresponds to 07$_{decimal}$. The sum or weighted average Σ becomes $$\Sigma = \sum_{k=0}^{3} \sum_{j=0}^{3} F(x_j, y_k)(P^{-1}Cjk).$$

The particular illustration P$^{-1}$ to be chosen from the 16 possibilities displayed in FIG. 26 is easily determined from the upper left corner pixel coordinate (x$_j$,y$_k$) of the 4×4 pixel neighborhood shown in FIG. 24E: (S0, S1, S2, S3)$_{decimal}$=j+4 k (mod 16), where the left hand quantity is an integer between 0 and 15 inclusive.

This approach is easily extended to the use of M×N pixel neighborhoods (M and N integers ≥2) by the use of formal mapping techniques. First divide the video image rectangular array, which is substantially N$_1$·N pixels in height by M1.M pixels in length, into Fundamental Blocks that are substantially M×N rectangular arrays of pixels; the video image array now comprises substantially M$_1$ Fundamental Blocks in length by N$_1$ Fundamental Blocks in height. The fictitious pixel position p'(x,y) lies in one of these Fundamental Blocks; if p'(x,y) lies on a boundary of one or more Fundamental Blocks, these boundaries may be moved slightly so that p'(x,y) lies in one of these Blocks. Now choose an M×N substantially rectangular array of pixels that contains p'(x,y) substantially at the center of this chosen array. The chosen array may overlap one, two or four contiguous Fundamental Blocks; the pixel in the chosen array at the upper left corner thereof has the coordinates (x$_m$', y$_n$') with m' and n' fixed.

An M×N array of RAMs, each containing a rectangular memory array that is at least M$_1$ memory addresses in length by at least N$_1$ memory addresses in height, is now set up; each memory array has the same rectangular coordinate system (x$_p$,y$_q$) (p=0,1, . . . , M$_1$−1; q=0,1, . . . , N$_1$−1) as does the video image array, with (x$_p$, y$_q$)=(0,0) corresponding to the upper left corner of such array. Each integer r=0,1,2, . . . , M·N−1 can be expressed as r=m"+Mn" (m"32 0,1, . . . , M−1; n"=0,1, . . . , N−1) with n" [r/M]$_I$ and m"=r−n", where [w]$_I$ denotes the integer part of the real number w. For convenience let w$_M$=[w/M]$_I$·M and w$_N$=[w/N]$_I$·N for any real number w; w−M<w$_M$≲w and w$_M$=w if and only if w is an integer divisible by M. Any integer r=0,1,2, . . . , M$_1$·N$_1$−1 can thus be written as r=(r−r$_N$)+r$_N$ and 0≲r−r$_N$≲N−1. A 1—1 mapping is now set up that carries one pixel value pv(m,n) from each Fundamental Block into one address (p,q) of one of the rectangular memory arrays no. r=0,1,2, . . . , M·N−1. The map is:

$$T{:}(m,n) \to (r,p,q)(0 \lesssim m \lesssim M_1 \cdot M-1; 0 \lesssim n \lesssim N_1 \cdot N-1),$$

$$r = m - m_M + M(n - n_N),$$

$$p = m_M/M,$$

$$q = n_N/N;$$

and the inverse mapping (also 1—1) is $$T^{-1}{:}(r,p,q) \to (m,n)(0 \lesssim p \lesssim M_1-1; 0 \lesssim l \lesssim N_1-1),$$

$$m = r - r_M + p \cdot M,$$

$$n + q \cdot N + r - r_N.$$

Figures 31, 34:
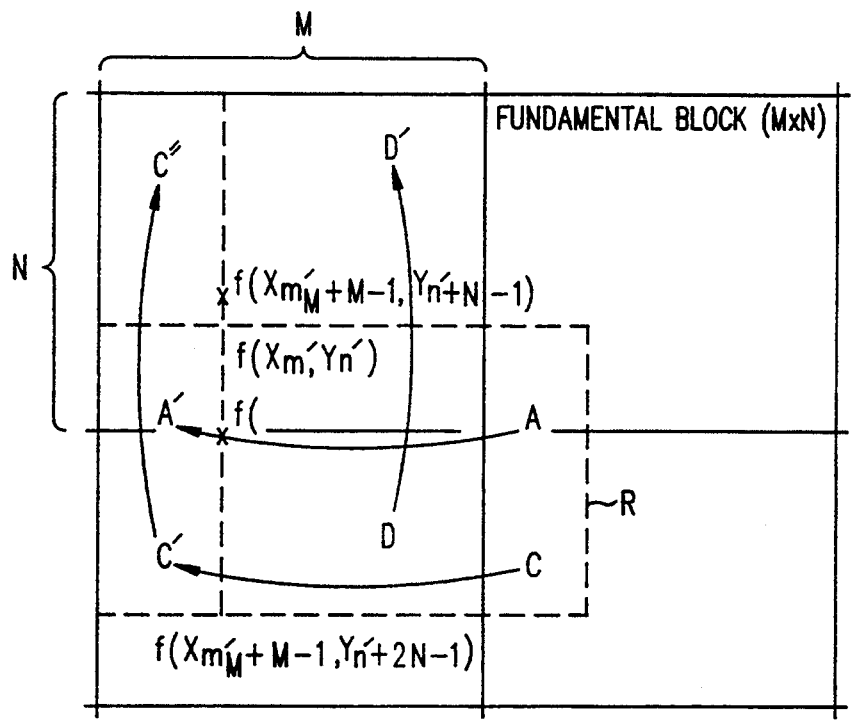

One now rotates leftward by one address unit each of the designated memory arrays no $r=s_1+k_1 \cdot N (s_1=0,1, \ldots, m'-m'_M-1; k_1=0,1, \ldots, M-1)$. If one were to apply $T^{-1}$ to the contents of all memory arrays $r=0,1, \ldots, M \cdot N-1$, the effect of this rotation left would be to replace the pixel values $f(x_m,y_n)$ $(m+m_{M'},m_{M'}+1, \ldots, m'-1; n=n_{N'}, \ldots, n'_N+Nb-1)$ by the pixel values $f(x_{m+M},y_n)$, as illustrated in FIG. 30. One now rotates upward by one address unit each of the designated memory arrays no. $s+s_2+k_2 \cdot N$ ($s_2=0,1, \ldots, N-1$); $k_2=0,1, \ldots, n'-n_N-1$). The map $T^{-1}$ is now applied to the contents of all memory arrays $r=0,1,2, \ldots, M \cdot N-1$; the array of pixel values that now appear in the Fundamental Block with upper left coordinates $(m_{M'},n_{N'})$ is shown in FIG. 31 This Block contains the pixel values of all pixels in the original M×N pixel neighborhood R "centered" at the fictitious pixel $p'(x,y)$. However, the pixel values in this particular Fundamental Block ("Target Block") are out of order unless $m'=m_M'$ and $n'=n_N'$ (in which event no mappings T and $T^{-1}$ are required because this Fundamental Block already contains all the pixel values and in the correct order). The Target Block entries may be rearranged to the correct order by applying one of M·N permutations $P_r$ with $r=j+M \cdot k$ ($j=0,1, \ldots, M-1; k=0,1, \ldots, N-1$). A permutation $P_r$ with $r=N \cdot k$ ($k=0,1, \ldots, N-1$) rotates all rows of an M×N array upward k times with end-around carry (row 0→row N-k (mod N), row 1→row N-k+2 (mod N), etc.). A permutation $P_r$ with $r=M \cdot k+s$ ($k=0,1, \ldots, N-1; s=1, \ldots, M-1$) first rotates all rows of an M×N array upward k times and then rotates all columns leftward s times (column 0→column M-s (mod M), column 1→column M-s+1 (mod M), etc.). Application of the permutation $P_r$ to the Target Block with $r=m'-m_N'+M \cdot (n'-n_N')$ will produce an array of entries in the correct order. Alternatively, one may apply $P_r^{-1}$ ($r=m'-m_N'+M \cdot (n'-n_N')$) to the filter coefficients Cjk because $$\sum_{j=0}^{M-1} \sum_{k=0}^{N-1} (Qg(x_j,y_k))Cjk = \sum_{j=0}^{M-1} \sum_{k=0}^{N-1} g(x_j,y_k)(Q^{-1}Ckj)$$

for any M×N array of values $g(x_j,y_k)$ and any permutation mapping Q on an M×N array of entries Application of $P_r^{-1}$ to the filter coefficients allows the permuted coefficients $P_r^{-1}$Cjk to be computed in parallel with computation of the resulting pixel value entries of the Target Block; this alternative saves computing time and is used in the current embodiment. However, either alternative can be used.

Another approach determines the upper left corner pixel coordinates (m',n') of the chosen array that is substantially centered at the fictitious pixel position and then uses LUTs to load the Target Block array of pixel values, after which the appropriate permutation $P_r$ or $P_r^{-1}$ is applied and the weighted average is computed. In any event, the desired weighted average becomes $$\Sigma = \sum_{j=0}^{M-1} \sum_{k=0}^{N-1} (P_s f(x_j,y_k)) \, Cjk = \sum_{j=0}^{M-1} \sum_{k=0}^{N-1} f'(x_j,y_k)(P_r^{-1}Ckj),$$

where f'(xj,yk) denotes the pixel values in the Target Block after the mappings T and $T^{-1}$ have been applied. The pixel value f(x,y) might be any of Y, U, V, $\alpha$ or z here, and the interpolated pixel value would be computed for each field. If this general formulation (with M×N replacing 4×4) is used here, the F-chip filters will necessarily contain as many as M·N filter coefficients and the number of rams used in burst copy operation will change from $16=4^2$ to M·N. The use of the M-chip in what is designated mode 0 here, as illustrated in FIG. 26, to perform interpolation and determination of fictitious pixel values is new; MODES1-3 are variations of MODE0.

In MODE1 (FIG. 32), the horizontal mirror mode, the data is reflected in the horizontal direction and controlled by the input select bits S0-S3. In MODE2, (FIG. 33), the vertical mirror mode, the data is reflected in the vertical direction and controlled by the input select bits S0-S3. In MODE3, (FIG. 34), the H&V mirror mode, is a reflection of the inputs in the H and V directions, and the routing is controlled by the select bits S0-S3. Implementation of the remaining modes of the M-chip (4-6, 8-12) are believed to be well known. For the sake of completeness, these remaining modes are illustrated in FIGS. 32-41.

MODE4 (FIG. 35) is for broadcast of data from a source port to the destination ports. The source is selected by S0-S3, the direction by the A/B direction input. For example, as shown in FIG. 35, if the decimal value of the inputs S0-S3=5, the direction control is from A to B, then the input port A5 will be broadcast to all of the B ports. MODE5 (FIG. 36) is used to create a 16 tap delay line/shift register. The source post is selected by a combination of S0-S3 and the A/B direction control. For example, if S0-S3=4, and A/B direction control is from B to A, then data will be input from port B4, and be shifted sequentially along the various ports, starting with port A5, then A6, etc. MODE6 (FIG. 37) is the test data broadcast mode. S0-S3 is the test data, all 32 output ports are driven with this data. For example, if S0-S3=7, then all ports will be driven with the signal data=7.

Figure 38:
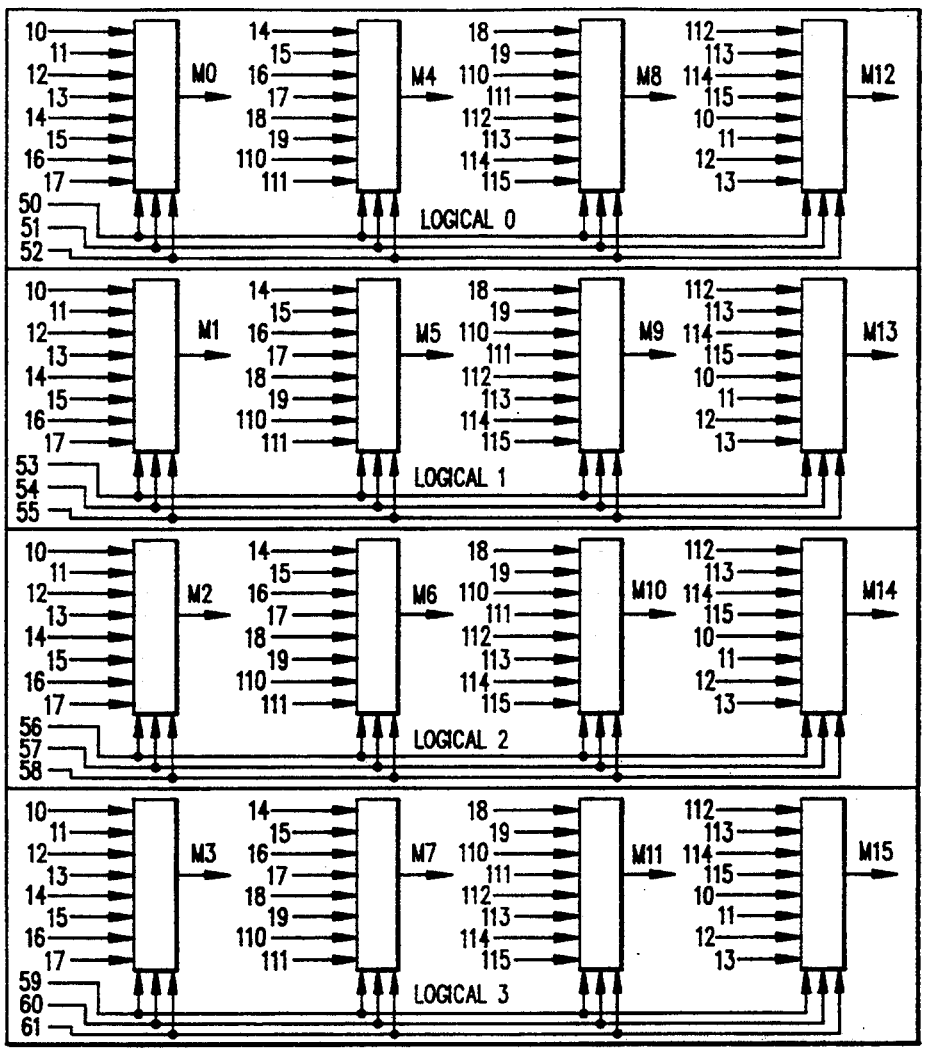

MODE8 makes available 16 8-to-1 multiplexers as shown in FIG. 38, depending upon one's choice of values for the select pins S0-S12.

Figure 39:
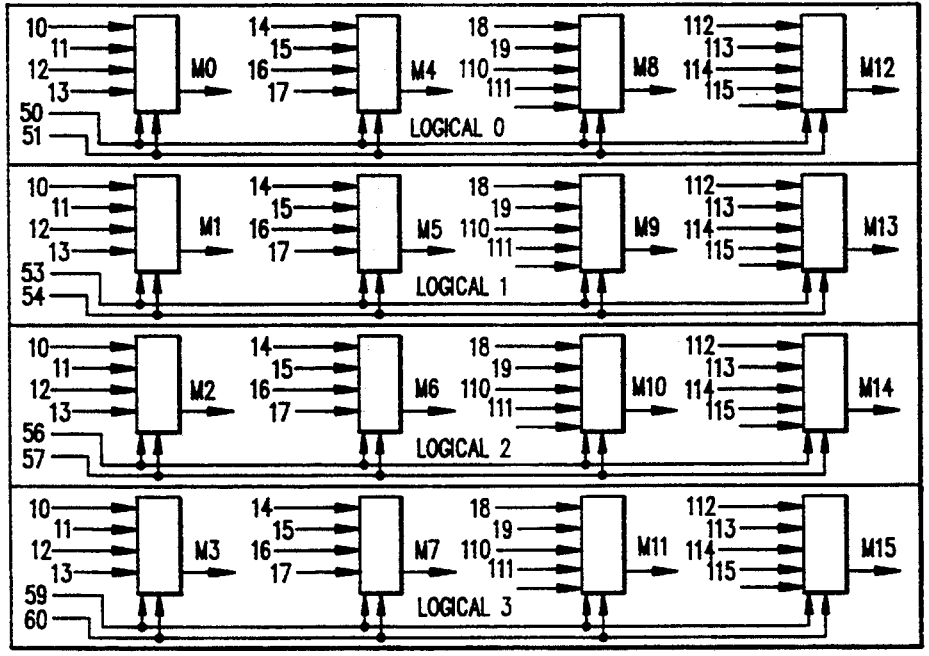
Figure 41:
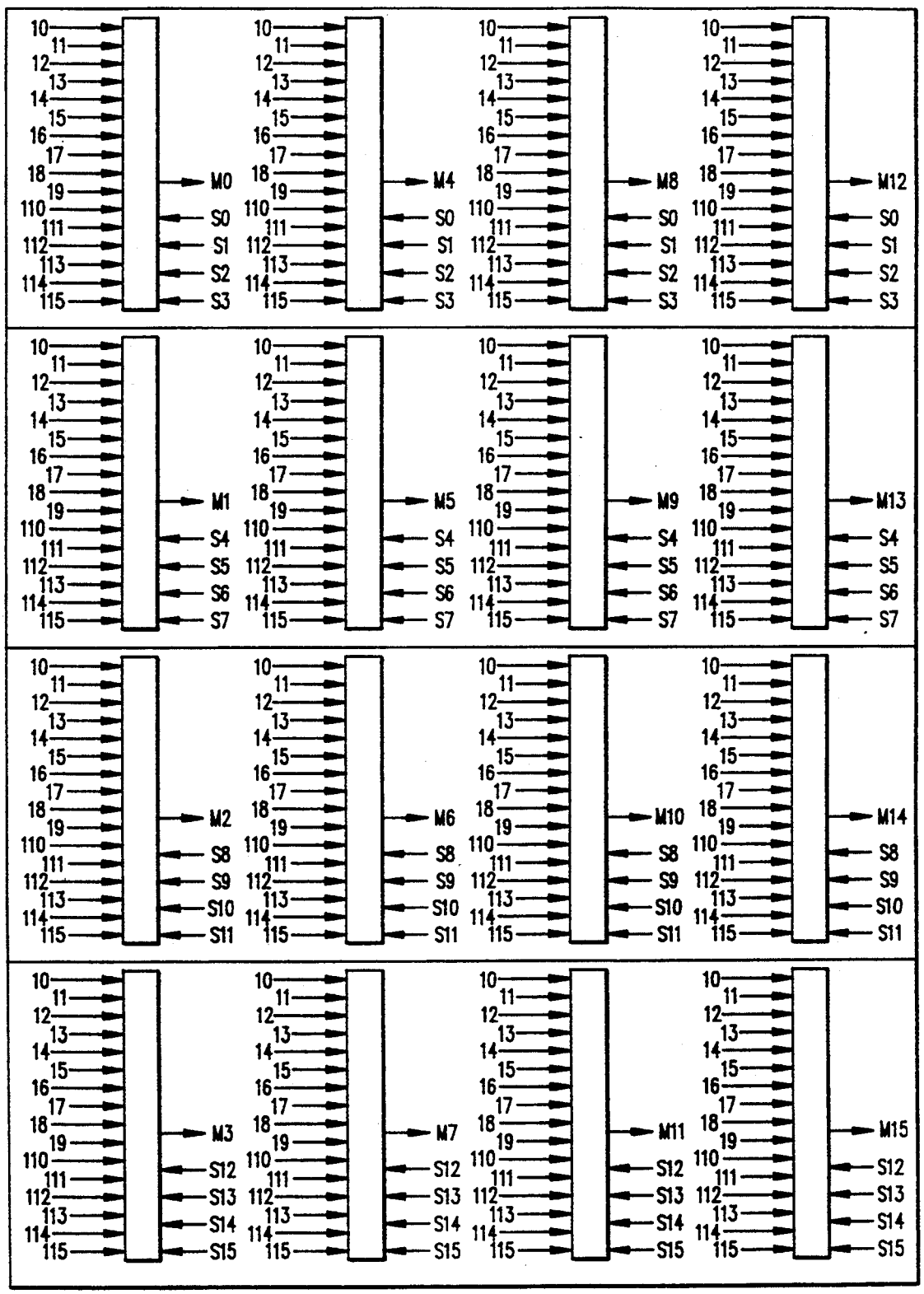
FIG. 41 illustrates the use of the M-chip as a 16-to-1 multiplexer.

MODE9 makes available 16 4-to-1 multiplexers as shown in FIG. 39, depending upon one's choice of values for the select pins S0-S10. MODE10 makes available eight 2-to-1 multiplexers as shown in FIG. 40, depending upon one's choice of values for the select pins S0-S7. MODE11 is transparent (the identity map with input signal I in→output signal Mm for m=0, 1, 2, ..., 15) and provides cpu access to RAMs, F-chip terminals, ports, etc. MODE12, shown in FIG. 41, makes available a plurality of 16-to-1 multiplexers.

T-chip Operation

The T-chip is a high performance integrated circuit that performs real time address calculation for high resolution computer graphic and broadcast quality images. The chip's digital differential analyzers (DDAs) solve third order equations at 13.5 million per second.

The display memory has up to $2^{32}$ pixels (picture elements) directly addressable by the system. Dynamic RAMs are refreshed during horizontal blanking of the display screen. Screen resolution is 1-$2^{16}$ horizontal pixels and 1-$2^{16}$ vertical lines. The T-chip operates at a 13.5 MSPS rate and supplies information for 13.5 million pixels per chip per second for video manipulations. Parallel operation of n T-chips allows an increase in either speed or resolution by a factor of n of these numbers.

Using the T-chip transformation capabilities, the television rasters may be scaled, sheared, rotated, translated, bent, clipped, shown in perspective projection, mapped, merged and shown in composite form with transparency weights $(1-\alpha)$ assigned to each picture in the composite view. Topological transformations from linear surfaces (planes) to curved surfaces and inversely may be made, including live video mapping onto such surfaces. The T-chip is used primarily as an address generator, but it also supports or allows texturing, shading, use of variable stipple patterns, use of variable line widths, use of linear vector and conigraphic vector drawing modes. A T-chip can be used to generate data for elaborate polygon shading algorithms or as a general DDA module having as many as 12 DDA units. All arithmetic is performed to 32-bit accuracy. To minimize the number of pin outs, the address output signals from the T-chip are in block normalized floating point format.

The interface is processor-independent, allowing the T-chip and processor to operate asynchronously with $8 \propto 32$ bit buses. Multiple interrupt modes are available. Hardware windows allow display of up to 224 virtual foreground objects per chip and up to 256 virtual background objects per chip. This is expandable by parallel chip operation, and all objects can be linked during active video display. Software windows are substantially unlimited. Window size can vary from one pixel to fullscreen and be of almost any geometric shape, with adjustable transparency weights $(1-\alpha)$. Data and other signals are transferred through a 299 ceramic pin array, and the signals are compatible with TTL.

The T-chip controls a video display through the use of entities known as "objects". "Objects" are windows with dynamic parameters defining their position and size on the video display screen. The windows are not limited to rectangles; the top, bottom, left, and right edges of a window may be defined by third order difference equations, which allows objects to have curved edges. In addition, the displayed video within the window is also controlled by difference or differential equations (up to third order) in the x and y coordinate axes. These x and y difference equations allow a curved surface to be mapped onto the flat surface of the video display. The digital difference engines are independently controlled to operate at a pixel, line, or field rate and to allow complex operations to be performed during the display or digitization process. Objects defined by the difference engines can appear anywhere on the screen and are limited in number only by the number of display lines. Finally, the display within object windows can have a variety of stipple or transparency patterns.

Objects are controlled by parameters in an external RAM or ROM, called a P-file RAM (parameter file RAM). This RAM can be from $2K \times 32$ to $64K \times 32$ in size, with more RAM allowing more special effects. The P-files form a linked list. P-file RAM is partitioned into blocks called P-files of 256 double words each. Each P-file is composed of eight register sets that define the operation of the various DDAs. These register sets are further divided into four parts: field 1 working set, field 1 shadow set, field 2 working set, and field 2 shadow set. The working register sets are those that are modified by the T-chip during active display. Shadow registers, however, are not changed by the chip; shadow register sets are used to refresh the working set registers during a vertical blanking interval of the video display. The T-chip has a dedicated address line for shadow/working register access; this makes the addition of ROM containing standard effects simple to implement.

A P-file "object" is defined by data on the external P-file memory. Eight sets of difference equations must be specified for the object: (1 and 2) $x_{start}$ and $x_{stop}$, which specify the horizontal start and stop boundaries, respectively; the number fetched by the T-chip from the P-file RAM defines the starting raster pixel (for $x_{start}$) or the ending raster pixel (for $x_{stop}$) to begin or end processing; (3 and 4) $y_{start}$ and $y_{stop}$, which specify the vertical start and stop boundaries, respectively, and are used in a manner similar to $x_{start}$ and $x_{stop}$; (5 and 6) $x_{accum}$ and $y_{accum}$, which specify the initial $x_{source}$ display RAM address and $y_{source}$ display RAM address, respectively, to be read or written within the boundaries defined by $x_{start}$ and $x_{stop}$, and by $y_{start}$ and $y_{stop}$; and (7 and 8) $x_{nuline}$ and $y_{nuline}$, which specify the incremental $x_{source}$ display RAM address and $y_{source}$ display RAM address, respectively, whenever one horizontal or vertical line of the object is completed.

The T-chip has three modes of operation: (1) display or transform mode; (2) polygon fill mode; and (3) vector write mode.

In the display mode, the chip generates addresses of successive pixels to be shown or written to the raster display. One unique feature of the chip is that adjacent horizontal pixels on the display do not have to reside in adjacent memory locations.

FIG. 42 shows the untransformed image in memory as a linear matrix, with the positive x direction representing successive horizontal pixels and the positive y direction representing successive lines. If the chip's DDA engines are run with coefficients sufficient to produce curved read paths through the stored display RAM, the resulting raster display for a perspective projection is a warped image that looks as if the original image is mapped onto a curved surface. FIG. 43 shows how the "transform" operation produces this effect.

Many other "transform" operations can be performed in addition to curved surface mapping. Other effects of the "transform" operation are: shear, rotate, zoom, mirroring, scale, and several others. All "transforms" are controlled by the P-file data.

The second basic mode of operation of the chip is called the polygon fill mode. In this mode, areas of display RAM can be quickly filled with any color (as defined by an external register). Pixels are written into at a 13.5 MHz rate. For large area fills, the chip is much faster than any bit-blit operation. The chip, as implemented, only performs write operations, although read-modify-write such as XOR are straightforward extensions. Most large area fills are simple for the CPU; all that is required are the window edge definitions, the display RAM addresses, the offsets, and successive display RAM line increment values. Area fills are not restricted to rectangles, but can have curved edges. In addition, the area fill can be sparse, with one pixel in six changed; intense, with all pixels filled; or pseudorandom polynomial, with a ten-bit feedback shift register determining which pixels to color. The polygon fill mode can use the DDAs to supply target addresses, for even more power and flexibility in the fill mode. Using the DDAs allows even more sparse fills. When used in conjunction with the filter chips, the chip can do simple mosaic fades. This is illustrated in FIG. 44.

The third major mode of operation, vector write, is an expanded line draw operation. Vectors, to the T-chip, are collapsed P-files. A P-file defines an object in a language that the chip can understand. The chip needs to know where to start and stop displaying in the x and y directions (with respect to the raster display), as well as what to display within the boundaries defined by these start and stop parameters. A vector, however, is by definition a line segment (not necessarily straight) that the chip draws through use of the display RAM. Rather than defining the start and stop raster pixels for foreground ALU operation, the difference between the start and stop parameters defines the number of pixels to be written by the chip (a measure of the length of the vector), and the path followed by the chip through the display ram is a function of the x and y DDA parameters. This is illustrated in FIG. 45.

Figure 46:
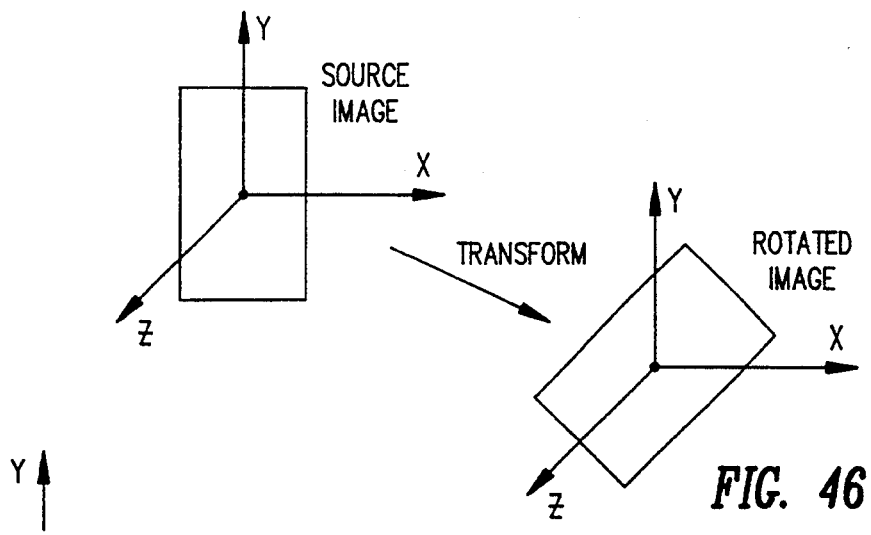
FIGS. 46 and 47 illustrate some of the problems encountered when a figure to be displayed is rotated in a plane that is substantially perpendicular to the viewing axis.
Figure 47:
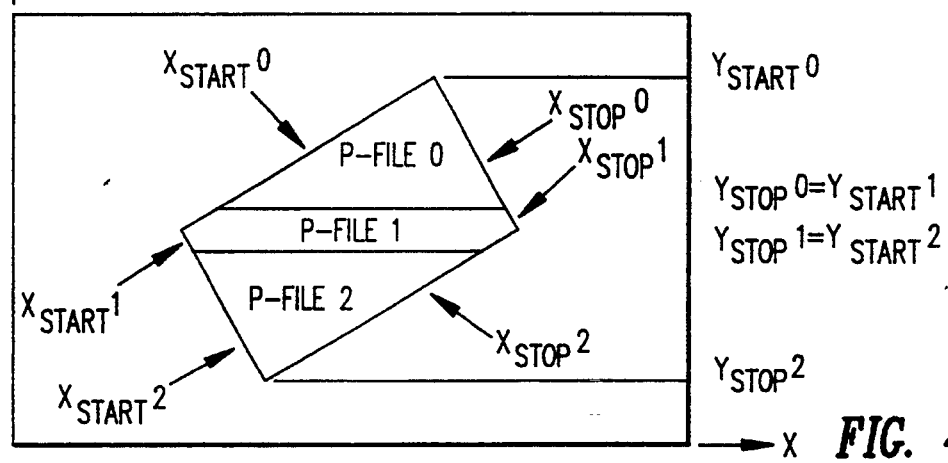

Most line draw chips require either a start and stop address; or a start address, an angle, and the length; or some combination. The T-chip requires only the starting address and the length of each vector segment. The angle is implied in the increment values for the x and y ALUs. Successive segments will have coinciding stop and start points. Where the end points of two vectors do not overlap, the vector connecting them can be made invisible. The system writing speed, 13.5 million pixels/second, is independent of the complexity and curvature of the vector. FIG. 46 illustrates this.

The x and y accumulator and nuline parameters are used by the chip during object processing to calculate the display RAM addresses to be read from or written to. When the chip is generating read addresses it is performing a target-to-source (T-S) transform. When the chip is generating write addresses (S-T transform), it is performing either a polygon fill, a vector write, or a digitize operation. The x and y start and stop parameters define the object processing window. Display memory addresses are not restricted to sequential addresses, but can be directed on the x and y axes by third order difference equations.

Object processing begins when the raster display pixel number and line number fall within the limits set by the x and y start and stop parameters. As currently implemented, these parameters can be changed at a display line rate so that the window parameters can change with successive scan lines. Another embodiment allows reloading of the DDAs and control signals from the P-files or other memory whenever an object is no longer active.

An object in a P-file is active if and only if both of the following conditions are satisfied:

$[x_{start} \leq \text{pixel no.} \leq x_{stop}]$, $[y_{start} \leq \text{line no.} \leq y_{stop}]$.

Within the "window" defined above, the object foreground difference engines operate, using data fetched during horizontal blanking. When the $x_{stop}$ parameter is exceeded by the pixel counter, foreground processing is halted for the remainder of the scan line. At the end of each display line, the foreground object controller logic determines if it is time to switch to a new object. Display line number greater than $y_{stop}$ is normally the determining factor in object linking. Frame rate animation, however, is supported through the T-chip ability to link objects on field count. While an object is being processed by the foreground x and y difference engines, a third independent engine performs next line processing on the P-file data in the P-file ram.

P-file linking is an important feature of the T-chip, on the x-axis, at least two window edge discontinuities occur. The T-chip handles these problems by dividing the task into simpler ones. To accomplish this, the object processor switches to a new set of P-file parameters at the proper display line value. Software calculates the boundary conditions (discontinuities of edges) and the initial values for each object segment used. A few simple sine and cosine calculations are the most complex calculations required to rotate an image.

Vector writes and polygon fills are tightly coupled to object processing. Vectors are simply collapsed P-files, where the T-chip writes to display ram under the control of the P-file data. Polygon fills are similar. Rather than display a portion of memory, the chip writes to, rather than reads from, the display RAM. In the vector write and polygon fill modes, the T-chip generates data to be written to the frame store.

In the frame store support mode, the T-chip again uses the difference engines to determine the portion of incoming video to save, and the destination addresses for that digitized data. This feature allows digitized video to be placed anywhere in the available display memory. By defining the incoming video signal as an object, all of the power of the difference equations can be used to warp, bend, dissolve and rotate an image. Anything that can be done by the T-chip when transforming and/or displaying a stored image can also be done during the frame store process.

Display or Transform Mode

The projections used in the system are perspective rather than parallel, and the point $(x_o, y_o, z_o)$ is the center of projection. J. D. Foley and A. Van Dam, in *Fundamentals of Interactive Computer Graphics*, Addision-Wesley, 1984, pp. 267–302, discuss the differences between perspective and parallel projections and the analysis of each. The Foley and Van Dam discussion is incorporated here by reference.

The T-chip evaluates polynomials for perspective mappings for the S-T amd T-S transforms. These polynomials are fed to the Mathglue modules as shown in FIG. 3. The log and anti-log tables are also contained in a Mathglue module. These tables also handle conversion of the block-normalized T-chip addresses and error condition trapping for out-of-range solutions. The error traps force the address into range or generate a screen-blanking signal.

In displaying a video image, the image may be projected onto a plane or curvilinear surface that is oriented generally relative to the coordinate axes (not necessarily parallel to a convenient coordinate plane such as the xy-plane). The equation for an arbitrary plane P may be written $$Ax + By + Cz - D = 0;$$

and a line defined by the equations $$\frac{x - x_o}{a} = \frac{y - y_o}{b} = \frac{z - z_o}{c},$$

$$a^2 + b^2 + c^2 > 0,$$

will intersect the plane P at the coordinates given by $$x_p = x_o + \frac{a}{c}(z_p - z_o), \quad (1)$$

$$y_p = y_o + \frac{b}{c}(z_p - z_o),$$

-continued $$z_p - z_o = c[D - (Ax_o + By_o + Cz_o)]/(Aa + Bb + Cc).$$

Here the ratios of the direction parameters a, b, c are determined by the ratios of the coefficients for the vector extending from the source point $(x_s, y_s, z_s)$ to the center of the projection $(x_o, y_o, z_o)$; that is, $$a:b:c = x_s - x_o : y_s - y_o : z_s - z_o$$

Equations (1) then become $$x_p = x_o + \frac{x_s - x_o}{z_s - z_o}(z_p - z_o) \quad (2)$$

$$y_p = y_o + \frac{y_s - y_o}{z_s - z_o}(z_p - z_o)$$

$$z_p - z_o = (z_s - z_o)[D - Ax_o - By_o - Cz_o]/[A(x_s - x_o) + B(y_s - y_o) + C(z_s - z_o)]$$

Here, the numerator and denominator of each of the difference quantities $x_p - x_o$, $y_p - y_o$ and $z_p - z_o$ contains terms at most linear in the source variables $x_s$, $y_s$ and $z_s$; this is characteristic of (perspective) projection onto a plane. The system here allows perspective projection onto planes and onto a class of quadratic surfaces S for which the projection $(x_p, y_p, z_p)$ onto the surface S may be accurately represented by the equations $$\begin{aligned} x_p &= x_o + [a_1x_s^2 + b_1y_s^2 + d_1x_sy_s + g_1x_s + h_1y_s + m_1]/R' \\ y_p &= y_o + [a_2x_s^2 + b_2y_s^2 + d_2x_sy_s + g_2x_s + h_2y_s + m_2]/R, \\ z_p &= z_o + [a_3x_s^2 + b_3y_s^2 + d_3x_sy_s + g_3x_s + h_3y_s + m_3]/R, \\ R &= a_ox_s^2 + b_oy_s^2 + d_ox_sy_s + g_ox_s + h_oy_s + m_o. \end{aligned} \quad (3)$$

The class of suitable quadratic surfaces S for which this is satisfied includes certain conics; but other surfaces that may be locally approximated by conical surfaces or others in this class may also be used for the perspective projections. The projected point $(x_p, y_p, z_p)$ may be identified with the target point $(x_t, y_t, z_t)$ for purposes of display.

Figure 48:
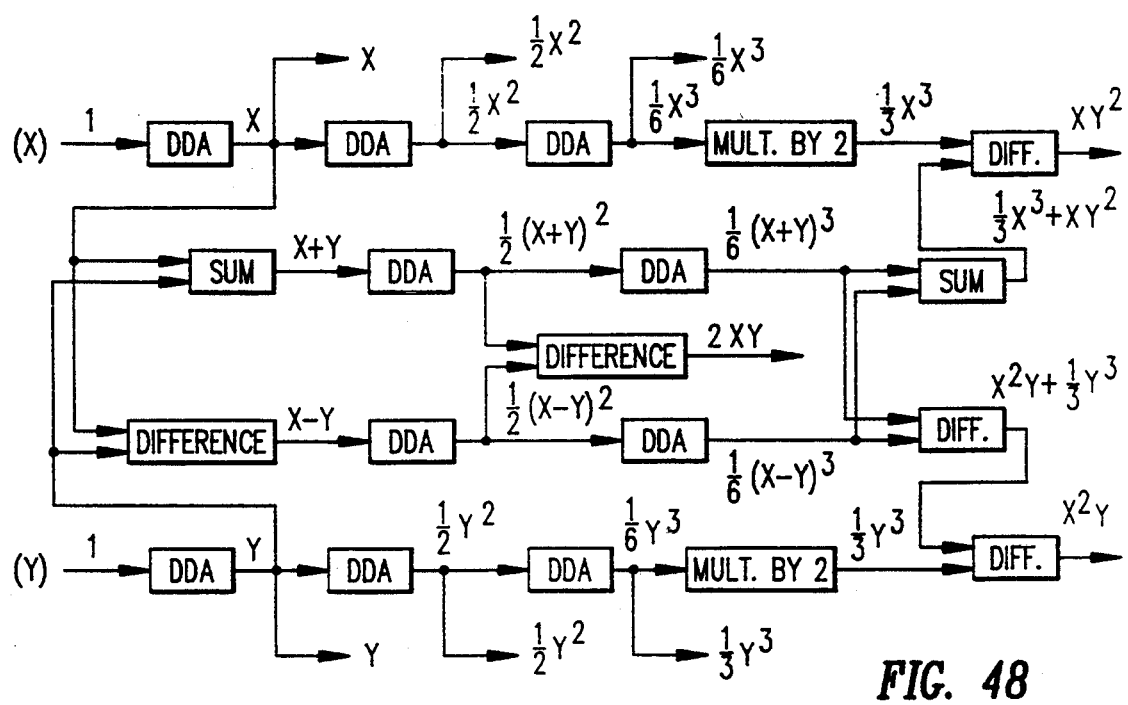
FIG. 48 illustrates schematically a DDA network that is useful in generating the polynomial terms $x$, $y$, $x^2$, $xy$ $y^2$, $x^3$, $x^2y$, $xy^2$ and $y^3$.

The powers $(x_s)^k$, $(y_s)^m$, $(z_s)^n$ (k,m,n=1,2 or 3) of the individual source point coordinates used in Eqs. (3) are generated using a sequence of digital differential analyzers whose uses are well known in the art. With reference to FIG. 48, passing a constant signal (1) through a single DDA produces a variable t, which is the integral of 1; passing the variable t through a DDA produces the integral of t, namely $t^2/2$, and integration of this last quantity by use of another DDA produces $t^3/6$. The variable t may be identified with any of the coordinates x, y or z. FIG. 48 illustrates how the coordinate terms such as x, y, $x^2$, xy and $y^2$ that appear in Eqs. (3) may be generated using the DDAs, and how the third degree coordinate terms $x^3$, $x^2y$, $xy^2$ and $y^3$ may be generated.

Figure 49:
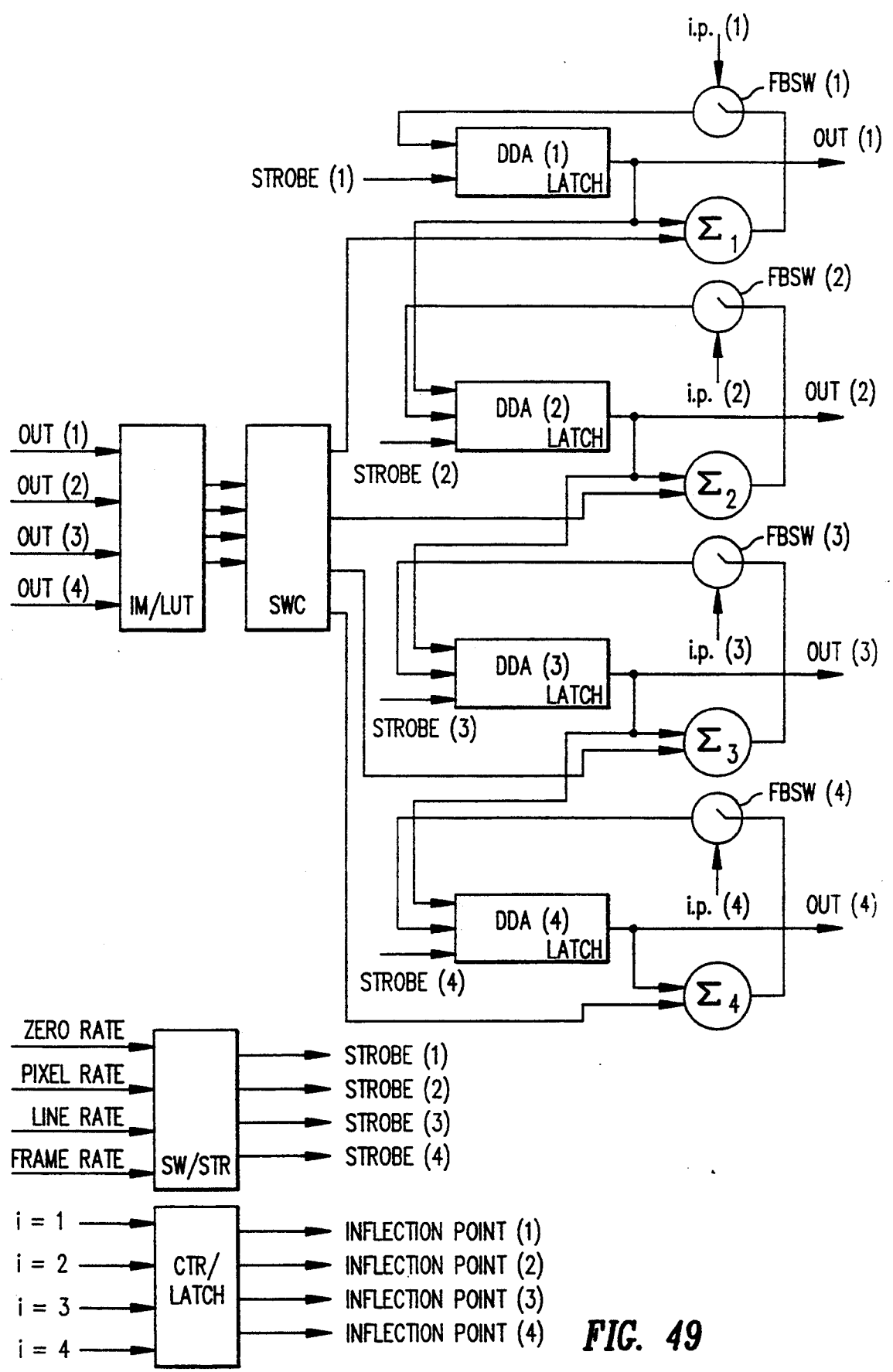
Figure 53:
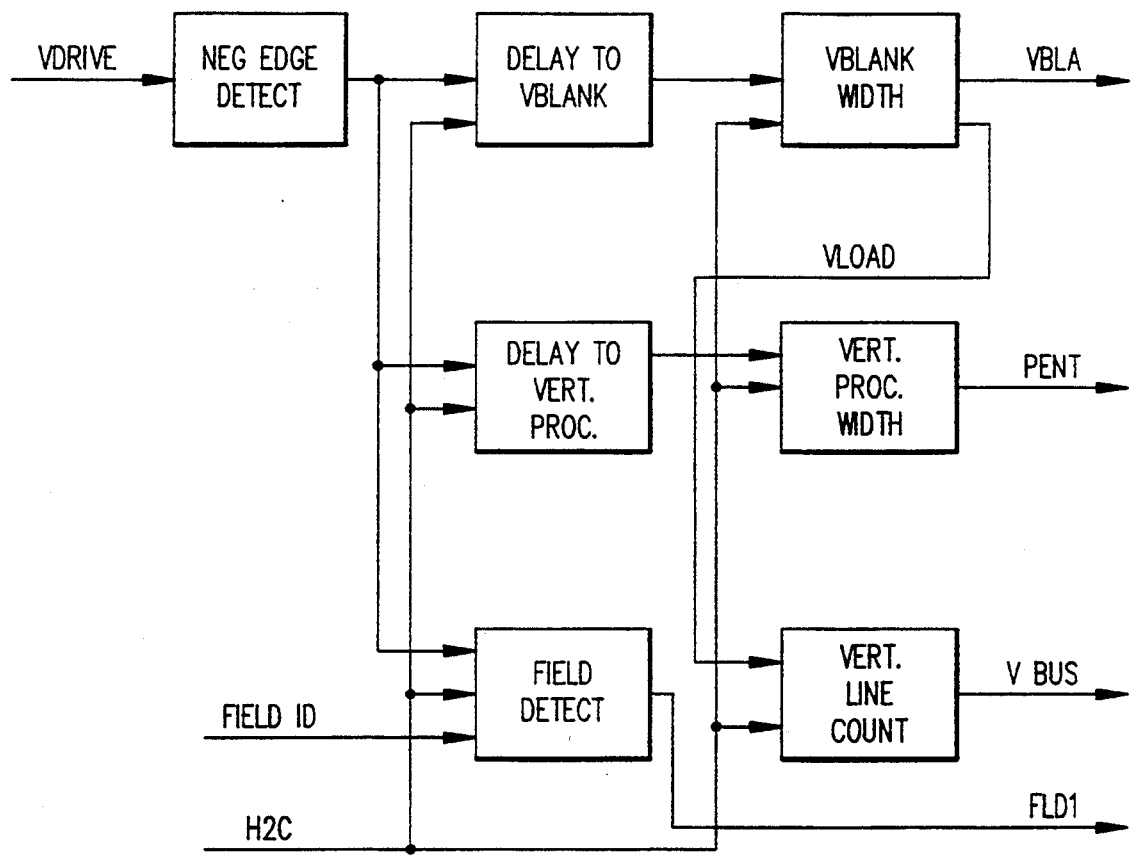

FIG. 49 shows a generalized DDA module that is part of the DDA network in a T-chip in one embodiment. The T-chip itself may have as many as three such DDA modules or a total of 12 DDAs within the chip. Two of the three DDA modules are associated with one of the eight P-file object parameters ($x_{start}$, $x_{stop}$, $x_{accum}$, $x_{nuline}$) or ($y_{start}$, $y_{stop}$, $y_{accum}$, $y_{nulene}$). A third module is associated with the background ALU.

In FIG. 49, DDAs (1), (2), (3) and (4) correspond in a conventional form of use to a first integral, second integral, a third integral and a fourth integral of a variable. For example, if a function f(t) is passed serially through DDA(1) and DDA(2), the output signal would be substantially $$\int_o^t dt_1 \int_o^t f(t_2)dt_2.$$

Each of the output signals from a DDA denoted out (i) (i=1,2,3) in FIG. 49 is fed back to an input module IN/LUT that has an LUT incorporated therein that can pass an input function F(t) straight through (identity map times an arbitrary constant multiplier) and/or can generate an output signal G(F(t)) that is, for example, a non-linear function of the input signal such as $G(x) = \exp(ax)$ or $\sin(bx)$ or $cx^d$ (d>0) or a combination of such functions. The output signals from IN/LUT are then passed through a switching circuit SWC that routes each input signal to SW to a summing circuit $\Sigma_i$ (i=1,2,3,4) associated with DDA no. i. The summing circuit $\Sigma_i$ also receives as input the signal out(i), with the sum of SW(i) and out(i) being fed to an input terminal of DDA no. i for further processing; this last feedback may be disabled or enabled by a feedback switch FBSW(i). The output signal from DDA no. i is also fed as input signal to DDA no. i+1; this set of inputs yields the integration sequence $$f_{i+1}(t) = \int^t f_i(t')dt'(i = 1,2,3).$$

The feedback switch FBSW(i) also serves as inflection point controller for a counter associated with DDA(i). The counter CTR can be reversed in direction and thus may count up or down as a sequence of signals passes through FBSW(i). This allows the DDA output to manifest an inflection point, whereby the DDA counts upward for some predetermined period, then counts downward after that point; the inflection point logic may be used elsewhere in the system, for example in constructing ramp functions for border insert. A switching/strobe signal device SW/STR receives as many as four input signals, zero excitation rate (no strobe), pixel rate, line rate and frame rate from other sources, switches these input signals to the appropriate output terminals, and generates strobe output signals strobe (i) (i=1,2,3,4) that are fed to and control the rate of response of the DDAs as shown. The generalized DDA network shown in FIG. 49 is a very flexible network for generation and control of coordinates and other quantities used in the video system.

Division of the numerator by the denominator in Eqs. (3) and elsewhere is implemented by first forming the logarithm to the base 2 (written $\log_2(.)$ here) of numerator and of denominator using high speed PROM LUTs, subtracting the two logarithms, and forming the antilogarithm (exponent with radix=2) of the difference, again using high speed PROM LUTs.

In the T-S Mathglue logic, fifteen mantissa LUTs out of the T-chips are used to address a $\log_2$ LUT. The $\log_2$ (denomonator) is subtracted from the $\log_2$ (numerator) and the resulting difference is applied to the input of the inverse $\log_2$ LUT. The exponent LUTs out of the T-chip are used in conjunction with the sign LUTs out of the T-chips to determine whether or not the resulting transistor address is in range.

One embodiment of the system uses two T-chips for source-to-target transformations (S-T), two T-chips for T-S transformations, and a fifth T-chip for border insertion. FIG. 50 illustrates two T-chips in use to form the common denominator D and the numerators $N_{xT}$ and $N_{yT}$ for the x-coordinate and y-coordinate projections, respectively, of an assembly of source points on an image surface $(x_T, y_T)$. In response to a request by the P-file to provide the T-S transformation information, the two T-chips generate $N_x$, $N_y$ and D and send these to the "Mathglue" module, which is closely associated with but is not a part of a T-chip. The Mathglue module performs simple arithmetic operations (add, subtract), forms the logarithm (base=2) and the antilogarithm or exponential of a number, converts floating point numbers to fixed point (in hexadecimal), and identifies or tags numbers that are out-of-range (too large or too small) and that must therefore be handled differently. Where, for example, the ratio $N_{xT}/D$ is to be computed, the Mathglue module (FIG. 50) will form $\log_2(N_{xT}) - \log_2(D)$ and exponentiate this difference, after verifying that $N_{xT}$ and D are both positive (or that $-N_{xT}$ and $-D$ are both positive). In the S-T transformation the required quotient is of the form $$(Px)^{\frac{1}{2}}/Q^2 \text{ and } (Py)^{\frac{1}{2}}/Q^2.$$

In this case the log tables to which the T-chip polynomials are applied to compute $\frac{1}{2}\log_2 P_x$, $\frac{1}{2}\log_2 P_y$ and $2\log D$. The appropriate subtractions are performed and the resulting logarithm is used directly to index into the RAM tables of filter coefficients since the logarithms contains the necessary information about the directional derrivatives $$\frac{\partial \nabla}{\partial x} \text{ and } \frac{\partial \nabla}{\nabla y}.$$

In the transform/display mode, the T-chip generates addresses of successive pixels to be shown on a raster display; adjacent horizontal pixels need not reside in adjacent memory positions. This facilitates the use of scale-up (expansion) and scale-down (compression) in moving from source image to target or screen image, and it also facilitates other manipulations of mapping from source-to-target or from target-to-source. Scale change on the display screen is independently adjustable along the x-, y- and z-axes so that a transformation $$(x,y,z) \to (s_1 x, s_2 y, s_3 z)$$

is permissible. A zoom operation, equivalent to the coordinate transformation $$(x,y,z) \to (sx, sy, sz) \quad (0 < s << 1 \text{ or } s >> 1),$$

is also available. The operations of three-dimensional rotation and of mirroring, implemented by a transformation such as $$(x,y,z) \to (x_c \pm x, y_c \pm y, z_c \pm z),$$

are also available.

T-chip Structure

The T-chip has four major blocks, built from ten sub-blocks, as illustrated in the simplified block diagram in FIG. 51. Block 1 contains the sections or sub-blocks: (1) NSYNC, a new sync timing circuit for horizontal and vertical timing chains; and (2) the P-file. The other blocks contain: (1) TCU, a timing and control unit for object timing, foreground ALU control, linear background counting, display memory write control, polygon filling, vector writing; enabling digitization and stipple control; (2) BIU, a bus interface unit for bi-directional bus control, ready signal generation, data read latching, address/data de-multiplexing and data read multiplexing, all for the CPU; (3) MAR, memory address registers for x- and y-coordinates, and multiplexers, for object control, for memory cycle latches, for exponent encoders for x- and y-coordinates, for address, for barrel shifter addresses, and for border insert chip logic; (4) CREG, control registers for P-file link control, for control and timing of digitization, and for configuration registers; (5) CMUX, which are CPU read multiplexers; and (6) BKGALU, background ALUs for background ALU control, next-line processing, and border insert chip logic; and (7) XALU and YALU, which are the x-coordinate and y-coordinate DDA ALUs and registers. The NSYNC section contains synchronism stripper and generator circuits for stripping the signal externally. This section performs at the full rate of 13.5 MHz and generates the timing required by the chip to control horizontal and vertical displacement, the timing windows for HFG (horizontal foreground) transfers and the vertical refresh timing windows used for the shadow copy of the two fields.

The BIU section controls the access to and from the P-file. The time division multiplexing of access to the P-file RAM is controlled by logic in this block and logic in the BIU.

The P-file section contains the P-file address sequencer, the P-file address multiplexers, the P-file data multiplexers, the P-file output data buffer controls, and the P-file write pulse generators. Together with signals from the NSYNC, BIU, BKGALU, and TCU modules, signals from this section control DMA transfer, during horizontal blanking, of working set P-file RAM data to the foreground $x_{ALU}$, $Y_{ALU}$, $x_{start}$, $x_{stop}$, and $y_{stop}$ registers; the address and data path control for the P-file RAM; the line rate changes to the P-file RAM data; the vertical field rate changes to the P-file data; and the vertical shadow DMA transfer to the working set P-file RAM. The P-file section is the most complex circuit in the chip.

The P-file address generator is an eight-bit synchronous counter with synchronous clear and synchronous load. The output signal of this counter are fed back to control the enable toggle and clear inputs. At the beginning of the horizontal blanking interval, this counter is preset by a PLOAD signal from the HSYNC logic part of the SYNC Block. The present counter output signal are used in conjunction with the HFG signal from the HSYNC logic to enable the counter to toggle. The counter outputs are sent through a multiplexer controlled by the HFG signal and are encoded to produce the addresses for the foreground DMA refresh. FIGS. 33A and 33B show the timing cycles.

The sequencer runs for 24 cycles at 6.75 MHz, during which time the TCU block decodes the counter output signal and generates the load pulses for the foreground registers. Following the last count, the sequencer resets the counter.

Once the HFG signal is removed, the signal VBLK is low (false), and if the display is within the active object area, the sequencer begins processing the next line of P-file data. The counter is cleared, and the $x_{nuline}$ parameters are the first ones to be processed, followed by $y_{nuline}$, $x_{acc}$, $y_{acc}$, $x_{start}$, $y_{start}$, $x_{stop}$ and $y_{stop}$. The P-file data are loaded into the background ALUs, and an accumulate signal is generated by the background ALU controller. Only registers changing at the line rate (6.75 MHz) are accumulated. Following the accumulate cycle, the register contents are then written back to the P-file RAM. After all registers have cycled through the background ALU, the sequencer selects the active background linear counter and performs its next line update. When this task is completed, the sequencer halts: next line updates are complete. When PLOAD falls again, the whole cycle is repeated.

The sequencer continues to run during active as well as inactive display time; that is, before the $y_{start}$ line has been reached, the sequencer continues to cycle, but the accumulate cycle is inhibited. The data read in are not modified when they are written back to the RAM. During the vertical blanking interval, the shadow/working address line is forced to shadow status to produce shadow copies, and to working status to produce field rate change cycles. If the sequencer is in the shadow copy mode, registers in the working set that are changing at a field rate are not written. When the sequencer is in the field rate update mode, only register's that are changing at a field rate are accumulated; all others are written back unmodified.

The most complex part of the P-file circuitry is in the P-file address multiplexing. Several of the address lines have multiple sources. Selection of the source depends on several conditions. The P-file sequencer has four modes of operation: (1) HFG (at end of line); (2) Next Line Update (active display); (3) Field Rate Update (vertical); and (4) Shadow Copy (vertical).

In addition, certain address lines are a function of the bank select registers and others are a function of the P-file link registers.

Each field has 224 P-files available (a total of 448) and 256 backgrounds available (a total of 512). The minimum P-file RAM required is 2K of double words for a frame-based system. For a field-based system, the minimum is 1K of double words. The following figures show the different address sources to the P-file. Signals with the prefix CRD are from the control register block.

Figure 54:
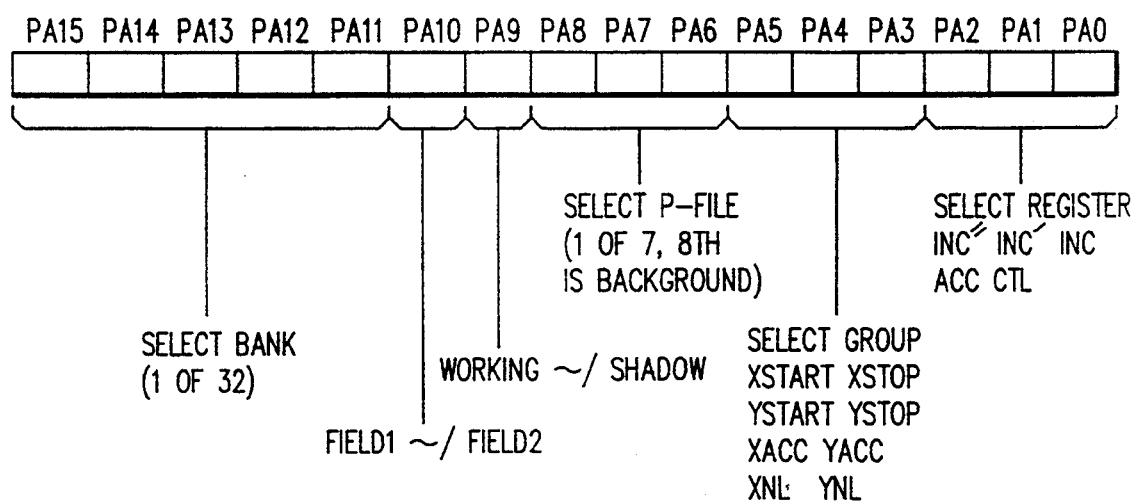
FIG. 54 shows the functional grouping of P-file addresses.
Figure 55:
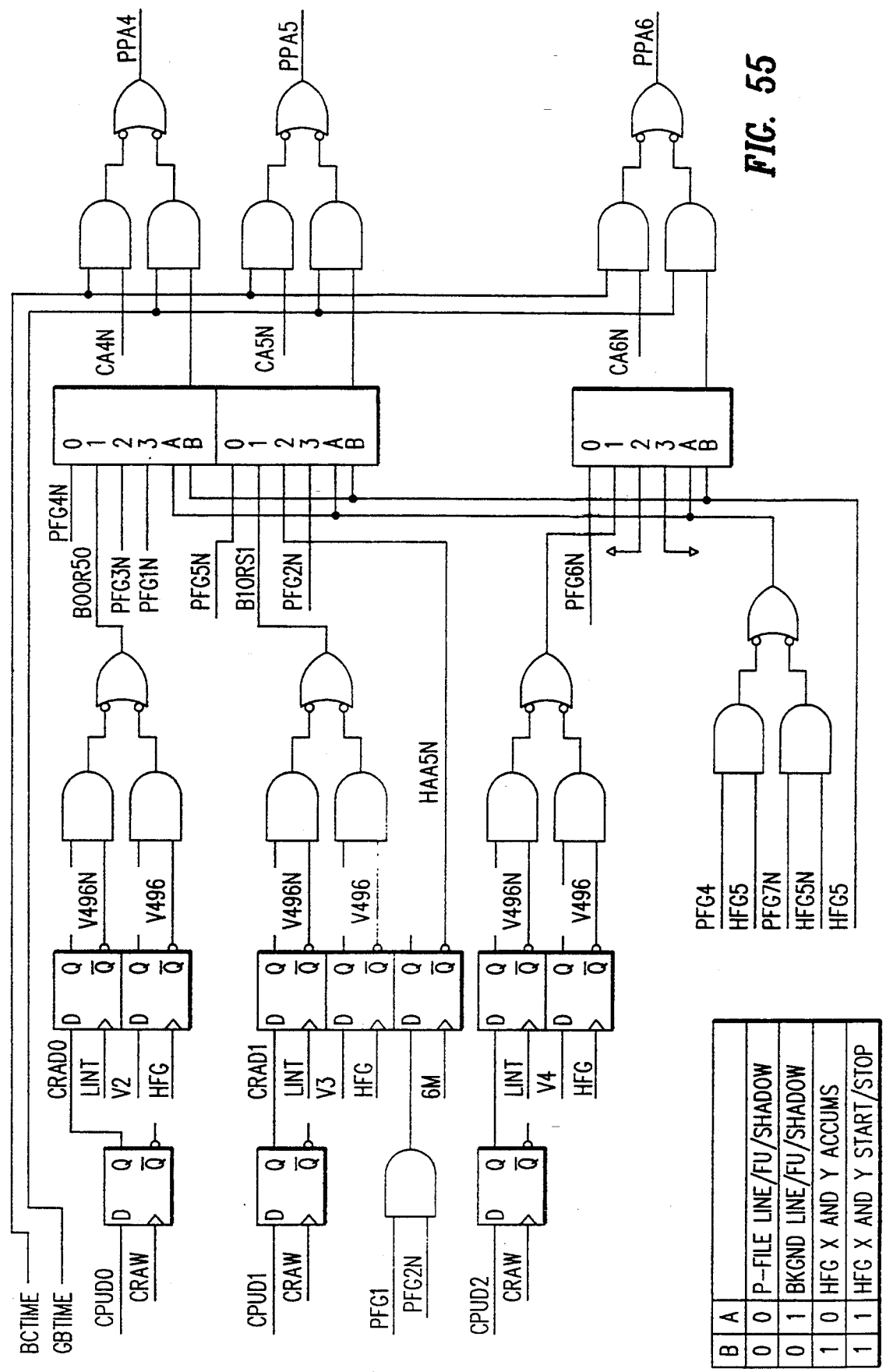
FIG. 55 illustrates how register set address lines are generated from next-line processing information.
Figure 56:
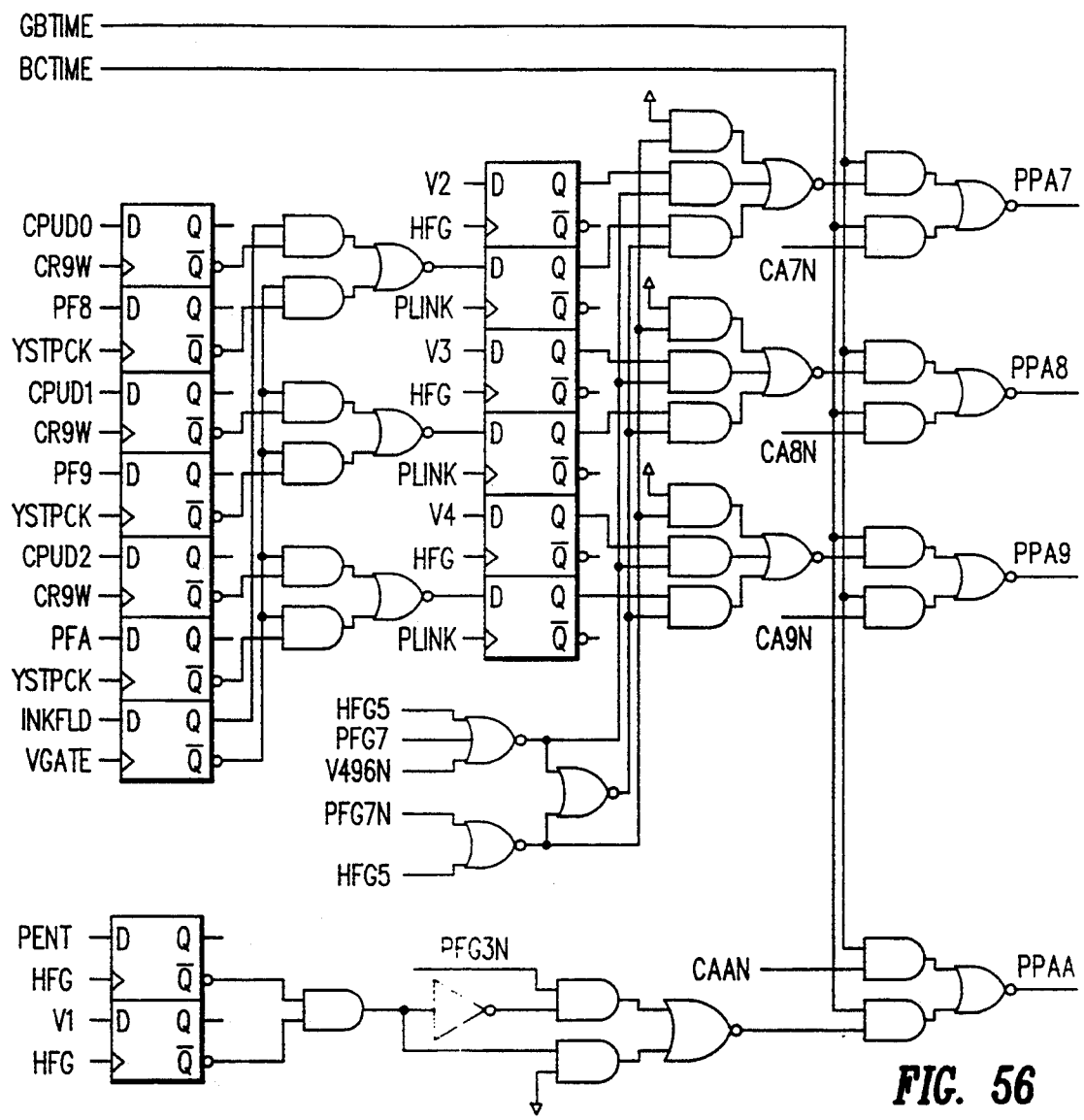
FIG. 56 illustrates the method used to create an active P-file address.
Figure 57:
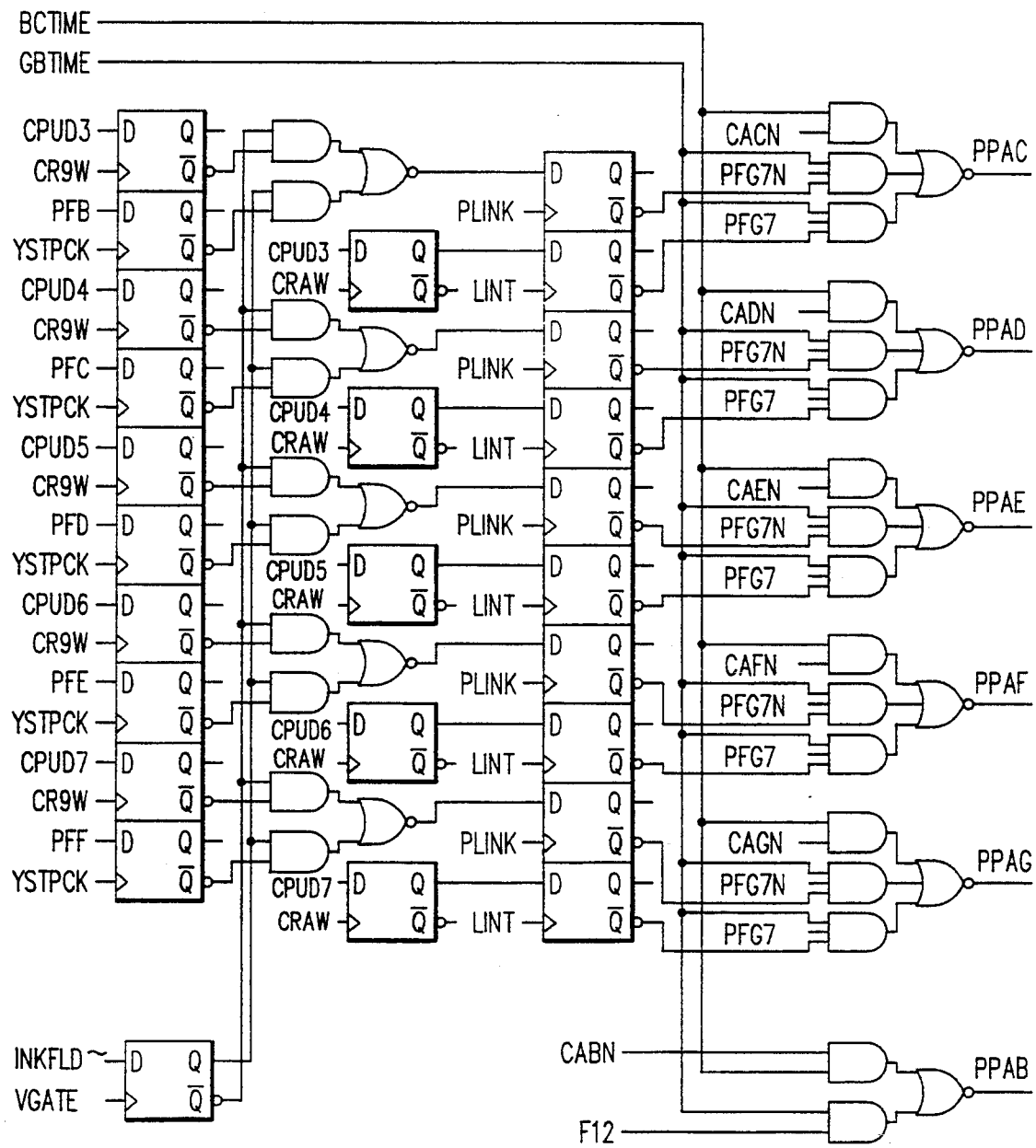
FIG. 57 illustrates the operation of a multiplexer used to transmit an active P-file address (one of 32 such addresses).

In FIG. 54, the address lines to the P-file RAM are shown grouped according to function, with bits 0–2 determining the register, bits 3–5 determining the group of registers, bits 6–8 selecting one of seven P-files (no. 8 is background), bit 9 selecting the working or shadow register for the field of interest, bit 10 selecting the field (no. 1 or no. 2), and bits 11–15 selecting the bank (one out of 32). FIG. 55 illustrates how the register set address lines are generated as a function of the next-line processing status (HFG, next line, field update, or shadow copy). The addresses written to the P-file RAM during HFG operations have to be changed considerably from the P-file sequencer counter's output, and FIG. 56 demonstrates how this is accomplished. The active P-file selection is made with address bits PA8, PA7, and PA6. FIG. 56 shows the method used to create an active P-file address. This figure also shows PA9, the working/shadow address line. In addition, the logic required to sequence the P-file addresses through all of the P-files in the present bank during vertical blanking is shown in FIG. 57. P-file address bit PA9, the field select bit, is generated by the field detect logic in BLKI/NSYNC/VSYNC. FIG. 57 shows a simple mux (multiplier) used to gate the PA9 address out. Because there are 32 banks of P-files to choose from, five bits are required to select the active bank of P-files.

Figure 58:
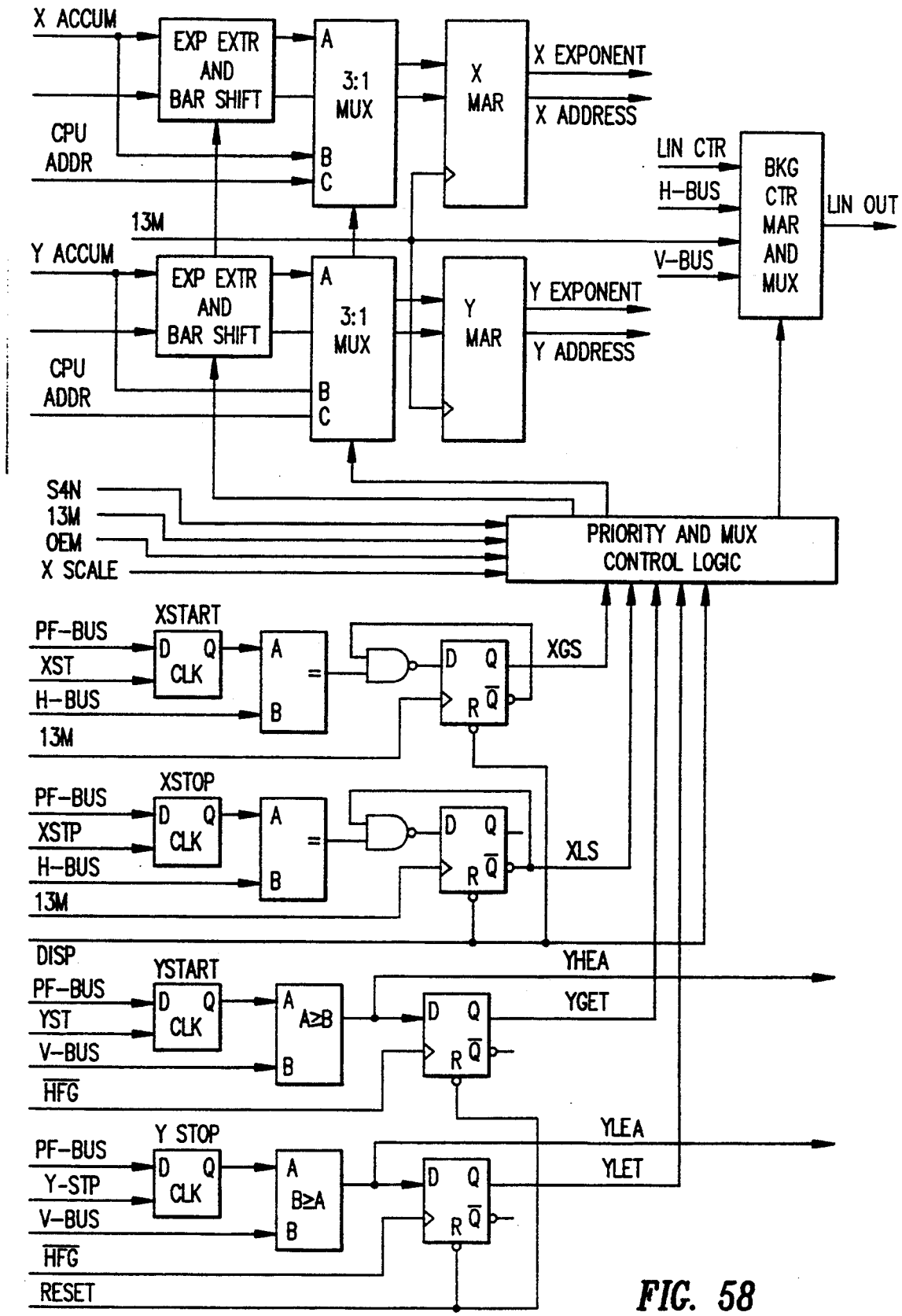
FIG. 58 is a simple block diagram of the memory array register MAR.

FIG. 58 is a simple block diagram of the MAR section, showing in gross detail the Memory Address Register, the MAR input multiplexers, the MAR mux control and priority logic, the x and y accumulator output exponent extraction and barrel shift logic, and the object start and stop comparators and latches.

Figure 59:
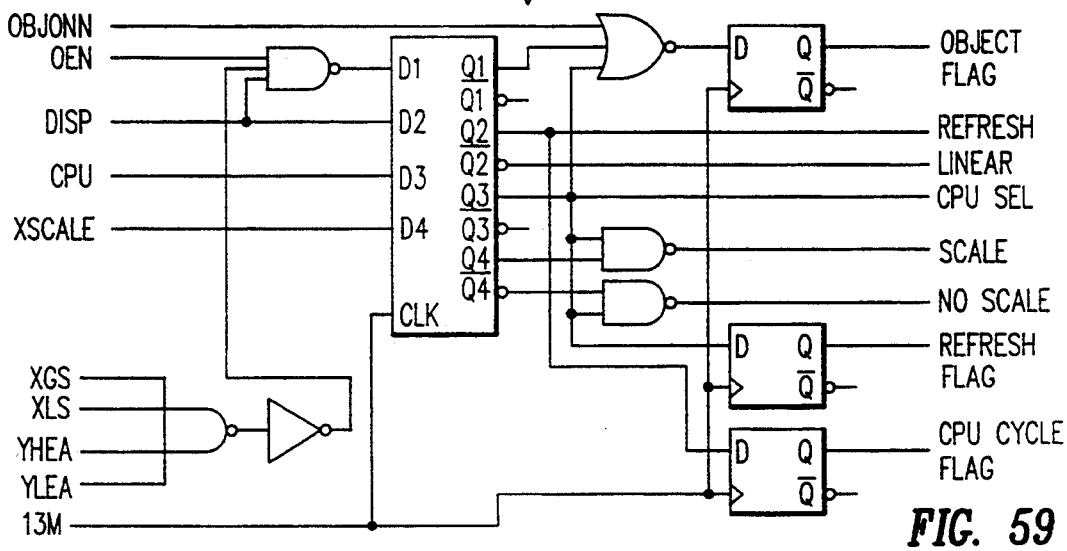
FIG. 59 illustrates selection of the next cycle address by the MAR multiplexer.

Multiplexers are required at the inputs to the Foreground MARs to select one of three sources. Two of the sources are from the foreground accumulator outputs, and the third is from the CPU. Under the control of the BIU, the MAR mux priority and control means shown in FIG. 59 selects one of the inputs to be the next cycle address for the display RAM. The BIU supplies the properly phased signal "cpu" that commands the MAR mux control logic to route the CPU addresses into the MAR.

Multiplexers are also required at the input to Background MAR to select one of two sources. The primary input to this MAR is the linear background counter. However, during blanking, dynamic RAM refresh addresses are routed to the MAR, and these signals appear on the output pins.

An essential component for the operation of the chip is the object definition logic. This logic defines where the foreground ALUs operate, when the BKGALU starts performing next line updates, and when to perform $y_{stop}$ P-file linking. Without this critical section, the chip does not operate well. The object definition logic uses four comparators; two of these are magnitude comparators ($y_{start}$ and $y_{stop}$), and two are equality comparators, ($x_{start}$ and $x_{stop}$). These comparator signals are used to control the foreground and background ALUs. The registers for $x_{start}$ and $x_{stop}$, etc. that define the "object window" are dynamic and are changed by the chip on a line-to-line and/or a field-to-field basis. The binary exponent extraction circuit and barrel shifting logic tests for field bit equality in groups of four bits, and left justifies the mantissa as a function of the exponent value extracted. The left shift function is performed by the barrel shifter.

Four registers hold the current line's starting pixel (X-USTP) and stopping pixel (XUSTPS), the starting vertical line (Y-USTP), and the stopping line (YUSTPS). The starting pixel represents the H-Bus (pixel counter output) value at the time the foreground ALUs start processing. This register is loaded during the HFG DMA time by a pulse supplied by the TCU. The TCU in turn is driven by the P-file sequencer counter output and by the HSYNC-generated signal HFG. Recall that the HFG signal defines the DMA window.

The stopping pixel represents the value of the pixel counter at which time the foreground ALU processing stops. The line number registers Y-USTP and YUSTPS represent the line counter value at the time foreground processing (Y-USTP) is enabled and foreground (YUSTPS) processing of the current P-file is disabled.

P-file data are loaded into these registers from the P-file RAM. Both X registers have ten bit lengths. P-file $x_{start}$ bits 16–25 are loaded into the X-USTP register (PFP:PFG). The XUSTPS register is loaded with P-file data from the $x_{stop}$ bits 16–25. Since there are only 262.5 lines of video per field for NTSC, line counter start and stop values require only nine bits per field. The nine bits are enough for 512 lines, and thus allow for PAL as well; PAL is 625 lines/frame, or 312.5 lines/field. The Y-USTP register is loaded with $y_{start}$ Accum bits 16–24, and similarly, the YUSTPS register is loaded with $y_{stop}$ Accum bits 16–24. If the binary decimal point is positioned between bits 15 and 16, the X registers are loaded with the ten LSB integer bits of the P-file data. Correspondingly, the Y registers are then loaded with the nine LSB integer bits of P-file data.

Two comparator modules, X-UCMP and Y-UCMP, define the object activity window. For the current line, the X comparators define the start and stop of object processing. On a line-to-line basis, the Y comparators determine which display lines are to have object processing. The Y comparators provide a coarse definition of the object's window, and the X comparators provide a fine tuner determination.

FIG. 60 illustrates how the X and Y comparators, the BKGALU, the vertical (line) counter, and the pixel counter all interrelate to create an object window. Note that in the figure a P-file link on YSTOP occurs for display line n+m. Display line n+m+1 has object 2 active. $y_{stop}$ for object 1 is therefore set to n+m.

The UMEN sub-section of the MAR contains the foreground MAR mux control, the background MAR mux control, the active object window logic and latch, and the memory cycle flag latches.

The mux control for the foreground X and Y output MAR registers selects one of three inputs. If the next cycle is to be a CPU cycle, the X and Y MAR register input signals are from the latched CPU addresses. For non-CPU cycles, there are two possible inputs for the MARs. Control register 0 determines whether the MAR inputs are either the reduced ALU outputs (for small systems) or the encoded-exponent-extracted ALU outputs.

There are only two sources for the background MAR. During active display, the linear counter output is steered into the MAR register input. If either horizontal blanking or vertical blanking is occurring, the inputs to the MAR are the horizontal pixel and vertical line counters. Bits 1–8 of the horizontal counter, and bits 1–8 of the vertical counter are brought out on the lower 16 output pins. When an output pin, Refresh, is high, the linear address outputs can be used to perform dynamic RAM refresh.

Three output pins of the chip are used to signal the type of memory cycle that is currently in use. All three of the pin signals are clocked by the master clock at a rate of 13.5 MHz; these signals indicate what addresses are on the output for the X MAR, the Y MAR, and the Background counter MAR. Memory cycle flag, when high, indicates that the X MAR and Y MAR outputs are from the CPU.

VVI is the system Virtual Video Interface. Its purpose to provide a software layer for access by programs to the functionality of the present and future system and similar products. The concept is that of a software layer, as an abstraction that can provide an interface to some device or set of devices yet insulate the application (program using the devices) from the detailed implementation of the device. This concept is familiar in other computer areas (e.g. graphics packages like VDI, DGIS, CORE, PHIGGS, etc.), but is new to the video industry and video processing devices. This is partly due to the fact that, historically, due to technology limitations, video processing hardware was designed specifically for each function, with each hardware box performing one and only one function, and being hard-wired (perhaps with firmware) to serve its purpose. With the availability of general-purpose video hardware such as the subject video system, many functions can be performed on the same hardware.

To facilitate the growth of new applications, VVI acts as a clean, general interface that provides access to all the functionality and power of the hardware. At the same time it insulates the user from specific implementation details that the user may not want to learn (and shouldn't rely on lest they change in a future release of the product or future product). VVI is possibly the first such software interface standard for video.

To accomplish this, VVI is modeled after computer graphics packages like VDI and DGIS, but with enhancements for video. For example, in computer graphics, the standard mechanism of manipulating video has become the rasterop (raster operation, or bitblt for bit-block-transfer), which operates on blocks (rectangles) of raster bits by moving them or combining them with others using the bit-wise logical operations AND, OR, XOR, etc. VVI generalizes this concept to include arbitrary-shaped, soft-edged rasters with full Y, U, V, $\alpha$ (32-bits). The mask and shape specify not only the boundaries of the raster, but also the fall-off in transparency for combining a raster with other rasters. The combining is full video keying (full multiply of components by arbitrary mix coefficients). VVI's concept of raster extends beyond the frame buffer to include all parts of memory, all frame buffers, system memory, coefficient RAM for the F-chip mixing, etc. Where the requested operation can be performed by hardware, VVI does it via hardware; where it cannot be performed by hardware, VVI does it with software. In this way, the application programmer need not become an expert in anti-aliasing techniques and video combining techniques to produce broadcast-quality video output.

Virtual Video Interface (VVI), an extension of the Virtual Device Interface that is the industry standard, is used here for video application such as painting, digital video effects, titling, animation, etc. and as an interface to the 32-bit microprocessor used here. VVI interfaces with the hardware, with the microprocessor, with the special effects and painting applications, and with other functional modules of the video system. For example, VVI includes the opacity parameter ($\alpha$) determination and the pre-filtering (H and V) done to avoid aliasing on compression or rotation of the screen image.

Multiple states can be created and modified within VVI. The selected state defines how the application will affect the video device. Every call to VVI includes a state identifier which points to the state information. The state can be switched simply by changing this state identifier, and can be changed as often as desired. The state identifier is returned by VVI CreateState which allocates the state structure. The state structure includes at least eight modes: device select for output; transform drawing mode, Microsoft Windows; clipping rectangle; keying rectangle; keying sharpness; keying pattern; and pen/brush/draw modes. Sixteen control functions are available: (VVI) enable; disable; confiration; create state; delete state; save state; restore state; device select; set current raster; set save raster; set mask raster; define cursor; inquire cursor; move cursor; show cursor; and remove cursor.

Painting requires high speed data transfer between CPU memory and the frame buffer and between different areas of the frame buffer. Precise control over areas to be affected is necessary down to the pixel level. Compositing of variable size brushes onto a canvas requires high speed multiplies. The following functions are useful for painting. Included are 15 basic drawing functions: read pixel; write pixel; read weighted pixel; write weighted pixel; copy raster; rectangular outline; rectangular fill; polyline; draw line; flood fill; boundary fill; set pan attributes; set brush attributes; set draw mode; and scan pixels for a value.

Digital Video Effects require high speed image processing. Hardware assist is mandatory for real time processing. The following functions merely define the high level interface for such processing. Included are the alpha channel definition and video source selection. The effects manipulations include: transform an image; set transform mode; set alpha key; select source of video; and load coefficient map.

Titling requires text with very smooth edges. Most of the difficulty with this is in the definition of the font. This has three modes: draw text to buffer; load font to frame buffer; and set visible area of frame buffer. Titling also requires scroll and crawl. The VVI_CopyRaster function described above can be used to move data around in the frame buffer and the VVI_SetRefreshRectangle function can be used to move the visible area of the buffer.

Data structure types are defined to maximize shared data between the states. Data structure types include: an identifier that selects a WI state; a color value that specifies Y, U, V, $\alpha$ channel values; a selection that determines which channels may be written to; an N×N array of alpha compositing values; a two-dimensional array of coefficients and an identifier to select a coefficient map.

FIG. 1 also shows an electronic drawing tablet, controlled by the control panel through a four-axis joy stick, shown schematically in FIG. 61. The four-axis joy stick is a controller with four independent axes of operator control: (1) forward and back; (2) left and right; (3) twist clockwise and counter clockwise; and (4) up and down. Physically it consists of four motion detectors mounted inside the control panel connected by a shaft to a knob accessible by the operator that can be manipulated in the four axes described above.

The system responses of each of the four axes as a group or individually can be assigned under computer control to perform various functions in the video system. Typically, in digital effects the axes would be assigned as shown in Table 2.

TABLE 2

Typical Assignment of Joy Stick Axes

| Operation | x (forw/back) | y (left/right) | Rotate (twist) | Push (up/down) |
|---|---|---|---|---|
| translate | translate in x | translate in y | translate in z | time |
| rotate | rotate about x-axis | rotate about y-axis | rotate about z-axis | time |
| scale | scale x coordinate | scale y coordinate | scale x and y coordinates | time |

The number of modes is large and only a few are shown. The translate and rotate and scale picture operations represent movement of a source raster such as a picture off a television camera mapped in three-dimensional space, then projected onto the target raster of the television monitor. These operations are done as a function of time to produce animation. The time column is used to step through or scan through time. Typically the list of desired manipulations is a time-ordered list.

The operator creates the list by in effect defining a list of manipulations and the exact time of each such manipulation, for example by defining start and stop times or duration, or some combination. The operator can also select a splining or curve smoothing operation as to how the picture goes from one list of manipulations at some point in time, a key frame, onto the next list. The list of data that are created can then be replayed in time under automatic machine control. The time axis is used to select a key frame (time) to be active or to mark the end of a key frame that is active. The use of any of the four axes is not limited to X, Y, Z and time functions but is extendable to any four controls such as border color and width, type font select, etc.

Although the preferred embodiments of this invention have been shown and described herein, variation and modification may be made without departing from the scope of the invention.

We claim:

1. In a video system that displays a video image by means of a substantially rectangular array of picture elements or pixels, each pixel having an associated pixel value pv that contributes to the video image, with each row in the array containing about the same number of pixels and each column in the array containing about the same number of pixels, where the length of the array is N•N$_1$ pixels and the height of the array is N•N$_2$ pixels and N, N$_1$ and N$_2$ are all integers, a method for interpolation of the pixel value of a fictitious pixel whose position lies between and does not coincide with any of the pixels that comprises the video image array, the method comprising the steps of:

choosing an array of N×N pixels from the video image array, with the boundaries of this chosen array being parallel to the boundaries of the video image array and with the fictitious pixel lying near the center of this chosen array; and providing a filter including an array of, N$^2$ averaging coefficients (C(m,n)), where m, n=0, 1, ..., N−1 and the sum $$\sum_{m=0}^{N-1} \sum_{n=0}^{N-1} C(m, n) = 1$$

and forming a weighted sum of pixel values $$S = \sum_{m=0}^{N-1} \sum_{n=0}^{N-1} C(m, n)pv(m, n)$$

where the sequence $\{pv(m,n)\}_{m,n=0}^{N-1}$ includes all pixel values in the chosen N×N array of pixels, with each such pixel value in the chosen array appearing as one member pv(m,n) of this sequence;

wherein said step of providing an array of said averaging coefficients and forming a weighted sum of said coefficients comprises the steps of:

dividing said video image array of pixels into a sequence of Fundamental Blocks of; N$^2$ pixels each, with each pixel belonging to only one such Fundamental Block and with the boundaries of each Fundamental Block being parallel to the boundaries of said video image array;

assigning to each pixel in said video image array the rectangular coordinates (m,n), where m=0,1,2, ... , N•N$_1$−1 and n=0,1,2, ..., N•N$_2$−1, , with the pixel in the upper left corner of said video image array being assigned the coordinates (0,0), and a pixel in said array that lies m consecutive pixels to the right from the left boundary of said video image array and lies n consecutive pixels down from the top boundary of said video image array being assigned the coordinates (m,n);

providing an array of $N^2$ memories, numbered $r=0,1,2,\ldots,N^2-1$, with each such memory including a designated rectangular array of length $N_1$ and height $N_2$ of memory addresses having rectangular coordinates (p,q) beginning with (0,0) in the upper left corner of such array and proceeding in a manner substantially identical to that of the rectangular coordinate system for said video image array;

providing a mapping T(m,n) to store the pixel value pv(m,n) in said video image array with video image array pixel coordinates (m,n) in the memory address $$(p, q) = \left( \left[ \frac{m}{N} \right]_I, \left[ \frac{n}{N} \right]_I \right)$$

in the designated rectangular array of memory number $r = m - m_n + N(n - n_N)$, where $$[w]_N = \left[ \frac{w}{N} \right]_I \cdot N_1,$$

for $m=0,1,2,\ldots,N_1 \bullet N-1$ and $n=0,1,2 \ldots,N_2 \bullet N-1$;

rotating in a first direction by one address unit each of the designated memory arrays number $r = S_1 + k_1 \bullet N$ ($K_1 = 0, 1, \ldots, N-1$; $s_1 = 0, 1, \ldots, p'-1$), where $p' = m' - m_N$, then rotating in a second direction by one address unit each of the designated memory arrays number 1; $s_2 = 0,1,\ldots,n-1$), where $q' = n' - n_N$ and where (m',n') are the coordinates of the pixel in a corner of said chosen array that is centered on said fictitious pixel position wherein said rotating changes the pixel value stored in each memory;

applying the map $T^{-1}(r;p,q)$ to the contents at coordinates (p,q) of a subset of the designated rectangular arrays of the memories $r=0,1,2,\ldots,N^2-1$ resulting from the immediately preceding rotation step to produce an $N \times N$ array of pixel values pv'(m,n) corresponding to said video image array coordinates $$(m, n) = \left( r - r_N + p, \frac{r_N}{N} + q \right)$$

where $m=m'_N, m'_N+1, \ldots, m'_N-1$ and $n=n'_N+n'_N+1,\ldots,n'_NN-1$;

providing a sequence of $N^2$ permutations $P_t$ ($t=0,1,2,\ldots,N^2-1$) on a $N \times N$ array of entries where permutation number $t=k_3 \bullet N$ ($k_3=0,1,2,\ldots,N-1$) is a one-place rotation in the second direction of the rows of the array $K_3$ times with end-around carry and permutation number $t=k_3 \bullet N+s$ ($s=1,2,\ldots,N-1$) is the permutation number $r=k_3 \bullet N$ followed by an s-place rotation in the first direction of the columns of the $N \times N$ array with end-around carry;

forming the permuted array $P_t - 1C(m,n) = Q(m,n)$ of coefficients where $t=m'-m'_N \bullet (n'-n'_N)$ and {C(m,n)} is said array of averaging coefficients;

forming the sum $$S = \sum_{m=0}^{N-1} \sum_{n=0}^{N-1} pv'(m_N + m, n_N + n) Q(m, n)$$

as the interpolated pixel value; and displaying in place of a portion of the original video image the interpolated pixel value for a plurality of pixels.

2. In a video system with a video image defined by an array comprising lines of pixel values associated with picture elements or pixels, with array position coordinates ($X_m$, $Y_n$) (m=0,1,2,..., M'; n=0,1,2,..., N'), where each video image is formed by the combination of two fields with each field containing a subset of lines of pixels and the two lines of pixels comprising the array of pixels, where each line of pixels of one field is positioned between and adjacent to two lines of pixels of a second field, where a first field of pixel values is displayed on a video screen during time intervals $t_0$, $t_2$, $t_4$ and a second field of pixel values is displayed at time intervals $t_1$, $t_3$, $t_5$ and where $t_5$ precedes $t_4$ which precedes $t_3$ which precedes $t_2$ which precedes $t_1$ which precedes $t_0$ and where a pixel value of a pixel on line number k at horizontal position j with array position ($x_j$, $y_k$) has an associated pixel value pv($x_j,y_k$;t) that is displayed during time interval t, a method of constructing a synthetic pixel value of a non-existent pixel at position ($x_j,y_k$) in a line of the second field that takes account of relative motion or change in time manifested by pixel values adjacent to array position ($x_j,y_k$), the method comprising the steps of:

determining the rapidity of change with time of each of the pixel values at each pixel position ($x_j,y_{k-1}$) and ($x_j$, $y_{k+1}$) between the time interval $t_0$ [($t_0$, $t_1$)={t/$t_0$<t<$t_1$}] and the time interval $t_2$ and at each pixel position ($x_{j-1}$, $y_K$) between time intervals $t_1$ and $t_3$;

obtaining the pixel value pv($x_{j+1}$, $y_k$; t) for t in the interval ($t_1'$, $t_2'$)={$t_1$<t<$t_2'$};

introducing a parameter $\beta$ ($0 \lesssim \beta \lesssim 1$) that is either continuous or has at least three distinct values $\beta = 0$, $\beta = 1$, and $\beta_i (0 < \beta_i < 1)$;

setting $\beta = 0$ if substantially no change with time is perceived in any of the pixel values at positions ($x_j$, $y_{y-1}$), ($x_j$, $y_{k+1}$), ($x_{j-1}$, $y_k$, and ($x_j$, $y_k$), setting $\beta = 1$ if rapid change with time is perceived at any of those pixel positions, and setting $\beta$ equal to an intermediate value $\beta_i$ if the change with time perceived at least one of these pixel positions is non-zero but the change with time perceived at each of these pixel positions is less than rapid;

forming the sum $$pv'(x_j, y_k; t_0) = \frac{\beta}{2} [pv(x_j, y_{k+1}; t_0) +$$

$$pv(x_j, y_{k-1}, t_0)] + (1 - \beta) pv(x_j, y_k; t_1)$$

as the synthetic pixel value; and displaying the synthetic value for a pixel position in place of at least one pixel of the video image.

3. In a video system having substantially periodic horizontal blanking intervals, a method for rapid copying of pixel values from the video lines that comprise the video image to a set of M memories for subsequent display or storage, the method comprising the steps of:

providing a sequence of M fast-acting first-in-first-out registers, with each register having about the same number of pixel data storage positions where L is at least equal to the number of pixels that comprise a horizontal line of the video image divided by the value of M;

as each item of pixel data arrives at the video display system writing the data onto one of the registers in a predetermined pattern at the entry end of that register;

during a horizontal blanking interval of the video system, writing the pixel value appearing at the exit end of register number n to the corresponding memory number n for registers n=0,1,2, ..., M.

4. In a video system with a video image defined by a two-dimensional array, with array positions $(x_m, y_n)$, of picture elements or pixels and with each pixel having an associated pixel value pv that contributes to formation of the video image, a method of forming a desired signal value S of pixel values for up to a predetermined number M of pixels adjacent to a given target pixel, with weight coefficients that change from one target pixel to another target pixel and may change from one time interval $\Delta t_1$ to another time interval $\Delta t_2$, where the lengths of the time intervals $\Delta t_1$ and $\Delta t_2$ are each of the order of 74 nanoseconds, the method consisting of:

providing a filter including a predetermined number K of arrays (k=1,2, ..., K) of weight coefficients $C(J,k)_{j-1}{}^{jk}$ stored in a random access memory system, with the weight coefficients being jk real numbers that satisfy the normalization constraint $$\sum_{j=1}^{jk} C(j,k) = 1;$$

providing coefficient choice means whereby an array $C(j,k)_{j-1}{}^{jk}$ of weight coefficients may be chosen to form the weighted sum of $j_k$ pixel values $pv(x_m,y_n)$ of pixels with positions $(x_m,y_n)$ adjacent to or in a predetermined neighborhood $N(x_T,y_T)$ Of the position $(x_T,y_T)$ of the target pixel;

providing coefficient change means whereby an array of weight coefficients can be changed in a time interval $\Delta t$ that is substantially no greater than 74 nanoseconds forming the desired signal value sum $$S = \sum_{(x_j,y_k) \, inN(x_T,y_T)} C(j,k)pv(x_j,y_k);$$

and displaying the desired signal value in place of at least one of the predetermined number M of pixels in the video image.

5. A method of interpolating pixel signals in a video system for displaying a video image means of an array of picture elements each having an associate pixel signal, comprising the steps of:

choosing a portion of pixels from the array;

providing a plurality of sets of low pass filters, there being one filter in each set for each pixel of the portion;

providing a multiplexer for matching each of the filters to an associated pixel signal in the portion; and forming an interpolated pixel signal as a function of the stored pixel signals of the portion by passing the portion of pixel signals through the matched filters.

6. The method of claim 5, further comprising the step of performing the step of providing a multiplexer on a first integrated circuit chip and performing the step of forming an interpolated pixel signal on a second integrated circuit chip.

7. In a video signal having a video image defined by an array of picture elements each having a pixel value, a method of displaying a pixel that takes into account motion manifested by pixel positions comprising the steps of:

determining the rapidity of change with time of the pixel positions at each of a plurality of picture elements over a particular time interval;

introducing three output signals associated respectively with no change, rapid change, and intermediate change in the particular time interval of pixel positions, the third signal being a function of the rapidity of change in the step of determining;

forming a synthetic value for each pixel position, the synthetic value being a function of the particular time interval, the output signal, and the pixel positioning in the particular time interval; and displaying the synthetic value for each pixel position in place of the original pixel.

8. In a system for filtering a digital video signal including pixels $dv(x_j)$, a method of forming a desired signal S of values for up to a predetermined number M of pixels adjacent to a given pixel, with weight coefficients that change from one pixel to another pixel and may change from a first time interval to a second time interval, where the length of both time intervals is equal to a cycle time of the video system, the method comprising the steps of:

providing a predetermined number K of digital filter arrays (k=1,2, ..., K) of weight coefficients $\{C(j,k)\}j-1$ stored in a memory system;

providing a coefficient choice whereby an array $\{C(j,k)\}_{j-1}{}^m$ of weight coefficients are chosen to form the weighted sum of M pixel values $dv(x_m)$ of pixels with positions $(x_m)$ adjacent to or in a predetermined neighborhood of the position $(x_T)$ of a particular pixel;

changing coefficients whereby an array of weight coefficients can be changed in a time interval that is substantially no greater than the first time interval;

forming the desired signal value sum $$S = \sum_{j=1}^{M} C(j,k)dv(x_j)$$

for the number K;

displaying the desired signal value in place of at least one of the M pixel values in the video signals; and wherein the step of changing coefficients is performed by one integrated circuit chip.

9. A method of filtering a digital video signal defined by a plurality of pixels each having an associated pixel value, comprising the steps of:

providing a predetermined number of arrays of digital filters in a plurality of storage locations;

selecting one of the arrays at repeated time intervals of no greater than 74 nanoseconds;

for each pixel in the digital video signal, applying the selected array to the pixel; and displaying the filtered video signals in place of a portion of the digital video signal.

10. The method of claim 9, further comprising the step of providing the plurality of storage locations in random access memory.

* * * * *